US011242296B2

(12) United States Patent
Dussault et al.

(10) Patent No.: US 11,242,296 B2
(45) Date of Patent: Feb. 8, 2022

(54) DECOMPOSITION OF ORGANIC PEROXIDES AND HYDROGEN PEROXIDE BY THE IRON THIOLATES AND RELATED COMPLEXES

(71) Applicant: NUtech Ventures, Lincoln, NE (US)

(72) Inventors: Patrick H. Dussault, Lincoln, NE (US); Andrew Olson, Lincoln, NE (US)

(73) Assignee: NUtech Ventures, Lincoln, NE (US)

( * ) Notice: Subject to any disclaimer, the term of this patent is extended or adjusted under 35 U.S.C. 154(b) by 0 days.

(21) Appl. No.: 16/514,423

(22) Filed: Jul. 17, 2019

(65) Prior Publication Data

US 2020/0181038 A1 Jun. 11, 2020

Related U.S. Application Data

(60) Provisional application No. 62/700,151, filed on Jul. 18, 2018.

(51) Int. Cl.
*C07B 41/02* (2006.01)

(52) U.S. Cl.
CPC .................................. *C07B 41/02* (2013.01)

(58) Field of Classification Search
CPC ................................ C07B 41/02; C07C 37/08
See application file for complete search history.

(56) References Cited

U.S. PATENT DOCUMENTS

| | | | | |
|---|---|---|---|---|
| 4,922,034 A * | 5/1990 | Sanderson | ............. | C07C 29/132 502/167 |
| 5,345,008 A * | 9/1994 | Lyons | ................... | C07C 29/132 568/815 |
| 5,345,009 A * | 9/1994 | Sanderson | ............. | C07C 29/132 568/558 |
| 5,401,889 A * | 3/1995 | Sanderson | ............. | C07C 29/132 568/909.8 |
| 5,688,873 A * | 11/1997 | Saida | ................... | C08G 61/123 525/410 |
| 7,396,961 B2 * | 7/2008 | Bonnet | .................. | B01J 23/464 568/338 |
| 2007/0059229 A1* | 3/2007 | Temple | .................. | B01D 53/86 423/243.01 |
| 2010/0040530 A1* | 2/2010 | Dussault | ............. | C01B 13/0211 423/581 |
| 2018/0194715 A1* | 7/2018 | Poulter | ................... | C07C 49/67 |

FOREIGN PATENT DOCUMENTS

WO WO-2014022752 A1 * 2/2014 ........... C07D 498/22

OTHER PUBLICATIONS

A. Olson et al., ACS Omega, 14054-14063 (2018) (Year: 2018).*
Y. Wang et al., 13 Organic Letters, 1722-1725 (2011) (Year: 2011).*
J. Smith et al., J. Chem. Soc. Perkin Trans. 2, 31-39 (1991) (Year: 1991).*
A. Canizo et al., 63 Heterocycles, 2231-2241 (2004) (Year: 2004).*
H. Guan et al., 57 Angewandte Chemie, International Edition, 11413-11417 (2018) (Year: 2018).*
K. Nesprias et al., 43 International Journal of Chemical Kinetics, 657-666 (2011) (Year: 2011).*
Y. Miyazaki et al., 283 Journal of Molecular Catalysis A: Chemical, 129-139 (2008) (Year: 2008).*
A. Olson et al., 3 ACS Omega, 14054-14063 (2018) (Year: 2018).*
CAS Abstract of Y. Saida et al., U.S. Pat. No. 5,688,873 (1997) (Year: 1997).*
CAS Abstract of Guo et al., 21 Chinese Journal of Chemistry, 466-470 (2003) (Year: 2003).*
CAS Abstract of M. Lanzi et al., 48 Journal of Materials Science, 3877-3893 (2013) (Year: 2013).*
D. Barton et al., 34 Tetrahedron Letters, 5689-5962 (1993) (Year: 1993).*
CAS Abstract of D. Barton et al., 34 Tetrahedron Letters, 5689-5962 (1993) (Year: 1993).*
A. Schoberl et al., 614 Justus Liebigs Annalen der Chemie, 66-83 (1958) (Year: 1958).*
CAS Abstract of A. Schoberl et al., 614 Justus Liebigs Annalen der Chemie, 66-83 (1958) (Year: 1958).*
M. Lanzi et al., 48 Journal of Materials Science, 3877-3893 (2013) (Year: 3013).*
Guo et al., 21 Chinese Journal of Chemistry, 466-470 (2003) (Year: 2003).*
P. Dai et al., 69 Journal of Organic Chemistry, 2851-2852 (2004) (Year: 2004).*
CAS Abstract and Indexed Reaction, N. Kumar et al., 17 Bioorganic & Medicinal Chemistry, 5632-5638 (2009) (Year: 2009).*
N. Kumar et al., 17 Bioorganic & Medicinal Chemistry, 5632-5638 (2009) (Year: 2009).*
CAS Abstract of Y. Huang et al., 79 Journal of Organic Chemistry, 4561-4568 (2014) (Year: 2014).*
Y. Huang et al., 79 Journal of Organic Chemistry, 4561-4568 (2014) (Year: 2014).*
CAS Abstract L. Wang et al., 55 Tetrahedron Letters, 7190-7193 (2014) (Year: 2014).*
L. Wang et al., 55 Tetrahedron Letters, 7190-7193 (2014) (Year: 2014).*
CAS Abstract J. Feng et al., 4 RSC Advances, 54409-54415 (2014) (Year: 2014).*
J. Feng et al., 4 RSC Advances, 54409-54415 (2014) (Year: 2014).*
CAS Abstract K. Du et al. 20 Green Chemistry, 1405-1411 (2018) (Year: 2018).*
K. Du et al. 20 Green Chemistry, 1405-1411 (2018) (Year: 2018).*
Kyasa et al., "Synthesis of Ethers via Reaction of Carbanions and Monoperoxy acetals," J Org. Chem., 2015, 80:12100-12114.

(Continued)

*Primary Examiner* — Alexander R Pagano
(74) *Attorney, Agent, or Firm* — Fish & Richardson P.C.

(57) ABSTRACT

Disclosed herein is a method of reducing or disproportionating peroxide, comprising combining an organic chalcogenide, an iron salt, and the peroxide in the presence of an additional reductant, which can be the organic chalcogenide. The method can be used to, e.g., prepare alcohols from peroxides and to disproportionate hydrogen peroxide into water and oxygen.

8 Claims, 8 Drawing Sheets

(56) References Cited

OTHER PUBLICATIONS

Matyas et al., "Study of TATP: Influence of reaction conditions on product composition," Propellants, Explosives, Pyrotechnics, 2010, 35:31-7.
Milas et al., "Organic peroxides, XIX, alpha-hydroperoxyethers and related peroxides," J Am. Oil Chem. Soc., 1954, 76, 2322-5.
Olson et al., "Reductive cleavage of organic peroxides by iron salts and thiols," ACS Omega, 2018, 3(10):14054-14063.
Oxley et al., "Factors influencing triacetone triperoxide (TATP) and diacetone diperoxide (DADP) formation: part 1," Propellants Explos. Pyrotech., 2013, 38:244-254.
Oxley et al., "Factors influencing triacetone triperoxide (TATP) and diacetone diperoxide (DADP) formation: part 2," Propellants Explos. Pyrotech., 2013, 38:841-851.
Rigaudy et al., "Addition of hydroperoxides to activated double bonds of vinyl ethers," Compt. Rend. 1953, 236:2086 (with English abstract).
Smith et al. "Detection of sterol hydroperoxides on thin-layer chromatoplates by means of the Wurster dyes," J Chromatogr., 1972, 66(1):101-109.
Welch et al., "Organic peroxides, IV, higher dialkyl peroxides," J Am. Chem. Soc., 1955, 70:551-554.
Zhang et al., "Photovoltaically Self-Charging Cells with $WO_3 \cdot H_2O$/CNTs/PVDF Composite," RSC Adv., 2016, 6(99):8465-8468.

\* cited by examiner

DECOMPOSITION OF ORGANIC PEROXIDES AND HYDROGEN PEROXIDE BY THE IRON THIOLATES AND RELATED COMPLEXES

CLAIM OF PRIORITY

This application claims the benefit of U.S. Provisional Application No. 62/700,151, filed on Jul. 18, 2018, which is incorporated herein by reference in its entirety.

This invention was made with government support under CHE1464914 awarded by the National Science Foundation. The government has certain rights in the invention.

STATEMENT OF FEDERALLY SPONSORED RESEARCH

This invention was made with government support under Grant no. CHE1464914, awarded by the National Science Foundation and Grant no. RR016544 awarded by the National Institutes of Health. The government has certain rights in the invention.

BACKGROUND

Organic peroxides are organic molecules containing a peroxide (C—O—O—C) moiety. They are important materials of commerce, particularly as thermally activated initiators for radical polymerization. The oxygen-oxygen bond of peroxides has a lower bond dissociation energy compared to many other bonds commonly found in organic molecules; for example, a typical peroxide O—O would have a dissociation energy (cost of breakage) of less than half that of a C—O bond. As a result, decomposition reactions in which a peroxide group is cleaved to generate new C—O or C—H bonds are often thermodynamically favorable. Due to the relative weakness of O—O bonds and their ability to take part in thermodynamically favorable processes, many organic peroxides have a capacity for self-accelerating decomposition reactions that can result in fire, deflagration, or explosion. As such, mild methods for controlled decomposition of peroxides are desirable. One such controlled decomposition is reduction, in which the O—O bond of a peroxide is reductively cleaved to generate two O—H moieties; another mode of decomposition is disproportionation, in which the oxidation state of the products is the same as that of the reactants. Historically, peroxides have been reduced using a number of approaches. Examples of common reagents for chemical reduction include: metal hydrides (e.g., LiAlH$_4$); hydrogenation (e.g., H$_2$, metal catalyst), organic reductants (e.g., phosphines); reactive metals and "dissolving metals" (e.g., zinc in acetic acid or lithium/sodium/potassium in ammonia); and inorganic reductants (e.g., hydrogen iodide or ferrous ions). Many methods that employ these reductants are applied to organic peroxides which are activated by strain or stereoelectronics (e.g., ozonides, e.g., 1,2,4-trioxolanes) or which are electronically activated through linkage to an electron-withdrawing element (e.g., peresters). However, the reductive fragmentation of unactivated peroxides, particularly peroxides in which the reactive O—O bond is surrounded by bulky neighboring groups (e.g., diacetone diperoxide (DADP or 3,3,6,6-tetramethyl-1,2,4,5-tetraoxane)) can often be conducted only under extremely harsh conditions and/or at very low reaction rates.

SUMMARY

In one aspect, herein is disclosed a method of decomposing a peroxide, comprising combining:

an organic chalcogenide;
an optional reductant;
an iron salt; and
the peroxide;
wherein decomposing the peroxide comprises reducing the peroxide or disproportionating the peroxide.

In some embodiments, the peroxide is an optionally substituted hydroperoxide. In some embodiments, the peroxide is an optionally substituted dialkylperoxide. In some embodiments (when the peroxide is an optionally substituted dialkylperoxide), at least one alkyl group that is bonded to an oxygen of the —O—O— moiety is substituted on the carbon atom of the alkyl group that is bonded to the oxygen.

In some embodiments, the peroxide has a molecular weight of about 34 g/mol to about 2000 g/mol. In some embodiments, the peroxide has a molecular weight of about 34 g/mol to about 500 g/mol. In some embodiments, the peroxide has a molecular weight of about 100 g/mol to about 2000 g/mol. In some embodiments, the peroxide has a molecular weight of about 140 g/mol to about 270 g/mol. In some embodiments, the peroxide has a molecular weight of about 100 g/mol to about 300 g/mol.

In some embodiments, the peroxide is a peroxide of Formula I:

$$R^1\text{—O—O—}R^2 \qquad \text{(Formula I)}$$

wherein:
each of $R^1$ and $R^2$ is independently selected from the group consisting of:
(i) hydrogen;
(ii) $C_{1-10}$ alkyl optionally substituted with 1-4 $R^a$;
(iii) $C_{3-10}$ alkenyl optionally substituted with 1-4 $R^a$;
(iv) $C_{3-10}$ alkynyl optionally substituted with 1-4 $R^a$;
(v) $C_{6-10}$ aryl optionally substituted with 1-4 $R^a$;
(vi) 5-10 membered heteroaryl including 5-10 ring atoms, wherein 1-4 ring atoms are each independently selected from the group consisting of N, NH, O, and S, wherein the heteroaryl is optionally substituted with 1-4 $R^a$;
(vii) $C_{3-10}$ cycloalkyl that is optionally substituted with 1-4 $R^a$;
(vii) 5-10 membered heterocyclyl including 3-10 ring atoms, wherein 1-3 ring atoms are each independently selected from the group consisting of N, NH and O, wherein the heterocyclyl is optionally substituted with 1-4 $R^a$;
(viii) —C(O)$R^b$;
(ix) —CO$_2 R^b$;
(x) —Si(R')$_3$;
each occurrence of $R^a$ is independently selected from the group consisting of:
(i) $C_{1-8}$ alkyl substituted with 1-3 $R^b$;
(ii) ($C_{0-6}$ alkylene)-$C_{3-10}$ cycloalkyl, wherein the cycloalkyl is optionally substituted with from 1-4 $R^b$;
(iii) ($C_{0-6}$ alkylene)-heterocyclyl including 3-10 ring atoms, wherein 1-3 ring atoms are each independently selected from the group consisting of NH, O, and S, wherein the heterocyclyl is optionally substituted with 1-4 $R^b$;
(iv) ($C_{0-6}$ alkylene)-($C_{6-10}$ aryl), wherein the aryl is optionally substituted with 1-5 $R^b$; or
(v) ($C_{0-6}$ alkylene)-heteroaryl including 5-10 ring atoms, wherein 1-4 ring atoms are each independently selected from the group consisting of N, NH, O, and S, wherein the heteroaryl is optionally substituted with 1-3 $R^b$;
(vi) $C_{1-4}$ alkoxy optionally substituted with 1-3 $R^b$;
(vii) $C_{1-4}$ haloalkoxy;
(viii) —COH;
(ix) —CO$_2 R^b$;

(x) —CONR$^b$R$^b$;
(xi) cyano;
(xii) —NR$^b$R$^b$;
(xiii) —NR$^b$C(O)NR$^b$R$^b$;
(xiv) —NR$^b$C(O)OR$^b$;
(xv) —NR$^b$C(O)R$^b$;
(xvi) C$_{1-4}$ thioalkoxy;
(xvii) —N$_3$;
(xviii) —CO$_2$H;
(xix) —C(O)R$^b$;
(xx) —SO$_{1-2}$(R$^b$);
(xxi) —O$_n$P(O)$_n$Y$_2$, wherein n is independently 0 or 1, and wherein each Y is independently selected from —OR$^b$ and C$_{1-6}$ alkyl;
(xxii) —O—O—R$^c$;
(xxiii) —(O—O—CH$_2$CH$_2$)$_m$—O—OR'", wherein m is an integer from 1-1000; and
alternatively, any two R$^a$, taken together with the atoms they are bonded to and any atoms that intervene the atoms they are bonded to, form a ring selected from:
(i) a C$_{3-10}$ cycloalkyl, wherein the a C$_{3-10}$ cycloalkyl is optionally substituted with 1-6 R$^b$;
(ii) a 5-10-membered heterocyclyl comprising 1-6 heteroatoms selected O, S, and N, wherein the heterocyclyl is optionally substituted with 1-6 R$^b$;
(iii) a C$_{6-10}$ aryl, wherein the aryl is optionally substituted with 1-6 R$^b$; and
(iv) a 5-10 membered heteroaryl comprising 1-6 heteroatoms selected O, S, and N, wherein the heteroaryl is optionally substituted with 1-6 R$^b$; and
5-10-membered heterocyclyl comprising 1-6 heteroatoms selected O, S, and N, wherein the heterocyclyl is optionally substituted with 1-6 R$^b$;
each occurrence of R$^b$ is independently selected from the group consisting of:
(i) halo;
(ii) cyano;
(iii) C$_{1-6}$ alkyl;
(iv) C$_{2-6}$ alkenyl;
(v) C$_{2-6}$ alkynyl;
(vi) C$_{1-4}$ haloalkyl;
(vii) C$_{1-4}$ alkoxy;
(viii) C$_{1-4}$ haloalkoxy;
(ix) —(C$_{0-3}$ alkylene)-C$_{3-6}$ cycloalkyl optionally substituted with 1-4 independently selected C$_{1-4}$ alkyl;
(x) —(C$_{0-3}$ alkylene)-heterocyclyl including 3-10 ring atoms, wherein 1-3 ring atoms are each independently selected from the group consisting of NH, O, and S, wherein the heterocyclyl is optionally substituted with 1-4 independently selected C$_{1-4}$ alkyl;
(xi) —(C$_{0-3}$ alkylene)-phenyl;
(xii) —(C$_{0-3}$ alkylene)-heteroaryl including 5-10 ring atoms, wherein 1-4 ring atoms are each independently selected from the group consisting of N, NH, O, and S;
(xiii) —S(O)$_{1-2}$(C$_{1-4}$ alkyl); and
(xiv) —NR'R'";
(xv) —OH;
(xvi) —S(O)$_{1-2}$(NR'R");
(xvii) —C$_{1-4}$ thioalkoxy;
(xviii) —NO$_2$;
(xix) —N(R')(C(=O)C$_{1-3}$ alkyl);
(xx) —C(=O)(C$_{1-4}$ alkyl);
(xxi) —C(=O)O(C$_{1-4}$ alkyl);
(xxii) —C(=O)OH, and
(xxiii) —C(=O)N(R')(R"); and alternatively, any two R$^b$, taken together with the atoms they are bonded to and any atoms that intervene the atoms they are bonded to, form a ring selected from:
(i) a C$_{3-10}$ cycloalkyl, wherein the a C$_{3-10}$ cycloalkyl is optionally substituted with 1-6 R$^d$;
(ii) a 5-10-membered heterocyclyl comprising 1-6 heteroatoms selected O, S, and N, wherein the heterocyclyl is optionally substituted with 1-6 R$^d$;
(iii) a C$_{6-10}$ aryl, wherein the aryl is optionally substituted with 1-6 R$^d$; and
(iv) a 5-10 membered heteroaryl comprising 1-6 heteroatoms selected O, S, and N, wherein the heteroaryl is optionally substituted with 1-6 R$^d$; and
5-10-membered heterocyclyl comprising 1-6 heteroatoms selected O, S, and N, wherein the heterocyclyl is optionally substituted with 1-6 R$^d$;
each occurrence of R$^c$ is independently selected from the group consisting of:
(i) hydrogen;
(ii) C$_{1-10}$ alkyl optionally substituted with 1-4 R$^d$;
(iii) C$_{3-10}$ alkenyl optionally substituted with 1-4 R$^d$;
(iv) C$_{3-10}$ alkynyl optionally substituted with 1-4 R$^d$;
(v) C$_{6-10}$ aryl optionally substituted with 1-4 R$^d$;
(vi) 5-10 membered heteroaryl including 5-10 ring atoms, wherein 1-4 ring atoms are each independently selected from the group consisting of N, NH, O, and S, wherein the heteroaryl is optionally substituted with 1-4 R$^d$;
(vii) C$_{3-10}$ cycloalkyl that is optionally substituted with 1-4 R$^d$;
(vii) 5-10 membered heterocyclyl including 3-10 ring atoms, wherein 1-3 ring atoms are each independently selected from the group consisting of N, NH and O, wherein the heterocyclyl is optionally substituted with 1-4 R$^d$;
(viii) —C(O)R$^b$;
(ix) —CO$_2$R$^b$; and
(x) —Si(R')$_3$;
each occurrence of R$^d$ is independently selected from the group consisting of:
(i) C$_{1-8}$ alkyl substituted with 1-3 R$^b$;
(ii) (C$_{0-6}$ alkylene)-C$_{3-10}$ cycloalkyl, wherein the cycloalkyl is optionally substituted with from 1-4 R$^b$;
(iii) (C$_{0-6}$ alkylene)-heterocyclyl including 3-10 ring atoms, wherein 1-3 ring atoms are each independently selected from the group consisting of NH, O, and S, wherein the heterocyclyl is optionally substituted with 1-4 R$^b$;
(iv) (C$_{0-6}$ alkylene)-(C$_{6-10}$ aryl), wherein the aryl is optionally substituted with 1-5 R$^b$; or
(v) (C$_{0-6}$ alkylene)-heteroaryl including 5-10 ring atoms, wherein 1-4 ring atoms are each independently selected from the group consisting of N, NH, O, and S, wherein the heteroaryl is optionally substituted with 1-3 R$^b$;
(vi) C$_{1-4}$ alkoxy optionally substituted with 1-3 R$^b$;
(vii) C$_{1-4}$ haloalkoxy;
(viii) —COH;
(ix) —CO$_2$R$^b$;
(x) —CONR$^b$R$^b$;
(xi) cyano;
(xii) —NR$^b$R$^b$;
(xiii) —NR$^b$C(O)NR$^b$R$^b$;
(xiv) —NR$^b$C(O)OR$^b$;
(xv) —NR$^b$C(O)R$^b$;
(xvi) C$_{1-4}$ thioalkoxy;
(xvii) —N$_3$;
(xviii) —CO$_2$H;
(xix) —C(O)R$^b$;
(xx) —SO$_{1-2}$(R$^b$); and (xxi) —O$_n$P(O)$_n$Y$_2$, wherein n is independently 0 or 1, and wherein each Y is independently selected from —OR$^b$ and C$_{1-6}$ alkyl; and each occurrence of R', R", and R'" is independently selected from the group consisting of: H, C$_{1-4}$ alkyl, and phenyl; or, if R' and R" are bonded to the same atom, R' and R" together with the atom to which each is attached forms a ring including 3-8 ring atoms, wherein the ring includes: (a) 1-7 ring carbon atoms; and (b) 0-3 ring heteroatoms (in addition to the atom attached to R' and R"), which are each independently selected from the group consisting of N, NH, O, and S;

alternatively, R$^1$ and R$^2$, taken together with the oxygen atoms they are bonded to, form a 5-10-membered heterocyclyl comprising 1-6 heteroatoms selected from O, S, and N, wherein the heterocyclyl is optionally substituted with 1-6 R$^a$; and provided that when one of R$^1$ and R$^2$ is hydrogen, the other of R$^1$ and R$^2$ is not hydrogen; and provided that a —O—O— moiety is not bonded to a carbon that is double bonded to another carbon or triple-bonded to another carbon.

In some embodiments (when the peroxide is a peroxide of Formula I), R$^1$ is (i) hydrogen. In some embodiments (when the peroxide is a peroxide of Formula I), R$^1$ is (ii) C$_{1-6}$ alkyl optionally substituted with 1-3 R$^a$. In some embodiments (when the peroxide is a peroxide of Formula I), R$^1$ is (ii) C$_{1-6}$ alkyl substituted with 1-3 R$^a$, wherein at least 1 R$^a$ is on the carbon of the C$_{1-6}$ alkyl bonded to an O of the —O—O— moiety of Formula I. In some embodiments (when the peroxide is a peroxide of Formula I), R$^1$ is (ii) C$_{1-6}$ alkyl optionally substituted with 1-3 R$^a$, wherein the C$_{1-6}$ alkyl is branched at the carbon of the C$_{1-6}$ alkyl bonded to an O of the —O—O— moiety of Formula I. In some embodiments (when the peroxide is a peroxide of Formula I), R$^1$ is unsubstituted C$_{1-6}$ alkyl. In some embodiments (when the peroxide is a peroxide of Formula I), R$^1$ is 2-propyl. In some embodiments (when the peroxide is a peroxide of Formula I), R$^1$ is t-butyl.

In some embodiments (when the peroxide is a peroxide of Formula I), R$^1$ is selected from:

(v) —C$_{6-10}$ aryl optionally substituted with 1-3 R$^a$;

(vi) -5-10 membered heteroaryl including 5-10 ring atoms, wherein 1-4 ring atoms are each independently selected from the group consisting of N, NH, O, and S, wherein the heteroaryl is optionally substituted with 1-3 R$^a$;

(vii) —C$_{3-10}$ cycloalkyl that is optionally substituted with 1-4 R$^a$; and (vii) -5-10 membered heterocyclyl including 3-10 ring atoms, wherein 1-3 ring atoms are each independently selected from the group consisting of N, NH and O, wherein the heterocyclyl is optionally substituted with 1-4 R$^a$.

In some embodiments (when the peroxide is a peroxide of Formula I), R$^1$ is selected from:

(v) —C$_{6-10}$ aryl substituted with 1-3 R$^a$;

(vi) -5-10 membered heteroaryl including 5-10 ring atoms, wherein 1-4 ring atoms are each independently selected from the group consisting of N, NH, O, and S, wherein the heteroaryl is substituted with 1-3 R$^a$;

(vii) —C$_{3-10}$ cycloalkyl that is substituted with 1-4 R$^a$; and (vii) -5-10 membered heterocyclyl including 3-10 ring atoms, wherein 1-3 ring atoms are each independently selected from the group consisting of N, NH and O, wherein the heterocyclyl is substituted with 1-4 R$^a$; and wherein at least 1 R$^a$ is on the position of the —C$_{6-10}$ aryl, -5-10 membered heteroaryl, —C$_{3-10}$ cycloalkyl, or -5-10 membered heterocyclyl that is ortho to the position of the —C$_{6-10}$ aryl, -5-10 membered heteroaryl, —C$_{3-10}$ cycloalkyl, or -5-10 membered heterocyclyl that is bonded to an O of the —O—O— moiety of Formula I.

In some embodiments (when the peroxide is a peroxide of Formula I), R$^2$ is (ii) C$_{1-6}$ alkyl optionally substituted with 1-3 R$^a$. In some embodiments (when the peroxide is a peroxide of Formula I), R$^2$ is (ii) C$_{1-6}$ alkyl substituted with 1-3 R$^a$, wherein at least 1 R$^a$ is on the carbon of the C$_{1-6}$ alkyl bonded to an O of the —O—O— moiety of Formula I. In some embodiments (when the peroxide is a peroxide of Formula I), R$^2$ is (ii) C$_{1-6}$ alkyl optionally substituted with 1-3 R$^a$, wherein the C$_{1-6}$ alkyl is branched at the carbon of the C$_{1-6}$ alkyl bonded to an O of the —O—O— moiety of Formula I. In some embodiments (when the peroxide is a peroxide of Formula I), R$^2$ is unsubstituted C$_{1-6}$ alkyl. In some embodiments (when the peroxide is a peroxide of Formula I), R$^2$ is 2-propyl. In some embodiments (when the peroxide is a peroxide of Formula I), R$^2$ is t-butyl.

In some embodiments (when the peroxide is a peroxide of Formula I), R$^2$ is selected from:

(v) —C$_{6-10}$ aryl optionally substituted with 1-3 R$^a$;

(vi) -5-10 membered heteroaryl including 5-10 ring atoms, wherein 1-4 ring atoms are each independently selected from the group consisting of N, NH, O, and S, wherein the heteroaryl is optionally substituted with 1-3 R$^a$;

(vii) —C$_{3-10}$ cycloalkyl that is optionally substituted with 1-4 R$^a$; and (vii) -5-10 membered heterocyclyl including 3-10 ring atoms, wherein 1-3 ring atoms are each independently selected from the group consisting of N, NH and O, wherein the heterocyclyl is optionally substituted with 1-4 R$^a$.

The method of any one of claims 12-21, wherein R$^2$ is selected from:

(v) —C$_{6-10}$ aryl substituted with 1-3 R$^a$;

(vi) -5-10 membered heteroaryl including 5-10 ring atoms, wherein 1-4 ring atoms are each independently selected from the group consisting of N, NH, O, and S, wherein the heteroaryl is substituted with 1-3 R$^a$;

(vii) —C$_{3-10}$ cycloalkyl that is substituted with 1-4 R$^a$; and (vii) -5-10 membered heterocyclyl including 3-10 ring atoms, wherein 1-3 ring atoms are each independently selected from the group consisting of N, NH and O, wherein the heterocyclyl is substituted with 1-4 R$^a$; and wherein at least 1 R$^a$ is on the position of the —C$_{6-10}$ aryl, -5-10 membered heteroaryl, —C$_{3-10}$ cycloalkyl, or -5-10 membered heterocyclyl that is ortho to the position of the —C$_{6-10}$ aryl, -5-10 membered heteroaryl, —C$_{3-10}$ cycloalkyl, or -5-10 membered heterocyclyl that is bonded to an O of the —O—O— moiety of Formula I.

In some embodiments (when the peroxide is a peroxide of Formula I), R$^1$ and R$^2$, taken together with the oxygen atoms they are bonded to, form a ring selected from:

(1) a C$_{3-10}$ cycloalkyl, wherein the a C$_{3-10}$ cycloalkyl is optionally substituted with 1-6 R$^a$;

(ii) a 5-7-membered heterocyclyl comprising 1-6 heteroatoms selected from O, S, and N, wherein the heterocyclyl is optionally substituted with 1-6 R$^a$;

(iii) a C$_{6-10}$ aryl, wherein the aryl is optionally substituted with 1-6 R$^a$; and (iv) a 5-10 membered heteroaryl comprising 1-6 heteroatoms selected from O, S, and N, wherein the heteroaryl is optionally substituted with 1-6 R$^a$.

In some embodiments (when the peroxide is a peroxide of Formula I), R$^1$ and R$^2$, taken together with the oxygen atoms they are bonded to, form a 5-10-membered heterocyclyl comprising 1-6 heteroatoms selected from O, S, and N, wherein the heterocyclyl is optionally substituted with 1-6 $R^a$.

In some embodiments, the peroxide is a 3,3,6,6,9,9-hexamethyl-1,2,4,5,7,9-hexaoxanonane. In some embodiments, the peroxide is triacetone triperoxide. In some embodiments, the peroxide is a 1,2,4,5-tetroane. In some embodiments, the peroxide is diacetone triperoxide. In some embodiments, the peroxide is a 1,2,4-trioxolane (ozonides), 1,2-dioxolane, and 1,2,4-trioxane. In some embodiments, the peroxide is an ozonide. In some embodiments, the peroxide is tert-butyl peroxyneodecanoate or tert-butyl peroxypivalate. In some embodiments, the peroxide is di(3,5,5-trimethylhexanoyl) peroxide. In some embodiments, the peroxide is di(4-tert-butylcyclohexyl) peroxydicarbonate. In some embodiments, the peroxide is 2,5-dihydroperoxy-2,5-dimethylhexane, 1,1-di(tert-butylperoxy)-3,3,5-trimethylcyclohexane, 2,2-di(tert-butylperoxy)butane, or 1,1-cyclohexanediyl dihydroperoxide. In some embodiments, the peroxide is t-butyl hydroperoxide. In some embodiments, the organic chalcogenide is a thiol or thiolate.

In some embodiments (when the organic chalcogenide is a thiol or thiolate), the thiolate is a compound of Formula A2:

wherein:
$R^{10}$ is selected from the group consisting of:
(i) $C_{1-6}$ alkyl optionally substituted with from 1-4 $R^m$;
(ii) —$C_{6-10}$ aryl optionally substituted with from 1-4 $R^m$;
(iii) -5-10 membered heteroaryl, wherein 1-4 ring atoms are each independently selected from the group consisting of N, NH, O, and S, wherein the heteroaryl is optionally substituted with from 1-4 $R^m$;
(iv) —$C_{3-10}$ cycloalkyl wherein the cycloalkyl is optionally substituted with from 1-4 $R^m$; and
(v) -5-10 membered heterocyclyl, wherein the heterocyclyl is optionally substituted with 1-4 $R^m$;

each occurrence of $R^m$ is independently selected from the group consisting of:
(i) $C_{1-8}$ alkyl substituted with 1-3 $R^n$;
(ii) $(C_{0-6}$ alkylene)-$C_{3-10}$ cycloalkyl, wherein the cycloalkyl is optionally substituted with from 1-4 $R^n$;
(iii) $(C_{0-6}$ alkylene)-heterocyclyl including 3-10 ring atoms, wherein 1-3 ring atoms are each independently selected from the group consisting of NH, O, and S, wherein the heterocyclyl is optionally substituted with 1-4 $R^n$;
(iv) $(C_{0-6}$ alkylene)-($C_{6-10}$ aryl), wherein the aryl is optionally substituted with 1-5 $R^n$; or
(v) $(C_{0-6}$ alkylene)-heteroaryl including 5-10 ring atoms, wherein 1-4 ring atoms are each independently selected from the group consisting of N, NH, O, and S, wherein the heteroaryl is optionally substituted with 1-3 $R^n$;
(vi) $C_{1-4}$ alkoxy optionally substituted with 1-3 $R^n$;
(vii) $C_{1-4}$ haloalkoxy;
(viii) —COH;
(ix) —$CO_2R^n$;
(x) —$CONR''R_n$;
(xi) cyano;
(xii) —$NR''R''$;
(xiii) —$NR''C(O)NR''R''$;
(xiv) —$NR''C(O)OR''$;
(xv) —$NR''C(O)R''$;
(xvi) $C_{1-4}$ thioalkoxy;
(xvii) —$N_3$;
(xviii) —$CO_2H$;
(xix) —$C(O)R''$;
(xx) —$SO_{1-2}(R'')$;
(xxi) —$O_nP(O)_nY_2$, wherein n is independently 0 or 1, and wherein each Y is independently selected from —$OR''$ and $C_{1-6}$ alkyl;
(xxii) —SH or —$S^-$;
(xxix) $C_{2-6}$ alkenyl optionally substituted with 1-3 $R''$;
(xxx) $C_{2-6}$ alkynyl optionally substituted with 1-3 $R''$;

each occurrence of $R''$ is independently selected from the group consisting of:
(i) halo;
(ii) cyano;
(iii) $C_{1-6}$ alkyl;
(iv) $C_{2-6}$ alkenyl;
(v) $C_{2-6}$ alkynyl;
(vi) $C_{1-4}$ haloalkyl;
(vii) $C_{1-4}$ alkoxy;
(viii) $C_{1-4}$ haloalkoxy;
(ix) —($C_{0-3}$ alkylene)-$C_{3-6}$ cycloalkyl optionally substituted with 1-4 independently selected $C_{1-4}$ alkyl;
(x) —($C_{0-3}$ alkylene)-heterocyclyl including 3-10 ring atoms, wherein 1-3 ring atoms are each independently selected from the group consisting of NH, O, and S, wherein the heterocyclyl is optionally substituted with 1-4 independently selected $C_{1-4}$ alkyl;
(xi) —($C_{0-3}$ alkylene)-phenyl;
(xii) —($C_{0-3}$ alkylene)-heteroaryl including 5-10 ring atoms, wherein 1-4 ring atoms are each independently selected from the group consisting of N, NH, O, and S;
(xiii) —$S(O)_{1-2}(C_{1-4}$ alkyl); and
(xiv) —$NR*R**$;
(xv) —OH;
(xvi) —$S(O)_{1-2}(NR*R**)$;
(xvii) $C_{1-4}$ thioalkoxy;
(xviii) —$NO_2$;
(xix) —$N(R*)(C(=O)C_{1-3}$ alkyl);
(xx) —$C(=O)(C_{1-4}$ alkyl);
(xxi) —$C(=O)O(C_{1-4}$ alkyl);
(xxii) —$C(=O)OH$, and
(xxiii) —$C(=O)N(R*)(R**)$; and each occurrence of $R*$ and $R**$ is independently selected from the group consisting of: H, $C_{1-4}$ alkyl, and phenyl.

In some embodiments (when the thiolate is a compound of Formula A2), $R^{10}$ is $C_{1-6}$ alkyl. In some embodiments (when the thiolate is a compound of Formula A2), $R^{10}$ is $C_{6-10}$ aryl. In some embodiments (when the thiolate is a compound of Formula A2), $R^{10}$ is phenyl. In some embodiments (when the thiolate is a compound of Formula A2), the thiolate is ethanethiolate. In some embodiments (when the thiolate is a compound of Formula A2), the thiolate is butanethiolate. In some embodiments (when the thiolate is a compound of Formula A2), the thiolate is a dithiolate. In some embodiments (when the thiolate is a compound of Formula A2), the thiolate is 1,2-ethanedithiol, 1,3-propanedithiol, or 1,4-butanedithiol. In some embodiments, the organic chalcogenide is a selenide.

In some embodiments (when the organic chalcogenide is a selenide), the selenide is a selenide of Formula B:

wherein:
$R^{20}$ is selected from the group consisting of:
(ii) $C_{1-6}$ alkyl;
(iii) $C_{2-6}$ alkenyl;
(iv) $C_{2-6}$ alkynyl;
(v) —$C_{6-10}$ aryl;

(vi) -5-10 membered heteroaryl, wherein 1-4 ring atoms are each independently selected from the group consisting of N, NH, O, and S;
(vii) —$C_{3-10}$ cycloalkyl; and
(vii) -5-10 membered heterocyclyl.

In some embodiments (when the selenide is a selenide of Formula B), $R^{20}$ is $C_{1-6}$ alkyl. In some embodiments (when the selenide is a selenide of Formula B), $R^{20}$ is $C_{6-10}$ aryl. In some embodiments (when the selenide is a selenide of Formula B), wherein $R^{20}$ is phenyl.

In some embodiments, the iron salt is an iron (II) salt. In some embodiments, the iron salt is an iron (III) salt. In some embodiments, the counteranion of the iron salt is a halide.

In some embodiments, the iron salt is selected from the group consisting of iron (II) fluoride, iron (II) chloride, iron (II) bromide, iron (II) iodide, iron (III) fluoride, iron (III) chloride, iron (III) bromide, iron (III) iodide, iron (II) sulfate, iron (III) carbonate, iron (III) citrate, iron (II) molybdate, iron(II) nitrate iron (III) nitrate, iron (II) oxalate, iron (III) oxalate, iron (II) perchlorate, iron (III) perchlorate, iron (II) phosphate, iron (III) phosphate, iron (III) pyrophosphate, and iron (II) tetrafluoroborate, iron (II) sulfate, iron (II) carboxylate, iron (III) carboxylate, iron (II) gluconate, iron (II) acetylacetonate (acac), and hydrates thereof. In some embodiments, the iron salt is iron (II) acetate or hydrates thereof. In some embodiments, the iron salt is iron (III) acetate or hydrates thereof. In some embodiments, the iron salt is iron (II) chloride. In some embodiments, the iron salt is iron (III) chloride. In some embodiments, the iron salt is iron (II) bromide. In some embodiments, the iron salt is iron (III) bromide. In some embodiments, the iron salt is an iron-sulfur cluster.

In some embodiments, the amount of iron salt is catalytic relative to the amount of peroxide. In some embodiments, the ratio of the iron salt to the peroxide is about 0.0001:1 to about 2:1. In some embodiments, the ratio of the iron salt to the peroxide is about 0.0001:1 to about 0.1:1. In some embodiments, the ratio of the iron salt to the peroxide is about 0.0001:1 to about 0.05:1. In some embodiments, the ratio of the iron salt to the peroxide is about 0.001:1 to about 2:1. In some embodiments, the ratio of the iron salt to the peroxide is about 0.01:1 to about 2:1. In some embodiments, the ratio of the iron salt to the peroxide is about 0.001:1 to about 0.02:1. In some embodiments, the ratio of the iron salt to the peroxide is about 0.005:1 to about 0.01:1. In some embodiments, the ratio of the iron salt to the peroxide is about 1:1. In some embodiments, the ratio of the iron salt to the peroxide is about 0.01:1. In some embodiments, the ratio of the iron salt to the peroxide is about 0.001:1.

In some embodiments, the amount of organic chalcogenide is catalytic relative to the peroxide. In some embodiments, the ratio of the organic chalcogenide to the peroxide is greater than about 0.001:1 and equal to or less than 0.6:1. In some embodiments, the ratio of the organic chalcogenide to the peroxide is greater than 0.001:1 and equal to or less than 2:1. In some embodiments, the ratio of the organic chalcogenide to the peroxide is greater than 0.001:1 and equal to or less than 1:1. In some embodiments, the ratio of the organic chalcogenide to the peroxide is greater than 0.001:1 and equal to or less than 0.20:1. In some embodiments, the ratio of the organic chalcogenide to the peroxide is greater than 0.1:1 and equal to or less than 0.7:1. In some embodiments, the ratio of the organic chalcogenide to the peroxide is greater than 0.14:1 and equal to or less than 0.6:1. In some embodiments, the ratio of the organic chalcogenide to the peroxide is greater than 0.15 and less than about 0.5:1. In some embodiments, the ratio of the organic chalcogenide to the peroxide is about 0.5:1. In some embodiments, the ratio of the organic chalcogenide to the peroxide is about 0.15:1.

In some embodiments, the optional reductant is present. In some embodiments (when the optional reductant is present), the amount of reductant is catalytic relative to the peroxide. In some embodiments (when the optional reductant is present), the ratio of the reductant to the peroxide is greater than about 0.001:1 and equal to or less than 0.6:1. In some embodiments (when the optional reductant is present), the ratio of the reductant to the peroxide is greater than 0.001:1 and equal to or less than 2:1. In some embodiments (when the optional reductant is present), the ratio of the reductant to the peroxide is greater than 0.001:1 and equal to or less than 1:1. In some embodiments (when the optional reductant is present), the ratio of the reductant to the peroxide is greater than 0.001:1 and equal to or less than 0.20:1. In some embodiments (when the optional reductant is present), the ratio of the reductant to the peroxide is greater than 0.1:1 and equal to or less than 0.7:1. In some embodiments (when the optional reductant is present), the ratio of the reductant to the peroxide is greater than 0.14:1 and equal to or less than 0.6:1. In some embodiments (when the optional reductant is present), the ratio of the reductant to the peroxide is greater than 0.15 and less than about 0.5:1. In some embodiments (when the optional reductant is present), the ratio of the reductant to the peroxide is about 0.5:1. In some embodiments (when the optional reductant is present), the ratio of the reductant to the peroxide is about 0.15:1. In some embodiments (when the optional reductant is present), the reductant is a thiol, selenol, or anion thereof. In some embodiments (when the optional reductant is present), the reductant is a nucleophilic hydride. In some embodiments (when the reductant is a nucleophilic hydride), the nucleophilic hydride is selected from the group consisting of lithium aluminum hydride, sodium aluminum hydride, aluminum hydrides comprising alkoxide groups, sodium borohydride, sodium cyanoborohydride, lithium borohydride, potassium borohydride, tetrabutylammonium borohydride, and diisobutylaluminum hydride. In some embodiments (when the reductant is a nucleophilic hydride), the nucleophilic hydride is lithium triethoxyaluminum hydride or sodium bis(2-methoxyethoxy)aluminum hydride.

In some embodiments, the product of the reduction of the peroxide is an alcohol. In some embodiments (when the peroxide is a peroxide of Formula I), the organic chalcogenide and the iron salt forms a complex that reduces the peroxide. In some embodiments (when the organic chalcogenide and the iron salt forms a complex that reduces the peroxide), the complex is a complex of Formula C:

(Formula C)

wherein:
Z is the organic chalcogenide; and
n is 1, 2, 3 or 4.

In some embodiments (when the complex is a complex of Formula C), the complex reacts with the peroxide to form an intermediate of Formula D:

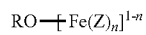

(Formula D)

wherein:

R is $R^1$ or $R^2$;

Z is the organic chalcogenide; and n is 1, 2, 3 or 4.

In some embodiments (when the complex reacts with the peroxide to form an intermediate of Formula D), the intermediate of Formula D forms an intermediate of Formula E:

  (Formula D)

wherein Z is the organic chalcogenide; and wherein the intermediate of Formula E forms the alcohol.

In another aspect, herein is disclosed a method of disproportionating hydrogen peroxide, comprising combining:

an organic chalcogenide;

an iron salt; and the peroxide.

In some embodiments, the organic chalcogenide is a thiol or thiolate. In some embodiments (when the organic chalcogenide is a thiol or thiolate), the thiolate is a compound of Formula A2:

wherein:

$R^{10}$ is selected from the group consisting of:

(i) $C_{1-6}$ alkyl optionally substituted with from 1-4 $R'''$;

(ii) —$C_{6-10}$ aryl optionally substituted with from 1-4 $R'''$;

(iii) -5-10 membered heteroaryl, wherein 1-4 ring atoms are each independently selected from the group consisting of N, NH, O, and S, wherein the heteroaryl is optionally substituted with from 1-4 $R'''$;

(iv) —$C_{3-10}$ cycloalkyl wherein the cycloalkyl is optionally substituted with from 1-4 $R'''$; and (v) -5-10 membered heterocyclyl, wherein the heterocyclyl is optionally substituted with 1-4 $R'''$;

each occurrence of $R'''$ is independently selected from the group consisting of:

(i) $C_{1-8}$ alkyl substituted with 1-3 $R''$;

(ii) ($C_{0-6}$ alkylene)-$C_{3-10}$ cycloalkyl, wherein the cycloalkyl is optionally substituted with from 1-4 $R''$;

(iii) ($C_{0-6}$ alkylene)-heterocyclyl including 3-10 ring atoms, wherein 1-3 ring atoms are each independently selected from the group consisting of NH, O, and S, wherein the heterocyclyl is optionally substituted with 1-4 $R''$;

(iv) ($C_{0-6}$ alkylene)-($C_{6-10}$ aryl), wherein the aryl is optionally substituted with 1-5 $R''$; or (v) ($C_{0-6}$ alkylene)-heteroaryl including 5-10 ring atoms, wherein 1-4 ring atoms are each independently selected from the group consisting of N, NH, O, and S, wherein the heteroaryl is optionally substituted with 1-3 $R''$;

(vi) $C_{1-4}$ alkoxy optionally substituted with 1-3 $R''$;

(vii) $C_{1-4}$ haloalkoxy;

(viii) —COH;

(ix) —$CO_2R''$;

(x) —$CONR''R''$;

(xi) cyano;

(xii) —$NR''R''$;

(xiii) —$NR''C(O)NR''R''$;

(xiv) —$NR''C(O)OR''$;

(xv) —$NR''C(O)R''$;

(xvi) $C_{1-4}$ thioalkoxy;

(xvii) —$N_3$;

(xviii) —$CO_2H$;

(xix) —$C(O)R''$;

(xx) —$SO_{1-2}(R'')$;

(xxi) —$O_nP(O)_nY_2$, wherein n is independently 0 or 1, and wherein each Y is independently selected from —$OR''$ and $C_{1-6}$ alkyl;

(xxii) —SH or —$S^-$;

(xxix) $C_{2-6}$ alkenyl optionally substituted with 1-3 $R''$;

(xxx) $C_{2-6}$ alkynyl optionally substituted with 1-3 $R''$;

each occurrence of $R''$ is independently selected from the group consisting of:

(i) halo;

(ii) cyano;

(iii) $C_{1-6}$ alkyl;

(iv) $C_{2-6}$ alkenyl;

(v) $C_{2-6}$ alkynyl;

(vi) $C_{1-4}$ haloalkyl;

(vii) $C_{1-4}$ alkoxy;

(viii) $C_{1-4}$ haloalkoxy;

(ix) —($C_{0-3}$ alkylene)-$C_{3-6}$ cycloalkyl optionally substituted with 1-4 independently selected $C_{1-4}$ alkyl;

(x) —($C_{0-3}$ alkylene)-heterocyclyl including 3-10 ring atoms, wherein 1-3 ring atoms are each independently selected from the group consisting of NH, O, and S, wherein the heterocyclyl is optionally substituted with 1-4 independently selected $C_{1-4}$ alkyl;

(xi) —($C_{0-3}$ alkylene)-phenyl;

(xii) —($C_{0-3}$ alkylene)-heteroaryl including 5-10 ring atoms, wherein 1-4 ring atoms are each independently selected from the group consisting of N, NH, O, and S;

(xiii) —$S(O)_{1-2}(C_{1-4}$ alkyl); and (xiv) —$NR*R**$;

(xv) —OH;

(xvi) —$S(O)_{1-2}(NR*R**)$;

(xvii) —$C_{1-4}$ thioalkoxy;

(xviii) —$NO_2$;

(xix) —$N(R*)(C(=O)C_{1-3}$ alkyl);

(xx) —$C(=O)(C_{1-4}$ alkyl);

(xxi) —$C(=O)O(C_{1-4}$ alkyl);

(xxii) —$C(=O)OH$, and (xxiii) —$C(=O)N(R*)(R**)$; and each occurrence of $R*$ and $R**$ is independently selected from the group consisting of: H, $C_{1-4}$ alkyl, and phenyl.

In some embodiments (when the thiolate is a compound of Formula A2), $R^{10}$ is $C_{1-6}$ alkyl. In some embodiments (when the thiolate is a compound of Formula A2), $R^{10}$ is $C_{6-10}$ aryl. In some embodiments (when the thiolate is a compound of Formula A2), $R^{10}$ is phenyl.

In some embodiments (when the organic chalcogenide is a thiol or thiolate), the thiolate is ethanethiolate. In some embodiments (when the organic chalcogenide is a thiol or thiolate), the thiolate is butanethiolate. In some embodiments (when the organic chalcogenide is a thiol or thiolate), the thiolate is a dithiolate. In some embodiments (when the organic chalcogenide is a thiol or thiolate), the thiolate is 1,2-ethanedithiol, 1,3-propanedithiol, or 1,4-butanedithiol.

In some embodiments, the organic chalcogenide is a selenide. In some embodiments (when the organic chalcogenide is a selenide), the selenide is a selenide of Formula B:

wherein:

$R^{20}$ is selected from the group consisting of:

(ii) $C_{1-6}$ alkyl;

(iii) $C_{2-6}$ alkenyl;

(iv) $C_{2-6}$ alkynyl;

(v) —$C_{6-10}$ aryl;

(vi) -5-10 membered heteroaryl, wherein 1-4 ring atoms are each independently selected from the group consisting of N, NH, O, and S;

(vii) —$C_{3-10}$ cycloalkyl; and (vii) -5-10 membered heterocyclyl.

In some embodiments (when the selenide is a selenide of Formula B), $R^{20}$ is $C_{1-6}$ alkyl. In some embodiments (when the selenide is a selenide of Formula B), $R^{20}$ is $C_{6-10}$ aryl. In some embodiments (when the thiolate is a compound of Formula A2), $R^{20}$ is phenyl.

In some embodiments, the iron salt is an iron (II) salt. In some embodiments, the iron salt is an iron (III) salt. In some embodiments, the counteranion of the iron salt is a halide. In some embodiments, the iron salt is selected from the group consisting of iron (II) fluoride, iron (II) chloride, iron (II) bromide, iron (II) iodide, iron (III) fluoride, iron (III) chloride, iron (III) bromide, iron (III) iodide, iron (II) sulfate, iron (III) carbonate, iron (III) citrate, iron (II) molybdate, iron(II) nitrate iron (III) nitrate, iron (II) oxalate, iron (III) oxalate, iron (II) perchlorate, iron (III) perchlorate, iron (II) phosphate, iron (III) phosphate, iron (III) pyrophosphate, and iron (II) tetrafluoroborate, iron (II) sulfate, iron (II) carboxylate, iron (III) carboxylate, iron (II) gluconate, iron (II) acetylacetonate (acac), and hydrates thereof. In some embodiments, the iron salt is iron (II) acetate or hydrates thereof. In some embodiments, the iron salt is iron (III) acetate or hydrates thereof. In some embodiments, the iron salt is iron (II) chloride. In some embodiments, the iron salt is iron (III) chloride. In some embodiments, the iron salt is iron (II) bromide. In some embodiments, the iron salt is iron (III) bromide. In some embodiments, the iron salt is an iron-sulfur cluster.

In some embodiments, the amount of iron salt is catalytic relative to the amount of hydrogen peroxide. In some embodiments, the ratio of the iron salt to hydrogen peroxide is about 0.0001:1 to about 2:1. In some embodiments, the ratio of the iron salt to hydrogen peroxide is about 0.0001:1 to about 0.1:1. In some embodiments, the ratio of the iron salt to hydrogen peroxide is about 0.0001:1 to about 0.05:1. In some embodiments, the ratio of the iron salt to hydrogen peroxide is about 0.001:1 to about 2:1. In some embodiments, the ratio of the iron salt to hydrogen peroxide is about 0.01:1 to about 2:1. In some embodiments, the ratio of the iron salt to hydrogen peroxide is about 0.001:1 to about 0.02:1. In some embodiments, the ratio of the iron salt to hydrogen peroxide is about 0.005:1 to about 0.01:1. In some embodiments, the ratio of the iron salt to hydrogen peroxide is about 0.1:1. In some embodiments, the ratio of the iron salt to hydrogen peroxide is about 0.01:1. In some embodiments, the ratio of the iron salt to hydrogen peroxide is about 0.001:1.

In some embodiments, the amount of organic chalcogenide is catalytic relative to the peroxide. In some embodiments, the ratio of the organic chalcogenide to hydrogen peroxide is greater than about 0.001:1 and equal to or less than 0.6:1. In some embodiments, the ratio of the organic chalcogenide to hydrogen peroxide is greater than 0.001:1 and equal to or less than 2:1. In some embodiments, the ratio of the organic chalcogenide to hydrogen peroxide is greater than 0.001:1 and equal to or less than 1:1. In some embodiments, the ratio of the organic chalcogenide to hydrogen peroxide is greater than 0.001:1 and equal to or less than 0.20:1. In some embodiments, the ratio of the organic chalcogenide to hydrogen peroxide is greater than 0.1:1 and equal to or less than 0.7:1. In some embodiments, the ratio of the organic chalcogenide to hydrogen peroxide is greater than 0.14:1 and equal to or less than 0.6:1. In some embodiments, the ratio of the organic chalcogenide to hydrogen peroxide is greater than 0.15 and less than about 0.5:1. In some embodiments, the ratio of the organic chalcogenide to hydrogen peroxide is about 0.5:1. In some embodiments, the ratio of the organic chalcogenide to hydrogen peroxide is about 0.15:1.

In some embodiments, the products of the disproportion of hydrogen peroxide are oxygen and water. In some embodiments, greater than 50% of the oxygen is singlet oxygen. In some embodiments (when greater than 50% of the oxygen is singlet oxygen), greater than 90% of the oxygen is singlet oxygen. In some embodiments, the organic chalcogenide and the iron salt forms a complex that reduces the peroxide.

Definitions

As used herein, the terms "about" and "approximately" are used interchangeably, and when used to refer to modify a numerical value, encompass a range of uncertainty of the numerical value of from 0% to 10% of the numerical value.

As used herein, the singular forms "a," "an," and "the" include plural referents unless the context clearly dictates otherwise.

As used herein, "iron-thiolate complex" refers an iron (II) or (III) salt coordinated by one or more organic thiols (mercaptans) or dithiols or their deprotonated versions (thiolates or mercaptides).

As used herein, "iron-sulfur cluster" refers to a discrete cluster of iron (II) or (III) ions and inorganic sulfide (S2-); one or more of the iron ions may be additionally coordinated by thiols/thiolates.

As used herein, "nucleophilic hydride" refers to a metal or nonmetal hydride capable of transferring hydride (H—) to an electrophile.

As used herein, "organic chalcogenide" refers to a thiol, selenol, thiolate, or selenide.

As used herein, "thiol" refers to an organic compound substituted with one or more sulfhydryl groups (i.e., one or more —SH groups). Thiols include, for example, dithiolates and trithiolates, which include two or three thiols, respectively.

As used herein, "thiolate" refers to an organic compound substituted with one or more sulfide anions (i.e., one or more —S⁻ groups). Thiolates include dithiolates, which are substituted with 2 thiolate groups (i.e., two —S⁻ groups).

As used herein, "selenol" refers to an organic compound substituted with one or more —SeH groups. Selenols include, for example, diselenols, which include two —SeH groups.

As used herein, "selenide" refers to an organic compound substituted with one or more selenide anions (i.e., one or more —Se⁻ groups). Selenides include diselenides, which are substituted with 2 selenide anions (i.e., two —Se⁻ groups).

As used herein, "peroxide" refers to a compound that comprises a —O—O— moiety.

The term "halo" refers to fluoro (F), chloro (Cl), bromo (Br), or iodo (I).

The term "alkyl" refers to a hydrocarbon chain that may be a straight chain or branched chain, containing the indicated number of carbon atoms. For example, $C_{1-10}$ indicates that the group may have from 1 to 10 (inclusive) carbon atoms in it. Non-limiting examples include methyl, ethyl, iso-propyl, tert-butyl, n-hexyl.

The term "haloalkyl" refers to an alkyl, in which one or more hydrogen atoms is/are replaced with an independently selected halo.

The term "alkoxy" refers to an —O-alkyl radical (e.g., —OCH₃).

The term "alkylene" refers to a branched or unbranched divalent alkyl (e.g., —CH$_2$—).

The term "alkenyl" refers to a hydrocarbon chain that may be a straight chain or branched chain having one or more carbon-carbon double bonds. The alkenyl moiety contains the indicated number of carbon atoms. For example, C$_{2-6}$ indicates that the group may have from 2 to 6 (inclusive) carbon atoms in it.

The term "alkynyl" refers to a hydrocarbon chain that may be a straight chain or branched chain having one or more carbon-carbon triple bonds. The alkynyl moiety contains the indicated number of carbon atoms. For example, C$_{2-6}$ indicates that the group may have from 2 to 6 (inclusive) carbon atoms in it.

The term "aromatic" refers generally to a ring that includes a cyclic array of resonance-stabilized 4n+2 pi electrons, wherein n is an integer (e.g., 1 or 2). Aromatic moieties include aryl and heteroaryl groups. The term "nonaromatic" describes any moiety that does not fall within the definition of "aromatic".

The term "aryl" refers to a 6-carbon monocyclic, 10-carbon bicyclic, or 14-carbon tricyclic aromatic ring system wherein 0, 1, 2, 3, or 4 atoms of each ring may be substituted by a substituent, and wherein the ring comprising a monocyclic radical is aromatic and wherein at least one of the fused rings comprising a bicyclic or tricyclic radical is aromatic e.g. tetrahydronaphthyl. Examples of aryl groups also include phenyl, naphthyl and the like.

The term "cycloalkyl" as used herein includes saturated cyclic hydrocarbon groups having 3 to 10 carbons, preferably 3 to 8 carbons, and more preferably 3 to 6 carbons, wherein the cycloalkyl group may be optionally substituted. Preferred cycloalkyl groups include, without limitation, cyclopropyl, cyclobutyl, cyclopentyl, cyclopentenyl, cyclohexyl, cyclohexenyl, cycloheptyl, and cyclooctyl. The term "cycloalkylene" as used herein refers to divalent cycloalkyl.

The term "heteroaryl" refers to an aromatic 5-8 membered monocyclic, 8-12 membered bicyclic, or 11-14 membered tricyclic ring system having 1-3 heteroatoms if monocyclic, 1-6 heteroatoms if bicyclic, or 1-9 heteroatoms if tricyclic, said heteroatoms selected from O, N, or S (e.g., carbon atoms and 1-3, 1-6, or 1-9 heteroatoms of N, O, or S if monocyclic, bicyclic, or tricyclic, respectively), wherein 0, 1, 2, 3, or 4 atoms of each ring may be substituted by a substituent, and wherein the ring comprising a monocyclic radical is aromatic and wherein at least one of the fused rings comprising a bicyclic or tricyclic radical is aromatic (but does not have to be a ring which contains a heteroatom, e.g. tetrahydroisoquinolinyl. Examples of heteroaryl groups also include pyridyl, furyl or furanyl, imidazolyl, benzimidazolyl, pyrimidinyl, thiophenyl or thienyl, quinolinyl, indolyl, thiazolyl, and the like.

The term "heterocyclyl" refers to a nonaromatic 5-8 membered monocyclic, 8-12 membered bicyclic, or 11-14 membered tricyclic ring system having 1-3 heteroatoms if monocyclic, 1-6 heteroatoms if bicyclic, or 1-9 heteroatoms if tricyclic, said heteroatoms selected from O, N, or S (e.g., carbon atoms and 1-3, 1-6, or 1-9 heteroatoms of N, O, or S if monocyclic, bicyclic, or tricyclic, respectively), wherein 0, 1, 2 or 3 atoms of each ring may be substituted by a substituent. Examples of heterocyclyl groups include piperazinyl, pyrrolidinyl, dioxanyl, morpholinyl, tetrahydrofuranyl, and the like. The term "heterocycloalkylene" refers to divalent heterocyclyl.

The details of one or more embodiments of the invention are set forth in the description below. Other features and advantages of the invention will be apparent from the description and drawings, and from the claims.

DETAILED DESCRIPTION

Figure 1:
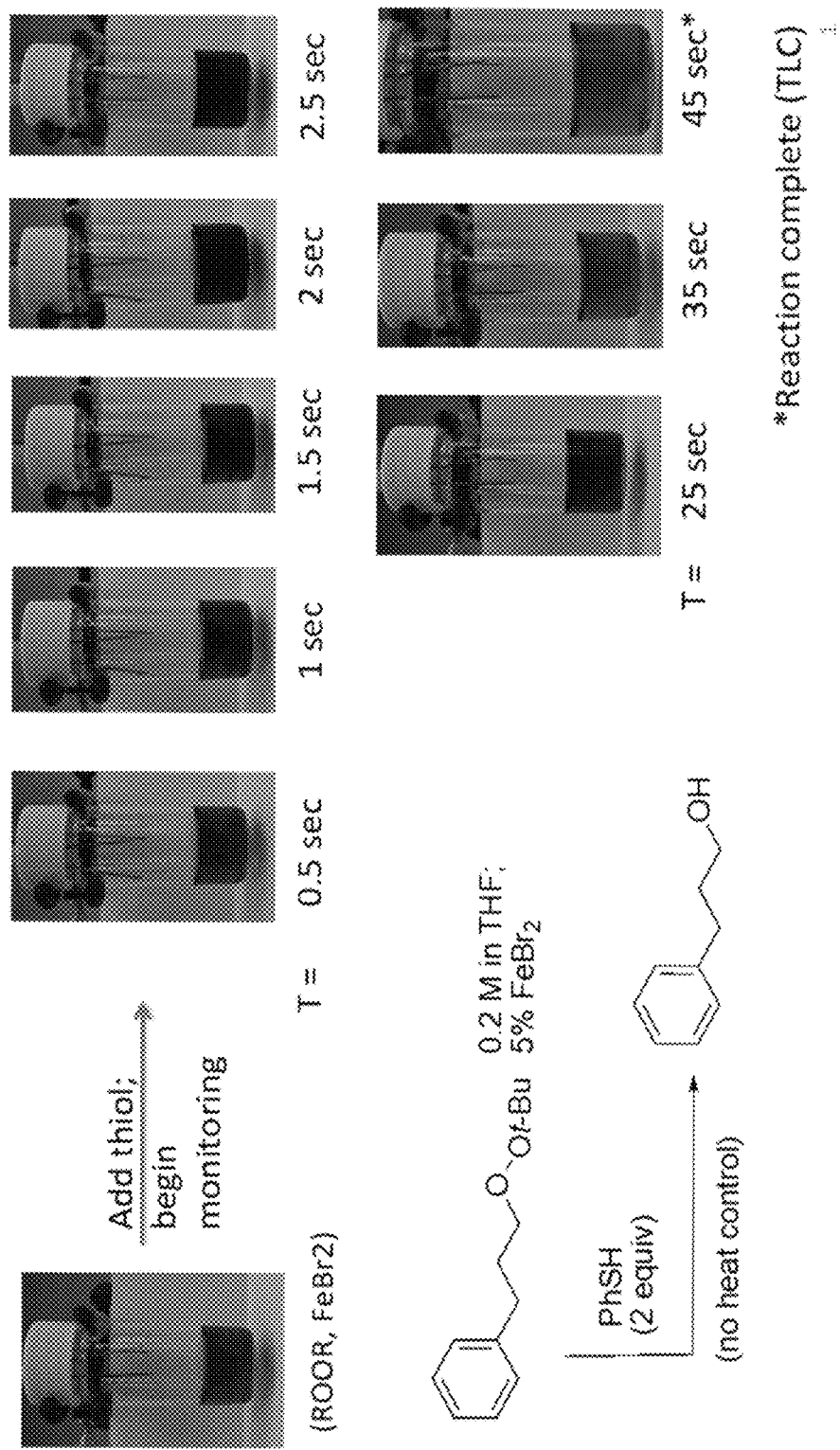
FIG. 1 depicts time-lapse photographs of a reduction reaction after addition of a thiol to the reaction.

Highly activated peroxides (e.g., peresters, diacyl peroxides, and ozonides) are cleaved by nucleophiles and reducing agents with relative ease. Unhindered dialkyl peroxides require more vigorous conditions, such as electrochemical reduction, hydrogenation, treatment with NaI/acid, or reaction with metal hydrides or phosphines. Hindered peroxides, including bi-t-alkyl peroxides are inert to many common reducing agents (e.g., Bu$_3$P or Zn/HOAc) but can be reduced by extremely strong reducing systems such as Mg/MeOH, HI, or NaI in refluxing HOAc/HCl. Ferrous (Fe$^{+2}$) ions, although capable of cleaving activated peroxides at room temperature, appear to only reduce bulky peroxides at elevated temperatures commensurate with peroxide thermolysis.

Little is known about the reduction of peroxides that have non-H moieties on both peroxide oxygens (e.g., dialkyl peroxides) using organic chalcogenides (e.g., thiolates or selenides). Thiolates have been reported to cleave dialkyl peroxides but under relatively harsh conditions that may, in some cases, lead to base-promoted fragmentations of some of the substrates. The reactivity of iron towards peroxides displays similarly undesirable outcomes. Ferrous iron rapidly cleaves hydrogen peroxide (also known as the Fenton reaction), alkyl hydroperoxides, and dialkyl peroxides activated by strain or electronics. Fe-promoted activation of unhindered dialkyl peroxides has also been described, but these reactions are frequently conducted under conditions (very high temperature) where significant amounts of peroxide O—O scission through radical thermolysis in the absence of metal occurs. There are no known reagents understood to reductively cleave both unhindered and hindered peroxides rapidly and under mild conditions; nor are there iron-catalyzed methods of cleaving hydrogen peroxide.

It has been demonstrated that reactivity of organic chalcogenides towards peroxides in the absence of iron salts displays characteristics similar to many other nucleophiles and/or reducing agents. For example, reactions are complete within 30 min at room temperature for activated and/or unhindered peroxides but either slow down (for example, reaction times of days) or fail altogether for more hindered substrates. The reactions require base, making it clear that the actual nucleophile or reducing agent is a thiolate. However, the rate of reaction between thiophenol and peroxides is relatively insensitive to base strength (KOtBu vs. Et$_3$N) or the use of protic (ethanol) or aprotic (tetrahydrofuran) solvents. However, as before, the dialkyl peroxides and the acetone peroxides were inert (no reaction observed after greater than 24 hours) towards room temperature reaction with thiolates or selenides.

Herein is disclosed a method of reducing peroxides (including sterically hindered peroxides) using an organic chalcogenide in conjunction with an iron salt. Equation 1 shows that the complexes formed from the combination of (1) iron salts; and (2) stoichiometric thiols or thiolates generates a complex capable of catalyzing the reduction of the sterically hindered peroxide depicted in equation 1 by stoichiometric reagents under very mild conditions. It is understood that selenols and selenides, owing to their similar reactivity profile, can be used in place of thiols and thiolates.

(equation 1)

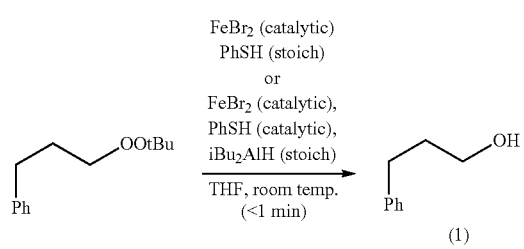

Without being bound by any theory, the enhanced reactivity of the combination of iron salts and thiols suggests the formation of a complex more reactive than either precursor individually (see equation 2). It is believed that a similar complex is formed with other organic chalcogenides, such as selenols.

(equation 2)

The Fe/thiol-promoted reductions display a number of features: (1) the active species can be regenerated by thiolate or hydride; (2) decomposition of a dialkyl peroxide requires only 1 equivalent of thiol or hydride; and (3) the reductions of dialkyl peroxides are considerably less exothermic than what would be predicted by bond energies for a two-proton, two-electron reduction (equation 3).

(equation 3)

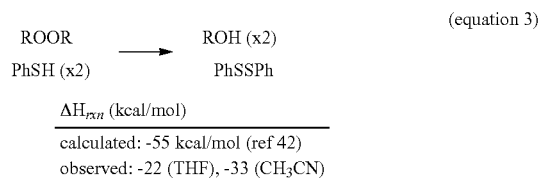

The intermediacy of alkoxy radicals is strongly supported by the products derived from cleavage of probe molecule 9 (Scheme 1). The greater yield of acetone (87%) compared with 2-methyl-1-phenyl-2-propanol (14%) indicates that unimolecular scission of the alkoxide radical is more rapid than bimolecular trapping by thiol. The preferential capture of the resulting benzyl radical to form thioether versus toluene suggests that the released carbon radical reacts more rapidly with catalyst than with thiol.

Scheme 1. Evidence for an Alkoxy Radical Intermediate.

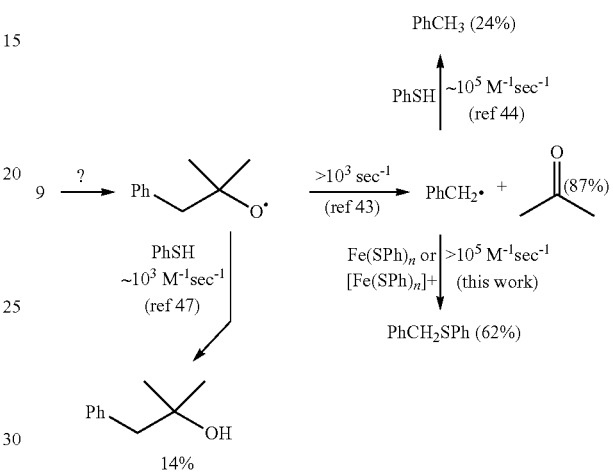

Without being bound by any theory, one plausible mechanism is illustrated in Scheme 2. For example, interaction of the peroxide with the iron/thiolate complex results in Fenton-type cleavage of the peroxide to form (1) an oxidized iron complex; (2) an alkoxide, which can be protonated by thiol; and (3) an alkoxy radical, which can undergo reduction by transfer of hydrogen atom from a thiol or solvent. Recharging of the complex by exogenous thiol or by consumption of one of the radical intermediates sets up another catalytic cycle.

Scheme 2. Proposed mechanism for reduction by iron/thiol in the presence of stoichiometric thiol (illustrated for thiophenol).

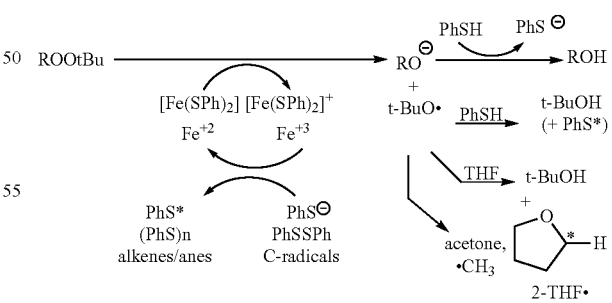

The mechanism for Fe/thiolate catalyzed reduction of a peroxide by added metal hydride involves a similar set of steps and intermediates based upon an iron complex containing both thiol and hydride (Scheme 3); in this case, the oxidized iron complex can undergo reaction with hydride or one of the radical intermediates to regenerate active catalyst.

Scheme 3. Proposed mechanism for Fe/thiol catalyzed reduction by eternal hydride (illustrated for diisobutyl aluminum hydride)

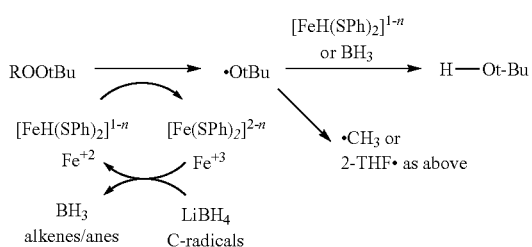

Without being bound by any theory, the ability of the Fe/thiol complexes to catalyze the rapid decomposition of DADP suggests the formation of an intermediate that is able to give up electrons to the oxidized complex (scheme 4a). This, in conjunction with the observation of acetone as the only organic product and the extremely limited amount of heat generated by this reduction, suggests a mechanism initiated by Fenton-type cleavage of one of the two peroxides, followed by loss of acetone, to generate a transiently masked form of an Fe(III)-peroxyl (Scheme 4a). Loss of oxygen then regenerates the Fe(II) species. Reaction calorimetry for the catalytic decomposition of diacetone diperoxide (DADP) by catalytic amounts of iron/thiolate yields a heat of reaction consistent with the indicated mechanism.

Without being bound by any theory, the ability of the Fe/thiol complexes to catalyze the rapid decomposition of hydrogen peroxide suggests a highly efficient version of the Haber-Weiss cycle (Scheme 4b).

The reactivity of dialkyl peroxides towards thiolate or selenide nucleophiles varies significantly depending upon the presence or absence of steric bulk and/or activating groups. In contrast, the combination of coordinatively unsaturated Fe salts and thiolates is able to reduce all but the most hindered of peroxides, demonstrating the intermediacy of a RS—Fe species much more reactive than either the thiolate or the iron salt. In preliminary thermochemical experiments, it was found that the Fe/thiolate promoted cleavage of dialkyl peroxide 4 (see Scheme 5) by stoichiometric thiol gives a heat of reaction much lower than would be anticipated based upon a classic two-electron reduction.

The ability to achieve a mild decomposition in the presence of solvent capable of absorbing some of the heat of reaction is an advantage, particularly given the reduced sensitivity of peroxide explosives reported after these peroxides have been wetted with water, solvents, or oils. Moreover, in preliminary thermochemical experiments, it was found that the heat liberated during Fe/thiolate cleavage of dialkyl peroxide 4 in the presence of stoichiometric thiol is approximately half what would be anticipated based upon a classic two-electron reduction, The substantial kinetic barriers to nucleophilic or reductive cleavage of hindered peroxides have negative practical consequences. For example, the low reactivity of diacetone diperoxide towards traditional reductants increases the challenge of remediating sites contaminated with this friction-sensitive high explosive. The disclosed method directly addresses these challenges by providing a broadly effective method for the rapid decomposition of organic peroxides under mild conditions.

Disclosed herein is a method of decomposing a peroxide, comprising combining:
an organic chalcogenide;
an optional reductant;
an iron salt; and
the peroxide.

Scheme 4.

a) Catalyzed-decomposition of diacetone diperoxide (DADP)

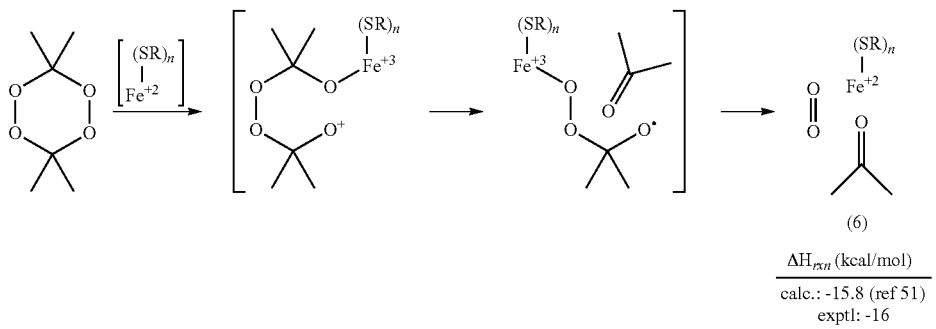

$\Delta H_{rxn}$ (kcal/mol)

calc.: -15.8 (ref 51)
exptl: -16 b) Catalyzed decomposition of $H_2O_2$.

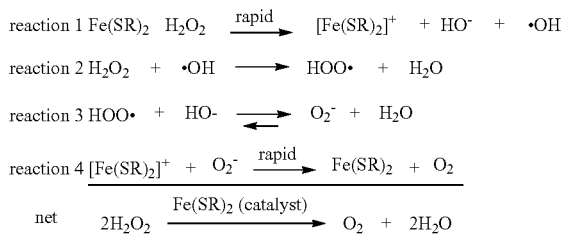

In some embodiments, decomposing the peroxide comprises reducing the peroxide.

In some embodiments, decomposing the peroxide comprises disproportionating the peroxide.

In some embodiments, the optional reductant is present when the amount of organic chalcogenide is not stoichiometric relative to the peroxide.

In some embodiments, the peroxide is an optionally substituted hydroperoxide (i.e., a peroxide in which a hydrogen is bonded to one oxygen of the —O—O— moiety, and another optionally substituted group is bonded to the other oxygen of the —O—O— moiety).

In some embodiments, the peroxide is an optionally substituted dialkyl peroxide (i.e., a peroxide in which an optionally substituted alkyl moiety is bonded to one oxygen of the —O—O— moiety, and another optionally substituted alkyl moiety is bonded to the other oxygen of the —O—O— moiety). In some embodiments, at least one alkyl group that is bonded to an oxygen of the —O—O— moiety is substituted on the carbon atom of the alkyl group that is bonded to the oxygen.

In some embodiments, the peroxide has a molecular weight of about 34 g/mol to about 2000 g/mol. In some embodiments, the peroxide has a molecular weight of about 34 g/mol to about 500 g/mol. In some embodiments, the peroxide has a molecular weight of about 100 g/mol to about 2000 g/mol. In some embodiments, the peroxide has a molecular weight of about 140 g/mol to about 270 g/mol. In some embodiments, the peroxide has a molecular weight of about 100 g/mol to about 300 g/mol.

In some embodiments, the peroxide is a peroxide of Formula I:

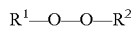
(Formula I)

wherein:
each of $R^1$ and $R^2$ is independently selected from the group consisting of:
(i) hydrogen;
(ii) $C_{1-10}$ alkyl optionally substituted with 1-4 $R^a$;
(iii) $C_{3-10}$ alkenyl optionally substituted with 1-4 $R^a$;
(iv) $C_{3-10}$ alkynyl optionally substituted with 1-4 $R^a$;
(v) $C_{6-10}$ aryl optionally substituted with 1-4 $R^a$;
(vi) 5-10 membered heteroaryl including 5-10 ring atoms, wherein 1-4 ring atoms are each independently selected from the group consisting of N, NH, O, and S, wherein the heteroaryl is optionally substituted with 1-4 $R^a$;
(vii) $C_{3-10}$ cycloalkyl that is optionally substituted with 1-4 $R^a$;
(vii) 5-10 membered heterocyclyl including 3-10 ring atoms, wherein 1-3 ring atoms are each independently selected from the group consisting of N, NH and O, wherein the heterocyclyl is optionally substituted with 1-4 $R^a$;
(viii) —C(O)$R^b$;
(ix) —CO$_2R^b$;
(x) —Si(R')$_3$;
each occurrence of $R^a$ is independently selected from the group consisting of:
(i) $C_{1-8}$ alkyl substituted with 1-3 $R^b$;
(ii) ($C_{0-6}$ alkylene)-$C_{3-10}$ cycloalkyl, wherein the cycloalkyl is optionally substituted with from 1-4 $R^b$;
(iii) ($C_{0-6}$ alkylene)-heterocyclyl including 3-10 ring atoms, wherein 1-3 ring atoms are each independently selected from the group consisting of NH, O, and S, wherein the heterocyclyl is optionally substituted with 1-4 $R^b$;
(iv) ($C_{0-6}$ alkylene)-($C_{6-10}$ aryl), wherein the aryl is optionally substituted with 1-5 $R^b$; or (v) ($C_{0-6}$ alkylene)-heteroaryl including 5-10 ring atoms, wherein 1-4 ring atoms are each independently selected from the group consisting of N, NH, O, and S, wherein the heteroaryl is optionally substituted with 1-3 $R^b$;
(vi) $C_{1-4}$ alkoxy optionally substituted with 1-3 $R^b$;
(vii) $C_{1-4}$ haloalkoxy;
(viii) —COH;
(ix) —CO$_2R^b$;
(x) —CONR$^bR^b$;
(xi) cyano;
(xii) —NR$^bR^b$;
(xiii) —NR$^b$C(O)NR$^bR^b$;
(xiv) —NR$^b$C(O)OR$^b$;
(xv) —NR$^b$C(O)R$^b$;
(xvi) $C_{1-4}$ thioalkoxy;
(xvii) —N$_3$;
(xviii) —CO$_2$H;
(xix) —C(O)R$^b$;
(xx) —SO$_{1-2}$(R$^b$);
(xxi) —O$_n$P(O)$_n$Y$_2$, wherein n is independently 0 or 1, and wherein each Y is independently selected from —OR$^b$ and $C_{1-6}$ alkyl;
(xxii) —O—O—R$^c$;
(xxiii) —(O—O—CH$_2$CH$_2$)$_m$—O—OR''', wherein m is an integer from 1-1000; and
alternatively, any two $R^a$, taken together with the atoms they are bonded to and any atoms that intervene the atoms they are bonded to, form a ring selected from:
(i) a $C_{3-10}$ cycloalkyl, wherein the a $C_{3-10}$ cycloalkyl is optionally substituted with 1-6 $R^b$;
(ii) a 5-10-membered heterocyclyl comprising 1-6 heteroatoms selected O, S, and N, wherein the heterocyclyl is optionally substituted with 1-6 $R^b$;
(iii) a $C_{6-10}$ aryl, wherein the aryl is optionally substituted with 1-6 $R^b$; and
(iv) a 5-10 membered heteroaryl comprising 1-6 heteroatoms selected O, S, and N, wherein the heteroaryl is optionally substituted with 1-6 $R^b$; and
5-10-membered heterocyclyl comprising 1-6 heteroatoms selected O, S, and N, wherein the heterocyclyl is optionally substituted with 1-6 $R^b$;
each occurrence of $R^b$ is independently selected from the group consisting of:
(i) halo;
(ii) cyano;
(iii) $C_{1-6}$ alkyl;
(iv) $C_{2-6}$ alkenyl;
(v) $C_{2-6}$ alkynyl;
(vi) $C_{1-4}$ haloalkyl;
(vii) $C_{1-4}$ alkoxy;
(viii) $C_{1-4}$ haloalkoxy;
(ix) —($C_{0-3}$ alkylene)-$C_{3-6}$ cycloalkyl optionally substituted with 1-4 independently selected $C_{1-4}$ alkyl;
(x) —($C_{0-3}$ alkylene)-heterocyclyl including 3-10 ring atoms, wherein 1-3 ring atoms are each independently selected from the group consisting of NH, O, and S, wherein the heterocyclyl is optionally substituted with 1-4 independently selected $C_{1-4}$ alkyl;
(xi) —($C_{0-3}$ alkylene)-phenyl;
(xii) —($C_{0-3}$ alkylene)-heteroaryl including 5-10 ring atoms, wherein 1-4 ring atoms are each independently selected from the group consisting of N, NH, O, and S;
(xiii) —S(O)$_{1-2}$($C_{1-4}$ alkyl); and
(xiv) —NR'R'';
(xv) —OH;
(xvi) —S(O)$_{1-2}$(NR'R'');
(xvii) —$C_{1-4}$ thioalkoxy;

(xviii) —NO$_2$;
(xix) —N(R')(C(=O)C$_{1-3}$ alkyl);
(xx) —C(=O)(C$_{1-4}$ alkyl);
(xxi) —C(=O)O(C$_{1-4}$ alkyl);
(xxii) —C(=O)OH, and
(xxiii) —C(=O)N(R')(R"); and alternatively, any two R$^b$, taken together with the atoms they are bonded to and any atoms that intervene the atoms they are bonded to, form a ring selected from:

(i) a C$_{3-10}$ cycloalkyl, wherein the a C$_{3-10}$ cycloalkyl is optionally substituted with 1-6 R$^d$;

(ii) a 5-10-membered heterocyclyl comprising 1-6 heteroatoms selected O, S, and N, wherein the heterocyclyl is optionally substituted with 1-6 R$^d$;

(iii) a C$_{6-10}$ aryl, wherein the aryl is optionally substituted with 1-6 R$^d$; and (iv) a 5-10 membered heteroaryl comprising 1-6 heteroatoms selected O, S, and N, wherein the heteroaryl is optionally substituted with 1-6 R$^d$; and 5-10-membered heterocyclyl comprising 1-6 heteroatoms selected O, S, and N, wherein the heterocyclyl is optionally substituted with 1-6 R$^d$;

each occurrence of R$^c$ is independently selected from the group consisting of:
(i) hydrogen;
(ii) C$_{1-10}$ alkyl optionally substituted with 1-4 R$^d$;
(iii) C$_{3-10}$ alkenyl optionally substituted with 1-4 R$^d$;
(iv) C$_{3-10}$ alkynyl optionally substituted with 1-4 R$^d$;
(v) C$_{6-10}$ aryl optionally substituted with 1-4 R$^d$;
(vi) 5-10 membered heteroaryl including 5-10 ring atoms, wherein 1-4 ring atoms are each independently selected from the group consisting of N, NH, O, and S, wherein the heteroaryl is optionally substituted with 1-4 R$^d$;
(vii) C$_{3-10}$ cycloalkyl that is optionally substituted with 1-4 R$^d$;
(vii) 5-10 membered heterocyclyl including 3-10 ring atoms, wherein 1-3 ring atoms are each independently selected from the group consisting of N, NH and O, wherein the heterocyclyl is optionally substituted with 1-4 R$^d$;
(viii) —C(O)R$^b$;
(ix) —CO$_2$R$^b$; and
(x) —Si(R')$_3$;

each occurrence of R$^d$ is independently selected from the group consisting of:
(i) C$_{1-8}$ alkyl substituted with 1-3 R$^b$;
(ii) (C$_{0-6}$ alkylene)-C$_{3-10}$ cycloalkyl, wherein the cycloalkyl is optionally substituted with from 1-4 R$^b$;
(iii) (C$_{0-6}$ alkylene)-heterocyclyl including 3-10 ring atoms, wherein 1-3 ring atoms are each independently selected from the group consisting of NH, O, and S, wherein the heterocyclyl is optionally substituted with 1-4 R$^b$;
(iv) (C$_{0-6}$ alkylene)-(C$_{6-10}$ aryl), wherein the aryl is optionally substituted with 1-5 R$^b$; or
(v) (C$_{0-6}$ alkylene)-heteroaryl including 5-10 ring atoms, wherein 1-4 ring atoms are each independently selected from the group consisting of N, NH, O, and S, wherein the heteroaryl is optionally substituted with 1-3 R$^b$;
(vi) C$_{1-4}$ alkoxy optionally substituted with 1-3 R$^b$;
(vii) C$_{1-4}$ haloalkoxy;
(viii) —COH;
(ix) —CO$_2$R$^b$;
(x) —CONR$^b$R$^b$;
(xi) cyano;
(xii) —NR$^b$R$^b$;
(xiii) —NR$^b$C(O)NR$^b$R$^b$;
(xiv) —NR$^b$C(O)OR$^b$;
(xv) —NR$^b$C(O)R$^b$;
(xvi) C$_{1-4}$ thioalkoxy;
(xvii) —N$_3$;
(xviii) —CO$_2$H;
(xix) —C(O)R$^b$;
(xx) —SO$_{1-2}$(R$^b$); and
(xxi) —O$_n$P(O)$_n$Y$_2$, wherein n is independently 0 or 1, and wherein each Y is independently selected from —OR$^b$ and C$_{1-6}$ alkyl; and each occurrence of R', R", and R'" is independently selected from the group consisting of: H, C$_{1-4}$ alkyl, and phenyl; or, if R' and R" are bonded to the same atom, R' and R" together with the atom to which each is attached forms a ring including 3-8 ring atoms, wherein the ring includes: (a) 1-7 ring carbon atoms; and (b) 0-3 ring heteroatoms (in addition to the atom attached to R' and R"), which are each independently selected from the group consisting of N, NH, O, and S;

alternatively, R$^1$ and R$^2$, taken together with the oxygen atoms they are bonded to, form a 5-10-membered heterocyclyl comprising 1-6 heteroatoms selected from O, S, and N, wherein the heterocyclyl is optionally substituted with 1-6 R$^a$; and provided that when one of R$^1$ and R$^2$ is hydrogen, the other of R$^1$ and R$^2$ is not hydrogen; and provided that a —O—O— moiety is not bonded to a carbon that is double bonded to another carbon or triple-bonded to another carbon.

In each occurrence of C$_{3-10}$ alkenyl, all carbon atoms that are double-bonded to another carbon are not bonded to any —O—O— moiety.

In each occurrence of C$_{3-10}$ alkynyl, all carbon atoms that are double-bonded to another carbon are not bonded to any —O—O— moiety.

In some embodiments, R$^1$ is (i) hydrogen.

In some embodiments, R$^1$ is (ii) C$_{1-6}$ alkyl optionally substituted with 1-3 R$^a$.

In some embodiments, R$^1$ is (ii) C$_{1-6}$ alkyl substituted with 1-3 R$^a$, wherein at least 1 R$^a$ is on the carbon of the C$_{1-6}$ alkyl bonded to an O of the —O—O— moiety of Formula I.

In some embodiments, R$^1$ is (ii) C$_{1-6}$ alkyl optionally substituted with 1-3 R$^a$, wherein the C$_{1-6}$ alkyl is branched at the carbon of the C$_{1-6}$ alkyl bonded to an O of the —O—O— moiety of Formula I.

In some embodiments, R$^1$ is unsubstituted C$_{1-6}$ alkyl.

In some embodiments, R$^1$ is 2-propyl.

In some embodiments, R$^1$ is t-butyl.

In some embodiments, R$^1$ is selected from:
(v) —C$_{6-10}$ aryl optionally substituted with 1-3 R$^a$;
(vi) -5-10 membered heteroaryl including 5-10 ring atoms, wherein 1-4 ring atoms are each independently selected from the group consisting of N, NH, O, and S, wherein the heteroaryl is optionally substituted with 1-3 R$^a$;
(vii) —C$_{3-10}$ cycloalkyl that is optionally substituted with 1-4 R$^a$; and
(vii) -5-10 membered heterocyclyl including 3-10 ring atoms, wherein 1-3 ring atoms are each independently selected from the group consisting of N, NH and O, wherein the heterocyclyl is optionally substituted with 1-4 R$^a$.

In some embodiments, R$^1$ is selected from:
(v) —C$_{6-10}$ aryl substituted with 1-3 R$^a$;
(vi) -5-10 membered heteroaryl including 5-10 ring atoms, wherein 1-4 ring atoms are each independently selected from the group consisting of N, NH, O, and S, wherein the heteroaryl is substituted with 1-3 R$^a$;
(vii) —C$_{3-10}$ cycloalkyl that is substituted with 1-4 R$^a$; and (vii) -5-10 membered heterocyclyl including 3-10 ring atoms, wherein 1-3 ring atoms are each independently selected from the group consisting of N, NH and O, wherein the heterocyclyl is substituted with 1-4 $R^a$; and wherein at least 1 $R^a$ is on the position of the —$C_{6-10}$ aryl, -5-10 membered heteroaryl, —$C_{3-10}$ cycloalkyl, or -5-10 membered heterocyclyl that is ortho to the position of the —$C_{6-10}$ aryl, -5-10 membered heteroaryl, —$C_{3-10}$ cycloalkyl, or -5-10 membered heterocyclyl that is bonded to an O of the —O—O— moiety of Formula I.

In some embodiments, $R^2$ is 2-propyl.
In some embodiments, $R^2$ is t-butyl.
In some embodiments, $R^2$ is selected from:
(v) —$C_{6-10}$ aryl optionally substituted with 1-3 $R^a$;
(vi) -5-10 membered heteroaryl including 5-10 ring atoms, wherein 1-4 ring atoms are each independently selected from the group consisting of N, NH, O, and S, wherein the heteroaryl is optionally substituted with 1-3 $R^a$;
(vii) —$C_{3-10}$ cycloalkyl that is optionally substituted with 1-4 $R^a$; and
(vii) -5-10 membered heterocyclyl including 3-10 ring atoms, wherein 1-3 ring atoms are each independently selected from the group consisting of N, NH and O, wherein the heterocyclyl is optionally substituted with 1-4 $R^a$.

The method of any one of claims 12-21, wherein $R^2$ is selected from:
(v) —$C_{6-10}$ aryl substituted with 1-3 $R^a$;
(vi) -5-10 membered heteroaryl including 5-10 ring atoms, wherein 1-4 ring atoms are each independently selected from the group consisting of N, NH, O, and S, wherein the heteroaryl is substituted with 1-3 $R^a$;
(vii) —$C_{3-10}$ cycloalkyl that is substituted with 1-4 $R^a$; and
(vii) -5-10 membered heterocyclyl including 3-10 ring atoms, wherein 1-3 ring atoms are each independently selected from the group consisting of N, NH and O, wherein the heterocyclyl is substituted with 1-4 $R^a$; and wherein at least 1 $R^a$ is on the position of the —$C_{6-10}$ aryl, -5-10 membered heteroaryl, —$C_{3-10}$ cycloalkyl, or -5-10 membered heterocyclyl that is ortho to the position of the —$C_{6-10}$ aryl, -5-10 membered heteroaryl, —$C_{3-10}$ cycloalkyl, or -5-10 membered heterocyclyl that is bonded to an O of the —O—O— moiety of Formula I.

In some embodiments, $R^1$ and $R^2$, taken together with the oxygen atoms they are bonded to, form a ring selected from:
(i) a $C_{3-10}$ cycloalkyl, wherein the a $C_{3-10}$ cycloalkyl is optionally substituted with 1-6 $R^a$;
(ii) a 5-7-membered heterocyclyl comprising 1-6 heteroatoms selected from O, S, and N, wherein the heterocyclyl is optionally substituted with 1-6 $R^a$;
(iii) a $C_{6-10}$ aryl, wherein the aryl is optionally substituted with 1-6 $R^a$; and
(iv) a 5-10 membered heteroaryl comprising 1-6 heteroatoms selected from O, S, and N, wherein the heteroaryl is optionally substituted with 1-6 $R^a$.

In some embodiments, $R^1$ and $R^2$, taken together with the oxygen atoms they are bonded to, form a 5-10-membered heterocyclyl comprising 1-6 heteroatoms selected from O, S, and N, wherein the heterocyclyl is optionally substituted with 1-6 $R^a$.

In some embodiments, the peroxide is a 3,3,6,6,9,9-hexamethyl-1,2,4,5,7,9-hexaoxanonane (e.g., triacetone triperoxide). In some embodiments, the peroxide is a 1,2,4,5-tetroane (e.g., diacetone triperoxide). In some embodiments, the peroxide is a 1,2,4-trioxolane (ozonides), 1,2-dioxolane, and 1,2,4-trioxane. In some embodiments, the peroxide is tert-butyl peroxyneodecanoate or tert-butyl peroxypivalate. In some embodiments, the peroxide is di(3,5,5-trimethylhexanoyl) peroxide. In some embodiments, the peroxide is di(4-tert-butylcyclohexyl) peroxydicarbonate. In some embodiments, wherein the peroxide is 2,5-dihydroperoxy-2,5-dimethylhexane, 1,1-di(tert-butylperoxy)-3,3,5-trimethylcyclohexane, 2,2-di(tert-butylperoxy)butane, or 1,1-cyclohexanediyl dihydroperoxide.

In some embodiments, the peroxide is t-butyl hydroperoxide. In some embodiments, the organic chalcogenide is a thiol or thiolate.

In some embodiments, the thiol is a compound of Formula A1:

wherein:
$R^{10}$ is selected from the group consisting of:
(i) $C_{1-6}$ alkyl optionally substituted with from 1-4 $R^m$;
(ii) —$C_{6-10}$ aryl optionally substituted with from 1-4 $R^m$;
(iii) -5-10 membered heteroaryl, wherein 1-4 ring atoms are each independently selected from the group consisting of N, NH, O, and S, wherein the heteroaryl is optionally substituted with from 1-4 $R^m$;
(iv) —$C_{3-10}$ cycloalkyl wherein the cycloalkyl is optionally substituted with from 1-4 $R^m$; and
(v) -5-10 membered heterocyclyl, wherein the heterocyclyl is optionally substituted with 1-4 $R^m$;

each occurrence of $R^m$ is independently selected from the group consisting of:
(i) $C_{1-8}$ alkyl substituted with 1-3 $R^n$;
(ii) ($C_{0-6}$ alkylene)-$C_{3-10}$ cycloalkyl, wherein the cycloalkyl is optionally substituted with from 1-4 $R^n$;
(iii) ($C_{0-6}$ alkylene)-heterocyclyl including 3-10 ring atoms, wherein 1-3 ring atoms are each independently selected from the group consisting of NH, O, and S, wherein the heterocyclyl is optionally substituted with 1-4 $R^n$;
(iv) ($C_{0-6}$ alkylene)-($C_{6-10}$ aryl), wherein the aryl is optionally substituted with 1-5 $R^n$; or
(v) ($C_{0-6}$ alkylene)-heteroaryl including 5-10 ring atoms, wherein 1-4 ring atoms are each independently selected from the group consisting of N, NH, O, and S, wherein the heteroaryl is optionally substituted with 1-3 $R^n$;
(vi) $C_{1-4}$ alkoxy optionally substituted with 1-3 $R^n$;
(vii) $C_{1-4}$ haloalkoxy;
(viii) —COH;
(ix) —$CO_2R^n$;
(x) —$CONR^nR^n$;
(xi) cyano;
(xii)
(xiii) —$NR^nC(O)NR^nR^n$;
(xiv) —$NR^nC(O)OR^n$;
(xv) —$NR^nC(O)R^n$;
(xvi) $C_{1-4}$ thioalkoxy;
(xvii) —$N_3$;
(xviii) —$CO_2H$;
(xix) —$C(O)R^n$;
(xx) —$SO_{1-2}(R^n)$;
(xxi) —$O_nP(O)_nY_2$, wherein n is independently 0 or 1, and wherein each Y is independently selected from —$OR^n$ and $C_{1-6}$ alkyl;
(xxii) —SH or —$S^-$;
(xxix) $C_{2-6}$ alkenyl optionally substituted with 1-3 $R^n$;
(xxx) $C_{2-6}$ alkynyl optionally substituted with 1-3 $R^n$;
each occurrence of $R^n$ is independently selected from the group consisting of:
(i) halo;
(ii) cyano;
(iii) $C_{1-6}$ alkyl;

(iv) $C_{2-6}$ alkenyl;
(v) $C_{2-6}$ alkynyl;
(vi) $C_{1-4}$ haloalkyl;
(vii) $C_{1-4}$ alkoxy;
(viii) $C_{1-4}$ haloalkoxy;
(ix) —($C_{0-3}$ alkylene)-$C_{3-6}$ cycloalkyl optionally substituted with 1-4 independently selected $C_{1-4}$ alkyl;
(x) —($C_{0-3}$ alkylene)-heterocyclyl including 3-10 ring atoms, wherein 1-3 ring atoms are each independently selected from the group consisting of NH, O, and S, wherein the heterocyclyl is optionally substituted with 1-4 independently selected $C_{1-4}$ alkyl;
(xi) —($C_{0-3}$ alkylene)-phenyl;
(xii) —($C_{0-3}$ alkylene)-heteroaryl including 5-10 ring atoms, wherein 1-4 ring atoms are each independently selected from the group consisting of N, NH, O, and S;
(xiii) —S(O)$_{1-2}$($C_{1-4}$ alkyl); and
(xiv) —NR*R**;
(xv) —OH;
(xvi) —S(O)$_{1-2}$(NR*R**);
(xvii) —$C_{1-4}$ thioalkoxy;
(xviii) —NO$_2$;
(xix) —N(R*)(C(═O)$C_{1-3}$ alkyl);
(xx) —C(═O)($C_{1-4}$ alkyl);
(xxi) —C(═O)O($C_{1-4}$ alkyl);
(xxii) —C(═O)OH, and
(xxiii) —C(═O)N(R*)(R**); and
each occurrence of R* and R** is independently selected from the group consisting of: H, $C_{1-4}$ alkyl, and phenyl.

In some embodiments, the thiolate is a compound of Formula A2:

$R^{10}$—S$^-$ wherein:
$R^{10}$ is selected from the group consisting of:
(i) $C_{1-6}$ alkyl optionally substituted with from 1-4 $R^m$;
(ii) —$C_{6-10}$ aryl optionally substituted with from 1-4 $R^m$;
(iii) -5-10 membered heteroaryl, wherein 1-4 ring atoms are each independently selected from the group consisting of N, NH, O, and S, wherein the heteroaryl is optionally substituted with from 1-4 $R^m$;
(iv) —$C_{3-10}$ cycloalkyl wherein the cycloalkyl is optionally substituted with from 1-4 $R^m$; and
(v) -5-10 membered heterocyclyl, wherein the heterocyclyl is optionally substituted with 1-4 $R^m$;
each occurrence of $R^m$ is independently selected from the group consisting of:
(i) $C_{1-8}$ alkyl substituted with 1-3 $R^n$;
(ii) ($C_{0-6}$ alkylene)-$C_{3-10}$ cycloalkyl, wherein the cycloalkyl is optionally substituted with from 1-4 $R^n$;
(iii) ($C_{0-6}$ alkylene)-heterocyclyl including 3-10 ring atoms, wherein 1-3 ring atoms are each independently selected from the group consisting of NH, O, and S, wherein the heterocyclyl is optionally substituted with 1-4 $R^n$;
(iv) ($C_{0-6}$ alkylene)-($C_{6-10}$ aryl), wherein the aryl is optionally substituted with 1-5 $R^n$; or
(v) ($C_{0-6}$ alkylene)-heteroaryl including 5-10 ring atoms, wherein 1-4 ring atoms are each independently selected from the group consisting of N, NH, O, and S, wherein the heteroaryl is optionally substituted with 1-3 $R^n$;
(vi) $C_{1-4}$ alkoxy optionally substituted with 1-3 $R^n$;
(vii) $C_{1-4}$ haloalkoxy;
(viii) —COH;
(ix) —CO$_2$R″;
(x) —CONR″R″;
(xi) cyano;
(xii) —NR″R″;
(xiii) —NR″C(O)NR″R″;
(xiv) —NR″C(O)OR″;
(xv) —NR″C(O)R″;
(xvi) $C_{1-4}$ thioalkoxy;
(xvii) —N$_3$;
(xviii) —CO$_2$H;
(xix) —C(O)R″;
(xx) —SO$_{1-2}$(R″);
(xxi) —O$_n$P(O)$_n$Y$_2$, wherein n is independently 0 or 1, and wherein each Y is independently selected from —OR″ and $C_{1-6}$ alkyl;
(xxii) —SH or —S$^-$;
(xxix) $C_{2-6}$ alkenyl optionally substituted with 1-3 $R^n$;
(xxx) $C_{2-6}$ alkynyl optionally substituted with 1-3 $R^n$;
each occurrence of $R^n$ is independently selected from the group consisting of:
(i) halo;
(ii) cyano;
(iii) $C_{1-6}$ alkyl;
(iv) $C_{2-6}$ alkenyl;
(v) $C_{2-6}$ alkynyl;
(vi) $C_{1-4}$ haloalkyl;
(vii) $C_{1-4}$ alkoxy;
(viii) $C_{1-4}$ haloalkoxy;
(ix) —($C_{0-3}$ alkylene)-$C_{3-6}$ cycloalkyl optionally substituted with 1-4 independently selected $C_{1-4}$ alkyl;
(x) —($C_{0-3}$ alkylene)-heterocyclyl including 3-10 ring atoms, wherein 1-3 ring atoms are each independently selected from the group consisting of NH, O, and S, wherein the heterocyclyl is optionally substituted with 1-4 independently selected $C_{1-4}$ alkyl;
(xi) —($C_{0-3}$ alkylene)-phenyl;
(xii) —($C_{0-3}$ alkylene)-heteroaryl including 5-10 ring atoms, wherein 1-4 ring atoms are each independently selected from the group consisting of N, NH, O, and S;
(xiii) —S(O)$_{1-2}$($C_{1-4}$ alkyl); and
(xiv) —NR*R**;
(xv) —OH;
(xvi) —S(O)$_{1-2}$(NR*R**);
(xvii) —$C_{1-4}$ thioalkoxy;
(xviii) —NO$_2$;
(xix) —N(R*)(C(═O)$C_{1-3}$ alkyl);
(xx) —C(═O)($C_{1-4}$ alkyl);
(xxi) —C(═O)O($C_{1-4}$ alkyl);
(xxii) —C(═O)OH, and
(xxiii) —C(═O)N(R*)(R**); and
each occurrence of R* and R** is independently selected from the group consisting of: H, $C_{1-4}$ alkyl, and phenyl.

In some embodiments of the compound of Formula A1 or Formula A2, $R^{10}$ is $C_{1-6}$ alkyl.

In some embodiments of the compound of Formula A1 or Formula A2, $R^{10}$ is $C_{6-10}$ aryl.

In some embodiments of the compound of Formula A1 or Formula A2, $R^{10}$ is phenyl.

In some embodiments, the thiolate is ethanethiolate. In some embodiments, the thiolate is butanethiolate. In some embodiments, the thiolate is a dithiolate (e.g., 1,2-ethanedithiol, 1,3-propanedithiol, or 1,4-butanedithiol).

In some embodiments, the organic chalcogenide is a selenide.

In some embodiments, the selenide is a selenide of Formula B:

$R^{20}$—Se$^-$ wherein:

R[20] is selected from the group consisting of:

(ii) $C_{1-6}$ alkyl;

(iii) $C_{2-6}$ alkenyl;

(iv) $C_{2-6}$ alkynyl;

(v) —$C_{6-10}$ aryl;

(vi) -5-10 membered heteroaryl, wherein 1-4 ring atoms are each independently selected from the group consisting of N, NH, O, and S;

(vii) —$C_{3-10}$ cycloalkyl; and (vii) -5-10 membered heterocyclyl.

In some embodiments, R[20] is $C_{1-6}$ alkyl.

In some embodiments, R[20] is $C_{6-10}$ aryl.

In some embodiments, R[20] is phenyl.

In some embodiments, the iron salt is an iron (II) salt.

In some embodiments, the iron salt is an iron (III) salt.

In some embodiments, the counteranion of the iron salt is a halide.

In some embodiments, the iron salt is selected from the group consisting of iron (II) fluoride, iron (II) chloride, iron (II) bromide, iron (II) iodide, iron (III) fluoride, iron (III) chloride, iron (III) bromide, iron (III) iodide, iron (II) sulfate, iron (III) carbonate, iron (III) citrate, iron (II) molybdate, iron (II) nitrate, iron (III) nitrate, iron (II) oxalate, iron (III) oxalate, iron (II) perchlorate, iron (III) perchlorate, iron (II) phosphate, iron (III) phosphate, iron (III) pyrophosphate, and iron (II) tetrafluoroborate, iron (II) sulfate, iron (II) carboxylate (e.g., iron (II) acetate), iron (III) carboxylate (e.g., iron (III) acetate), iron (II) gluconate, iron (II) acetylacetonate (acac), and hydrates thereof.

In some embodiments, the iron salt is iron (II) chloride. In some embodiments, the iron salt is iron (III) chloride. In some embodiments, the iron salt is iron (II) bromide. In some embodiments, the iron salt is iron (III) bromide. In some embodiments, the iron salt is an iron-sulfur cluster. In some embodiments, the amount of iron salt is catalytic relative to the amount of peroxide. In some embodiments, the ratio of the iron salt to the peroxide is about 0.0001:1 to about 2:1. In some embodiments, the ratio of the iron salt to the peroxide is about 0.0001:1 to about 0.1:1. In some embodiments, the ratio of the iron salt to the peroxide is about 0.0001:1 to about 0.05:1. In some embodiments, the ratio of the iron salt to the peroxide is about 0.001:1 to about 2:1. In some embodiments, the ratio of the iron salt to the peroxide is about 0.01:1 to about 2:1. In some embodiments, the ratio of the iron salt to the peroxide is about 0.001:1 to about 0.02:1. In some embodiments, the ratio of the iron salt to the peroxide is about 0.005:1 to about 0.01:1. In some embodiments, the ratio of the iron salt to the peroxide is about 1:1. In some embodiments, the ratio of the iron salt to the peroxide is about 0.01:1. In some embodiments, the ratio of the iron salt to the peroxide is about 0.001:1.

In some embodiments, the amount of organic chalcogenide is catalytic relative to the peroxide. In some embodiments, the ratio of the organic chalcogenide to the peroxide is greater than about 0.001:1 and equal to or less than 0.6:1. In some embodiments, the ratio of the organic chalcogenide to the peroxide is greater than 0.001:1 and equal to or less than 2:1. In some embodiments, the ratio of the organic chalcogenide to the peroxide is greater than 0.001:1 and equal to or less than 1:1. In some embodiments, the ratio of the organic chalcogenide to the peroxide is greater than 0.001:1 and equal to or less than 0.20:1. In some embodiments, the ratio of the organic chalcogenide to the peroxide is greater than 0.1:1 and equal to or less than 0.7:1. In some embodiments, the ratio of the organic chalcogenide to the peroxide is greater than 0.14:1 and equal to or less than 0.6:1. In some embodiments, the ratio of the organic chalcogenide to the peroxide is greater than 0.15 and less than about 0.5:1. In some embodiments, the ratio of the organic chalcogenide to the peroxide is about 0.5:1. In some embodiments, the ratio of the organic chalcogenide to the peroxide is about 0.15:1.

In some embodiments, the optional reductant is present. In some embodiments, the amount of reductant is catalytic relative to the peroxide. In some embodiments, the ratio of the reductant to the peroxide is greater than about 0.001:1 and equal to or less than 0.6:1. In some embodiments, the ratio of the reductant to the peroxide is greater than 0.001:1 and equal to or less than 2:1. In some embodiments, the ratio of the reductant to the peroxide is greater than 0.001:1 and equal to or less than 1:1. In some embodiments, the ratio of the reductant to the peroxide is greater than 0.001:1 and equal to or less than 0.20:1. In some embodiments, the ratio of the reductant to the peroxide is greater than 0.1:1 and equal to or less than 0.7:1. In some embodiments, the ratio of the reductant to the peroxide is greater than 0.14:1 and equal to or less than 0.6:1. In some embodiments, the ratio of the reductant to the peroxide is greater than 0.15 and less than about 0.5:1. In some embodiments, the ratio of the reductant to the peroxide is about 0.5:1. In some embodiments, the ratio of the reductant to the peroxide is about 0.15:1. In some embodiments, the reductant is a thiol, selenol, or anion thereof.

In some embodiments, the reductant is a nucleophilic hydride.

In some embodiments, the nucleophilic hydride is selected from the group consisting of lithium aluminum hydride, sodium aluminum hydride, aluminum hydrides comprising alkoxide groups (e.g., lithium triethoxyaluminum hydride and sodium bis(2-methoxyethoxy)aluminum hydride), sodium borohydride, sodium cyanoborohydride, lithium borohydride, potassium borohydride, tetrabutylammonium borohydride, and diisobutylaluminum hydride.

In some embodiments, the method does not comprise combining a base with the organic chalcogenide, optional reductant, iron salt, and the peroxide.

In some embodiments, the product of the reduction of the peroxide is an alcohol.

In some embodiments, the organic chalcogenide and the iron salt forms a complex that reduces the peroxide.

In some embodiments, the complex has the Formula C:

$$[(Z)_n Fe]^{2-n}$$ (Formula C)

wherein:

Z is the organic chalcogenide; and n is 1, 2, 3 or 4.

In some embodiments, the complex reacts with the peroxide to form an intermediate of Formula D:

$$RO\!-\!\!\left[Fe(Z)_n\right]^{1-n}$$ (Formula D)

wherein:

R is R[1] or R[2];

Z is the organic chalcogenide; and n is 1, 2, 3 or 4.

In some embodiments, the intermediate of Formula D forms an intermediate of Formula E:

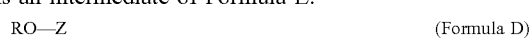

RO—Z (Formula D)

wherein Z is the organic chalcogenide; and wherein the intermediate of Formula E forms the alcohol.

In some embodiments, the intermediate catalyzes the reduction of a peroxide in the presence of a reducing agent (e.g., about 1 to about 10 equivalents). In some embodiments, the reducing agent comprises one or more components selected from the group consisting of: a thiol, a thiolate, a selenol, an organoselenide (e.g., sodium phenylselenide), a metal hydride (e.g., lithium aluminum hydride, sodium aluminum hydride, an aluminum hydride comprising one or more alkoxide groups (e.g., lithium triethoxyaluminum hydride or sodium bis(2-methoxyethoxy)aluminum hydride), sodium borohydride, sodium cyanoborohydride, lithium borohydride, potassium borohydride, tetrabutylammonium borohydride, or diisobutylaluminum hydride), hydrogen sulfide, or a hydrosulfide anion.

Also disclosed herein is a method of disproportionating hydrogen peroxide, comprising combining:
an organic chalcogenide;
an iron salt; and
the peroxide.

In some embodiments, the organic chalcogenide is a thiol or thiolate.

In some embodiments, the thiolate is a compound of Formula A2.

In some embodiments of the compound of Formula A1 or Formula A2, $R^{10}$ is $C_{1-6}$ alkyl. In some embodiments of the compound of Formula A1 or Formula A2, $R^{10}$ is $C_{6-10}$ aryl. In some embodiments of the compound of Formula A1 or Formula A2, $R^{10}$ is phenyl.

In some embodiments, the thiolate is ethanethiolate. In some embodiments, the thiolate is butanethiolate. In some embodiments, the thiolate is a dithiolate (e.g., 1,2-ethanedithiol, 1,3-propanedithiol, or 1,4-butanedithiol).

In some embodiments, the organic chalcogenide is a selenide.

In some embodiments, the selenide is a selenide of Formula B:

wherein:
$R^{20}$ is selected from the group consisting of:
(ii) $C_{1-6}$ alkyl;
(iii) $C_{2-6}$ alkenyl;
(iv) $C_{2-6}$ alkynyl;
(v) —$C_{6-10}$ aryl;
(vi) -5-10 membered heteroaryl, wherein 1-4 ring atoms are each independently selected from the group consisting of N, NH, O, and S;
(vii) —$C_{3-10}$ cycloalkyl; and
(vii) -5-10 membered heterocyclyl.

In some embodiments, $R^{20}$ is $C_{1-6}$ alkyl. In some embodiments, $R^{20}$ is $C_{6-10}$ aryl. In some embodiments, $R^{20}$ is phenyl.

In some embodiments, the iron salt is an iron (II) salt.
In some embodiments, the iron salt is an iron (III) salt.
In some embodiments, the counteranion of the iron salt is a halide.

In some embodiments, the iron salt is selected from the group consisting of iron (II) fluoride, iron (II) chloride, iron (II) bromide, iron (II) iodide, iron (III) fluoride, iron (III) chloride, iron (III) bromide, iron (III) iodide, iron (II) sulfate, iron (III) carbonate, iron (III) citrate, iron (II) molybdate, iron(II) nitrate iron (III) nitrate, iron (II) oxalate, iron (III) oxalate, iron (II) perchlorate, iron (III) perchlorate, iron (II) phosphate, iron (III) phosphate, iron (II) pyrophosphate, and iron (II) tetrafluoroborate, iron (II) sulfate, iron (II) carboxylate (e.g., iron (II) acetate), iron (III) carboxylate (e.g., iron (III) acetate), iron (II) gluconate, iron (II) acetylacetonate (acac), and hydrates thereof.

In some embodiments, the iron salt is iron (II) chloride. In some embodiments, the iron salt is iron (III) chloride. In some embodiments, the iron salt is iron (II) bromide. In some embodiments, the iron salt is iron (III) bromide. In some embodiments, the iron salt is an iron-sulfur cluster.

In some embodiments, the amount of iron salt is catalytic relative to the amount of hydrogen peroxide. In some embodiments, the ratio of the iron salt to hydrogen peroxide is about 0.0001:1 to about 2:1. In some embodiments, the ratio of the iron salt to hydrogen peroxide is about 0.0001:1 to about 0.1:1. In some embodiments, the ratio of the iron salt to hydrogen peroxide is about 0.0001:1 to about 0.05:1. In some embodiments, the ratio of the iron salt to hydrogen peroxide is about 0.001:1 to about 2:1. In some embodiments, the ratio of the iron salt to hydrogen peroxide is about 0.01:1 to about 2:1. In some embodiments, the ratio of the iron salt to hydrogen peroxide is about 0.001:1 to about 0.02:1. In some embodiments, the ratio of the iron salt to hydrogen peroxide is about 0.005:1 to about 0.01:1. In some embodiments, the ratio of the iron salt to hydrogen peroxide is about 1:1. In some embodiments, the ratio of the iron salt to hydrogen peroxide is about 0.01:1. In some embodiments, the ratio of the iron salt to hydrogen peroxide is about 0.001:1.

In some embodiments, the amount of organic chalcogenide is catalytic relative to hydrogen peroxide. In some embodiments, the ratio of the organic chalcogenide to hydrogen peroxide is greater than about 0.001:1 and equal to or less than 0.6:1. In some embodiments, the ratio of the organic chalcogenide to hydrogen peroxide is greater than 0.001:1 and equal to or less than 2:1. In some embodiments, the ratio of the organic chalcogenide to hydrogen peroxide is greater than 0.001:1 and equal to or less than 1:1. In some embodiments, the ratio of the organic chalcogenide to hydrogen peroxide is greater than 0.001:1 and equal to or less than 0.20:1. In some embodiments, the ratio of the organic chalcogenide to hydrogen peroxide is greater than 0.1:1 and equal to or less than 0.7:1. In some embodiments, the ratio of the organic chalcogenide to hydrogen peroxide is greater than 0.14:1 and equal to or less than 0.6:1. In some embodiments, the ratio of the organic chalcogenide to hydrogen peroxide is greater than 0.15 and less than about 0.5:1. In some embodiments, the ratio of the organic chalcogenide to hydrogen peroxide is about 0.5:1. In some embodiments, the ratio of the organic chalcogenide to hydrogen peroxide is about 0.15:1.

In some embodiments, the products of the disproportion of hydrogen peroxide are oxygen and water. In some embodiments, greater than 50% of the oxygen is singlet oxygen. In some embodiments, greater than 90% of the oxygen is singlet oxygen. In some embodiments, the organic chalcogenide and the iron salt forms a complex that reduces the peroxide.

The literature publication *ACS Omega* 2018, 3, 14054-14063 and its Supporting Information disclose methods and information related to reduction and disproportionation of peroxides, and is incorporated herein by reference in its entirety.

Examples

Peroxides substrates were prepared as illustrated in Scheme 5. Monoperoxyacetal 2 was prepared through alkylation of 2-tetrahydropyranyl hydroperoxide 1 (see: Milas N. A., et al, *J. Am. Oil Chem. Soc.* 1954, 76, 2322-5; and Rigaudy, J.; Izoret, G. *Compt. Rend.* 1953, 236, 2086) with the triflate of 3-phenyl-1-propanol (see Kyasa, S, et al, *J. Org. Chem.* 2015, 80, 12100-12114). Reaction of the same triflate with a slight excess of hydrogen peroxide, furnished the symmetric primary alkyl peroxide 3. (see Welch, F., et al, *J. Am. Chem. Soc.* 1955, 70, 551-554) Alternatively, treatment of the triflate with t-butyl hydroperoxide provided a dialkyl peroxide 4 (see Kyasa, S, et al, *J. Org. Chem.* 2015, 80, 12100-12114). t-Butyl peroxybenzoate 5 could be purchased or could be prepared through oxidative peresterification of benzyl alcohol with t-butyl hydroperoxide (Zhang, X. et al, *RSC Adv.* 2016, 6, 8465-8468). The dimeric and trimeric acetone peroxides DADP (7) and TATP (6) were prepared from acetone and hydrogen peroxide using published procedures (see: Matyáš, R. and Pachman, J. Propellants, Explosives, Pyrotechnics. 2010, 35, 31-7; Oxley, J. C. et al, *Propellants Explos. Pyrotech.* 2013, 38, 244; ibid, 2013, 38, 841-851. Peroxide 8 was prepared from the corresponding tertiary bromide following a known procedure; peroxide 9 was available through methylation of the known tertiary hydroperoxide.

Scheme 5. Peroxide substrates

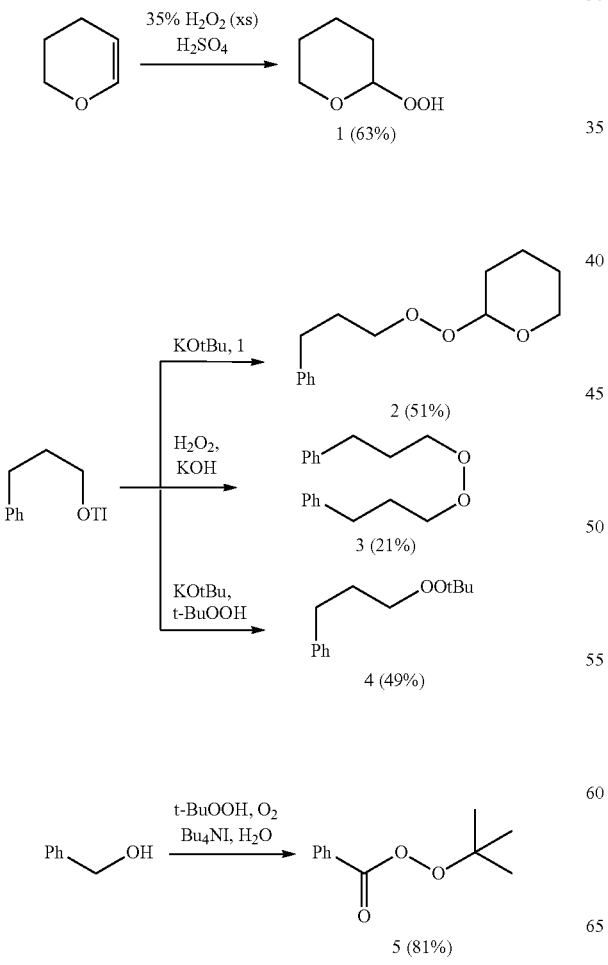

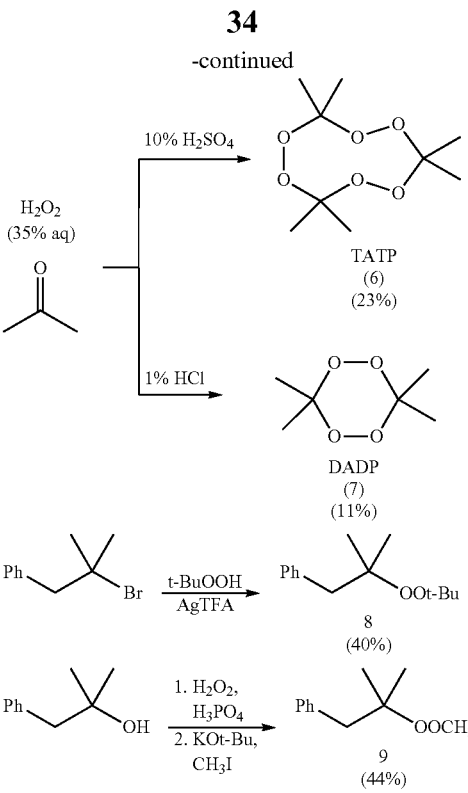

Thiolate and selenide nucleophiles were generated as illustrated in Scheme 5. Deprotonation of thiols was conducted using KOtBu or Et$_3$N. Triethylamine can, after protonation, provide a mildly acidic (pKa 10) proton source during the reduction. Alternatively, phenyl thiolate and phenyl selenide could be reductively generated from the corresponding disulfide or diselenide (Scheme 6).

Scheme 6. Generation of Nucleophiles

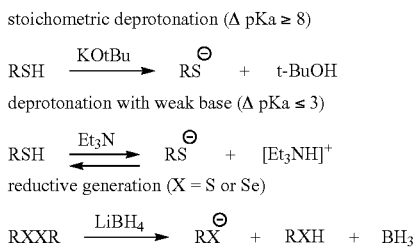

The relative reactivity of selected peroxides towards thiolates and selenides is summarized in Table 1. Control reactions revealed that, with the exception of monoperoxyacetal 2, which undergoes facile E$_1$CB cleavage, the peroxide substrates reacted slowly if at all with bases (Table 1, rows 1-2) or hydride nucleophiles (rows 3-4). Peroxyacetal 2 and perester 5 were found to decompose in the presence of thiolate (rows 5-8). Dialkyl peroxides 3 and 4 as well as acetone peroxides 6 and 7 were not consumed after several hours. Similar trends were observed when thiolate was replaced with phenylselenide anion, although some reaction was observed for peroxides 3 and 4.

TABLE 1

Reactivity of peroxides towards thiolates and phenylselenide $$\text{ROOR}' \xrightarrow{\text{reagents}} \text{observe consumption of starting material}$$

| | Substrate | | | | | |
|---|---|---|---|---|---|---|
| | 2 | 3 | 4 | 5 | 6 | 7 |
| Reagents | time required for consumption (min)[b] | | | | | |
| KOtBu | <15 | >60 | >60 | >60 | nr | nr |
| Et$_3$N | >60 | nr | nr | nr | nr | nr |
| LiBH$_4$, EtOH | >60 | nr | nr | nr | nr | nr |
| LiBH$_4$, | >60 | nr | nr | nr | nr | nr |
| PhSH | nr | nr | nr | nr | nr | nr |
| PhSH, KOtBu | <15 | nr | nr | <15 | nr | nr |
| PhSH, Et$_3$N | <15 | nr | nr | <15 | nr | nr |
| (PhS)$_2$, LiBH$_4$, EtOH | <15 | nr | nr | <15 | nr | nr |
| (PhSe)$_2$, LiBH$_4$ EtOH | <15 | >120 | >120 | <15 | nr | nr |

[a]Reactions conducted in THF unless indicated at peroxide and analyzed by NMR in presence of internal standard; See experimental section.
[b]"nr" indicates no obvious reaction (TLC and/or NMR) after several hours Reactivity Towards Ferrous Iron The monoperoxyacetal 2 and the perester 5 underwent cleavage upon exposure to FeBr$_2$ in CH$_3$CN (Table 2). The dialkyl peroxide 3 showed relatively low reactivity to Fe(II), while 4, 6, and 7 were found to be unreactive under these conditions after several hours. Addition of a solution of thiol to FeBr$_2$, whether in the presence or absence of base, generated a black colloidal suspension which reacted with all of test substrates in Table 2 to achieve reduction of the peroxide. In each case, the colloidal suspension was found to turn clear after the reaction. However, differences in reaction rates across different substrates were noted. TATP and DADP, the peroxide-containing explosives resistant to many other forms of reduction, were found to be reduced under the present system. Fe(II) can be used in catalytic quantities. It was noted that stoichiometric conversions could be achieved with as little as 10$^{-4}$ equiv of Fe(II). In contrast, replacing Fe(II) or Fe(III) salts with Cu(II) resulted in no detectable reduction of dialkyl peroxide 4.

TABLE 2

Reaction of selected peroxides with Fe sources and/or thiophenol $$\text{Peroxides (1 equiv, 0.04M)} \xrightarrow[\text{THF or CD}_3\text{CN}]{\text{FeBr}_2 (10^{-4} \text{ to 1 equiv}) \quad \text{PhSH (0-2 equiv)}} \text{time for consumption starting material}$$

| FeBr$_2$ (equiv) | PhSH (equiv) | Peroxide | | | | |
|---|---|---|---|---|---|---|
| | | 2 | 3 | 4 | 5 | 7 |
| 1.0 | 0 | <15 | nr | nr | <15 | nr |
| 0.2 | 2 | <1 | <1 | <1 | <1 | <1 |
| 0.1 | 1 | | | <1 | <1 | <1 |
| 0.1 | 2 | | <1 | <1 | <1 | |
| 10$^{-2}$ | 2 | <1 | <1 | <1 | <1 | <1 |
| 10$^{-2}$ | 1 | <1 | <1 | <1 | <1 | <1 |
| 10$^{-4}$ | 2 | <1 | <1 | <1 | <1 | <1 |

[b]Reactions monitored by TLC or by NMR (aliquot).
"nr" indicates lack of observable reaction after 60 min.

Isolated yields for selected reactions of peroxides 3, 4, and 5 in CD$_3$CN are illustrated in Table 3. In contrast to the 2:1 stoichiometry expected for reaction of alkyl thiols with hydrogen peroxide or alkyl hydroperoxides, complete consumption of peroxides 3-5 could be achieved using stoichiometric thiol; the use of 0.5 equiv of thiol resulted in a reduced yield of alcohol and recovery of half of the peroxide substrate (Table 3, row 2).

TABLE 3

Yields of Reactions of Peroxides 3-5.

$$\text{Peroxides} \xrightarrow[\text{CD}_3\text{CN}]{\text{FeBr}_2 (10^{-4} \text{ to 1 equiv.}) \quad \text{PhSH (0-2 equiv.)}} \text{isolated yields of alcohol or acid}$$

| | equiv Fe | equiv RSH | yield Ph(CH$_2$)$_3$OH (%) | yield pHCO$_2$H (%) |
|---|---|---|---|---|
| 2 | 0.1 | 2.0 | 87 | na |
| 3 | 0.1 | 0.5 | 46 | na |
| | 0.1 | 1.0 | 75[a] | na |
| | 0.1 | 2.0 | 81 | na |
| 4 | 0.1 | 1.0 | na | 71 |
| | 0.1 | 2.0 | na | 77 |

[a]PhSSPh (70%) isolated.

In the presence of catalytic (typically 5%) FeBr$_2$ and three or more equivalents of thiophenol, TATP (7) was degraded over a period of days. Reaction was somewhat faster in refluxing THF, with similar conversions available in a day or less. (Scheme 7)

Scheme 7.

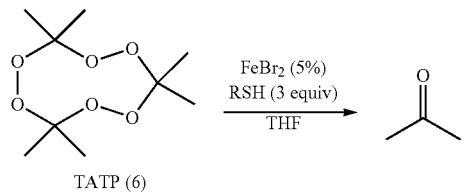

TATP (6)

| R | | temp | conversion |
|---|---|---|---|
| R = Ph (rt) | phenyl | rt | 30% (48 h) |
| R = Ph (65° C.) | phenyl | 65° C. | 30% (6-8 h) |
| R = 4-NH$_2$Ph, rt | 4-NH$_2$Ph | 65° C. | 30% (6-8 h) |

Peroxide 8, developed as a clock for electrochemically generated alkoxy radicals, proved unreactive (Scheme 8). However, less hindered analog 9 underwent rapid reduction (minutes), to furnish a low yield of 2-methyl-1-phenyl-2-propanol and larger amounts of acetone, toluene, and phenyl benzyl sulfide.

Scheme 8. Reactions with Radical Clock Precursors.

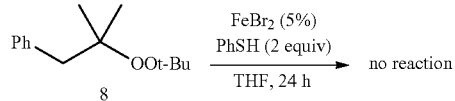

-continued

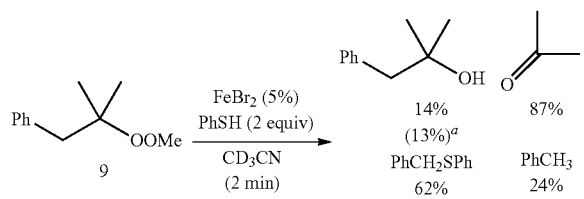

[a] Relative yields (NMR); isolated yield in parentheses.

Table 4 illustrates the results of using thiol and 1,n-dithiols in the reduction of 4.

TABLE 4

Nature of Thiol.

$$4 \xrightarrow[\text{THF}]{\text{FeBr}_2 \text{ (0.05 equiv)} \atop \text{RSH (1 equiv)}} \text{observe consumption of starting material}$$

| thiol (1.0 equiv) | time for consumption (min) |
|---|---|
| propanethiol | <1 |
| HS(CH)$_3$SH | <1 |
| HS(CH)$_4$SH | <1 |
| HS(CH)$_5$SH | <1 |
| 4-MeOPhSH | <1 |

As illustrated in equation 4, a variety of thiols, including a dithiol, could be successfully applied to the reduction; for reasons that remain unclear, no reduction was observed in the presence of dithiothreitol (not shown). No reaction was observed when diphenyl disulfide was used in place of thiophenol (equation 5).

(equation 4)

$$\text{Ph(CH}_2)_3\text{OOt-Bu} \xrightarrow[\text{THF}]{\text{FeBr}_2 \text{ (5\%)} \atop \text{thiol (2 equiv)}} <1 \text{ min to loss of s. mat. (TLC)}$$

thiols: PrSH, 1,3-propanedithiol (1.0 equiv), 4-NH$_2$PhSH, 4-MeOPhSH (equation 5)

$$\text{Ph(CH}_2)_3\text{OOt-Bu} \xrightarrow[\text{THF}]{\text{FeBr}_2 \text{ (5\%)} \atop \text{PhSSPh (1 equiv)}} \text{no rxn after 120 min}$$

Nature of iron: The dependence on iron source was probed using DADP as a test substrate (Table 5). Peroxy reduction was observed in the presence of different sources of soluble Fe(II) or Fe(III); analysis of the crude NMR indicated acetone as the only detectable product. No reaction was observed from ferrocene or iron oxide (Fe$_2$O$_3$).

TABLE 5

Influence of iron source on Fe/thiol reduction of DADP (7)

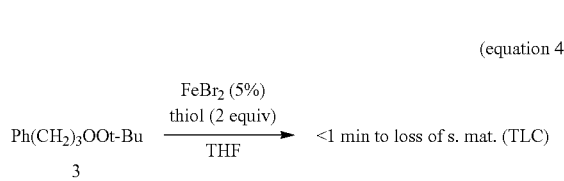

| Fe source (5%) | conversion[a] |
|---|---|
| ferrocene | no rxn (>120 min) |
| ferrocene, NaCl or NaI | no rxn (>120 min) |
| FeI$_2$ | >90% (<1 min) |
| FeCl$_2$ | >90% (<1 min) |
| FeBr$_2$ | >90% (<1 min) |
| FeCl$_3$ | >90% (<1 min) |
| FeCl$_3$ (wet) | >90% (<1 min) |
| FeTPP | traces (>120 min) |
| Fe$_2$O$_3$ | no rxn (>120 min) |

[a] Monitored by NMR (internal standard)

Stoichiometry: the stoichiometry of reduction was investigated using 1°/3° dialkyl peroxide 4 as well as DADP (7). Complete consumption of 4 was observed in the presence of excess thiophenol and in the presence of stoichiometric thiophenol. Rapid decomposition of DADP was observed in the presence of catalytic amounts of both Fe(II) and thiol (Table 6).

TABLE 6

Investigation of reductant stoichiometry

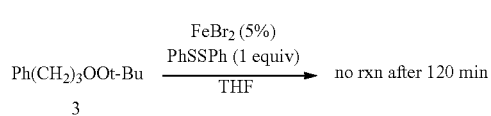

| substrate | FeBr$_2$ (equiv) | PhSH (equiv) | t (min) |
|---|---|---|---|
| 4 | 0.01 | 3 | <1 |
| 4 | 0.01 | 1 | <1 |
| 4 | 0.01 | 0.5 | <1 (incomplete) |
| 7 | 0.01 | 3 | <1 |
| 7 | 0.01 | 1 | <1 |
| 7 | 0.001 | 0.5 | <1 |
| 7 | 0.001 | 0.15 | <1 | calorimetry

Reduction of dialkyl peroxide 4 in the presence of catalytic Fe(II) and stoichiometric thiol was exothermic by >30 kcal/mol when conducted in CH$_3$CN and by a somewhat smaller amount when conducted in THF (Scheme 9). Neither value approaches that calculated for a catalyzed reduction of a peroxide bond at the expense of two molecules of thiol. The differing heats of reaction measured in the two solvents, along with our qualitative observations of a number of minor byproducts from reactions in THF, may suggest a more complicated mechanism. The decomposition of diperoxide 7 to acetone, a transformation which can be accomplished in the presence of catalytic amounts of Fe and thiol (see Table 5) was even less exothermic.

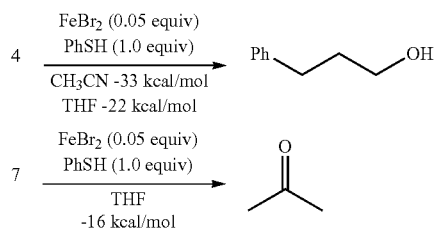

Scheme 9. Reaction Thermochemistry.

The possibility of achieving stoichiometric reduction of a dialkyl peroxide in the presence of an added reductant (Table 7) was probed. In the absence of any Fe/RSH complex, treatment of dialkyl peroxide 4 with iBu$_2$AlH (DIBAL-H) gave no reaction even after hours of stirring (Table 7). However, repeating the aluminum hydride reaction in the presence of catalytic amounts of Fe and thiol resulted in rapid consumption of the peroxide. No reaction was observed if the aluminum hydride was replaced with a weaker hydride source such as triethylsilane or formic acid.

TABLE 7

[Fe(SPh)$_n$]-catalyzed reduction of added hydride.

| FeBr$_2$ (equiv) | PhSH (equiv) | Reductant (1.0 equiv) | consumption of peroxide 4 |
|---|---|---|---|
| 0 | 0 | iBu$_2$AlH | nr |
| 0.05 | 0.1 | iBu$_2$AlH | <1 min |
| 0.05 | 0.1 | BH$_3$•THF or BH$_3$•Me$_2$S | <1 min |
| 0.05 | 0.1 | NaCNBH$_3$ | nr |
| 0.05 | 0.1 | Et$_3$SiH | nr |
| 0.05 | 0.1 | HCO$_2$H | nr |
| 0.05 | 0.1 | ascorbic acid | nr |

$^a$Reactions monitored by TLC and NMR

Experimental Procedures
General Methods

All reactions were conducted under an atmosphere of N$_2$ in flame-dried glassware except where indicated. Reagents and solvents were used as supplied commercially, except CH$_2$Cl$_2$ (distilled from CaH$_2$), THF (distilled from Na/benzophenone), acetonitrile (distilled from Na/benzophenone), and pyridine (distilled from CaH$_2$). Extracted organic layers were dried using sodium sulfate and filtered through a cotton plug. $^1$H and $^{13}$C spectra were acquired in CDCl$_3$, d$_8$-THF, or CD$_3$CN at the described spectrometer frequency. Chemical shifts are reported relative to residual chloroform (7.26 ppm for $^1$H and 77.0 ppm for $^{13}$C) and residual acetonitrile (1.96 ppm for $^1$H). IR spectra were obtained on neat films (ZnSe, ATR mode) with selected absorbances reported in wavenumbers (cm$^{-1}$). Flash column chromatography was performed on 230-400 □M silica gel. Thin-layer chromatography (TLC) was performed on 0.25 mm hard-layer silica G plates containing a fluorescent indicator; developed TLC plates were visualized with a hand-held UV lamp or by heating after staining with a solution of 1.2 g N,N'-dimethyl-p-phenylene diamine dihydrogen chloride, 1 ml acetic acid, 20 ml of water, and 100 ml of methanol. (See Smith, L. L., and Hill, F. L. *J. Chrom. A.* 1972, 66, 101-109). Abbreviations throughout: EA=ethyl acetate; Hex=hexane; DCM=dichloromethane. THF=tetrahydrofuran.

3-Phenylpropyl Trifluoromethanesulfonate

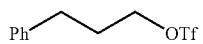

To a 0° C. solution of 3-phenyl-propanol (2.51 g, 18.4 mmol) in 50 ml of DCM was added 5.21 g (19 mmol) of triflic anhydride. Pyridine (1.48 g, 19.0 mmol) was then added over a period of 5 minutes, and the reaction was allowed to stir for 30 minutes. The reaction was then quenched by addition of 10 ml of cold hexane and 10 ml of cold 0.1M aq. KHSO$_4$. The mixture was extracted with cold hexane (2×30 ml). The combined organic extracts were dried and then concentrated under reduced pressure, with the bath temperature held below 10° C. during concentration. The crude product, a light to medium pink oil, was used immediately and without further purification for peroxide synthesis. The reagent may be held for a few hours at −20° C. without substantial decomposition but immediate usage is advised.

3-Phenylpropyl Methanesulfonate

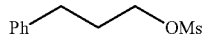

To a room temperature solution of 3-phenyl-propanol (2.00 g, 14.71 mmol) in 20 mL of DCM was added triethylamine (2.97 g, 29.42 mmol) followed by 1.84 g (16.18 mmol) of methanesulfonyl chloride slowly over 2 min. The reaction was allowed to stir for 2 h. The reaction was then quenched by addition of aq 6 M HCl (10 mL). The mixture was extracted with ether (3×30 mL). The combined organic extracts were dried and then concentrated under reduced pressure. The crude product, a light to medium yellow brown oil, was used immediately and without further purification for peroxide synthesis. If further purification is needed, the oil can be dissolved in a 70/30 mixture of ether/ethyl acetate and run through a silica plug. Spectra matched those reported previously.

(1) 2-Hydroperoxytetrahydro-2H-pyran

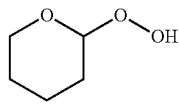

To a 0° C. solution of hydrogen peroxide (35% in H$_2$O, 20 ml, □200 mmol) was added concentrated H$_2$SO$_4$ (0.1 mL) slowly. After the solution had stirred for 10 min, 2.00 g of 3,4-dihydro-2H-pyran (25.88 mmol) was added slowly over 5 minutes. The reaction was stirred for 4 hours at 0° C. and then quenched with 10 ml of saturated NH$_4$Cl in H$_2$O. The resulting mixture was extracted using ether (3×20 ml). The combined organic extracts were dried and then carefully concentrated under reduced pressure. The residue was then purified by chromatography (5% EA/Hex) to yield 1.92 g (16.3 mmol, 63%) of a colorless oil.

(2) 2-((3-phenylpropyl)peroxy)tetrahydro-2H-pyran

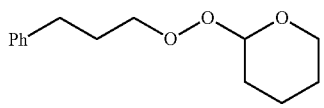 [SMILES: c1ccc(CCCOOC2CCCCO2)cc1]

To a 0° C. solution of KOtBu (2.24 g, 20.0 mmol) in 50 ml of THF was added 2.4 g (20.3 mmol) of hydroperoxyacetal 1, followed, over 5 minutes, by addition of previously prepared 3-phenylpropyl trifluoromethanesulfonate (~18.4 mmol, added neat). The reaction was stirred for 4 hours and then quenched with 30 ml of water. The mixture was extracted with EA (3×40 ml). The combined organic extracts were dried and then concentrated under reduced pressure. The residue was then purified by chromatography (20% EA/Hex) to yield 2.21 g (9.38 mmol, 51%) of peroxyacetal 2: R$_f$: 0.70 (10% EA/Hex), $^1$H NMR (400 MHz): δ 1.57-1.61 (overlapping peaks, 4H,), 1.76 (m, 2H), 1.99 (m, 2H), 2.74 (t, 2H, J=7.6), 4.02 (t, 1H, J=11.6), 3.83 (t, 1H, J=11.6), 4.14 (t, 2H, J=6.4), 5.18 (t, 1H, J=3.6), 7.21-7.30 (overlapping peaks, 5H).

(3) (Peroxybis(propane-3,1-diyl))dibenzene

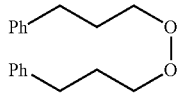

To a 0° C. solution of 3-phenylpropyl trifluoromethanesulfonate (1.00 g, 3.73 mmol) in 50 ml of MeOH was added 0.38 g (3.73 mmol) of aq. H$_2$O$_2$ (35%, used as received), followed, over 5 min, by 0.41 g (3.73 mmol) of aq. 50% KOH. The reaction was allowed to warm to room temperature and then stirred for 16 hours prior to quenching by addition of 20 ml of H$_2$O. The crude reaction mixture was extracted with hexane (3×40 ml). The combined organic extracts were dried and then concentrated under reduced pressure. The residue was then purified by chromatography (10% EA/Hex) to yield 0.211 g (0.78 mmol, 21%) of dialkyl peroxide 3. R$_f$: 0.73 (10% EA/Hex), $^1$H NMR (400 MHz): δ 1.94 (m, 4H), 2.75 (t, 4H, J=8), 3.70 (t, 4H, J=6.4), 7.22-7.29 (overlapping peaks, 10H), $^{13}$C NMR (100 MHz): δ 32.23 (CH$_2$), 34.35 (CH$_2$), 62.31 (CH$_2$), 126.01 (CH), 128.55 (CH), 128.58 (CH), 142.01 (C).

(4) (3-(tert-Butylperoxy)propyl)benzene

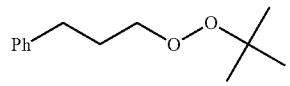

To a 0° C. solution of KOtBu (2.24 g, 20.0 mmol) in 50 ml of THF was added 3.64 ml of t-butyl hydroperoxide as a solution in decane (nominally 5.5M, 20.3 mmol). Then the previously prepared 3-phenylpropyl trifluoromethanesulfonate (~18.4 mmol) was added slowly over 5 minutes. The reaction was allowed to stir for 4 hours and then quenched with 30 ml of water. The mixture was extracted using EA (3×40 ml). The combined organic extracts were dried and then concentrated under reduced pressure. The residue was then purified by chromatography (20% EA/Hex) to yield 1.88 g (9.02 mmol, 49%) of dialkyl peroxide 4. R$_f$: 0.71 (10% EA/Hex), $^1$H NMR (400 MHz): δ 1.29 (s, 9H,), 1.98 (t, 2H, J=7.4), 2.74 (t, 2H, J=7.8), 4.00 (t, 2H, J=6.4), 7.22-7.289 (overlapping peaks, 5H), $^{13}$C NMR (100 MHz): δ 26.5 (CH$_3$), 29.7 (CH$_2$), 32.53 (CH$_2$), 74.33 (CH$_2$), 80.19 (C), 125.96 (CH), 128.47 (CH), 128.53 (CH), 141.92 (C); IR: 2977, 2928, 1361.

(5) tert-Butyl Benzoperoxoate

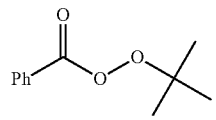

To a room temperature solution of tetrabutyl ammonium iodide (1.7 g, 4.6 mmol) in 40 ml of H$_2$O under an oxygen atmosphere (balloon containing O$_2$) was added 1.00 g (9.2 mmol) of benzyl alcohol, followed by 6.7 ml of t-butyl hydroperoxide solution (nominally 5.5M in decane, 37.0 mmol, all at once). The reaction was allowed to stir for 16 hours and then diluted with 30 ml of ether. The separated aqueous layer was extracted with additional ether (2×30 ml) and the combined organic extracts were dried over Na$_2$SO$_4$. The filtrate was concentrated under reduced pressure and the residue purified by chromatography (10% EA/Hex) to yield 1.44 g (7.45 mmol, 81%) of perester 5. R$_f$: 0.63 (10% EA/Hex), $^1$H NMR (400 MHz): δ 1.44 (s, 9H), 1.98 (t, 2H, J=7.4), 7.48 (t, 2H, J=8), 7.61 (t, 1H, J=8), 7.98 (d, 2H, J=8), $^{13}$C NMR (100 MHz): δ 26.37 (CH$_3$), 84.1 (C), 127.86 (CH), 128.74 (CH), 129.25 (CH), 133.46 (C); IR: 2981, 2936, 1754, 1189.

(6) TATP (Triacetone Triperoxide)

Caution: TATP is a High Explosive which can Undergo Detonation Upon Impact, Grinding, or in the Presence of a Spark or Heat.

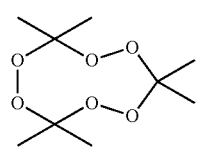

To acetone (1.2 g, 20 mmol) cooled to 0° C. was added 1.97 g (20 mmol) of 35% hydrogen peroxide solution. Then 0.1 ml of concentrated HCl was added to the solution. The reaction was allowed to warm to room temperature and allowed to stir for 24 hours, resulting in the formation of a white crystal. The filtered solid (vacuum filtration) was washed with cold $H_2O$ (3×10 ml) and then dried by pulling air through the product mass for 1 hour. The resulting solid was allowed to dry under air for 24 hours before use without further purifications. Yields 0.49 g (2.2 mmol, 11%) of TATP 7. $R_f$: 0.74 (10% EA/Hex), $^1$H NMR (400 MHz): δ 1.49 (s, 18H), $^{13}$C NMR (100 MHz): δ 21.44 ($CH_3$), 107.62 (C); IR: 2997, 2945, 1177.

(7) DADP (Diacetone Diperoxide)

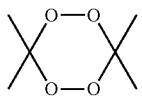

Caution: DADP is a High Explosive which can Undergo Detonation Upon Impact, Grinding, or in the Presence of a Spark or Heat.

To a stirred sample of acetone (1.2 g, 20 mmol) cooled to 0° C. was added 1.97 g (20 mmol) of 35% aq. hydrogen peroxide used as received. Concentrated $H_2SO_4$ (1 mL) was then added to the solution slowly over 2 minutes. The reaction was allowed to warm up to room temperature and stirred for 24 hours, resulting in the formation of a white crystalline solid. The vacuum filtered solid was washed with cold $H_2O$ (3×10 ml) and then tried by pulling air through the mass for 1 h. The solid was allowed to sit and dry in open air for 24 hours, and was then used without further purification. Yield: 0.68 g (4.6 mmol, 23%) of DADP 6. $R_f$: 0.74 (10% EA/Hex), $^1$H NMR (400 MHz): δ 1.38 (s, 6H), 1.82 (s, 6H), $^{13}$C NMR (100 MHz): δ 20.65 ($CH_3$), 22.55 ($CH_3$), 107.67 (C); IR: 3000, 22955, 1196.

t-Butyl 1-Phenyl-2-methyl-2-propyl Peroxide (8)

t-Butyl 1-phenyl-2-methyl-2-propyl peroxide (7) was prepared using a procedure reported in Org. Biomol. Chem. 2003, 1, 3418-3429. Spectra matched those previously reported.

Methyl 1-Phenyl-2-methyl-2-propyl Peroxide (9)

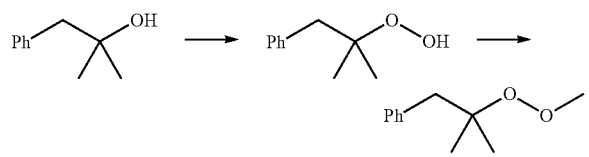

1-phenyl-2-methyl-2-propanol (3.1 mL, 20 mmol, 1 equiv), hydrogen peroxide (50 v/v % $H_2O$, 2.3 mL, 40 mmol, 2 equiv), and phosphoric acid (85%, 5.8 mL, 100 mmol, 5 equiv) were combined in a round-bottom flask backfilled with nitrogen. The reaction was heated to 45° C. for 5 h at which point the reaction was deemed complete by disappearance of starting material (TLC). The reaction mixture was cooled to room temperature and diluted with hexanes (150 mL). The separated organic layer was washed with deionized water (2×10 mL) and brine (1×10 mL), dried over sodium sulfate, and concentrated in vacuo. The resulting thick and dark oil was purified by silica column chromatography (1.9×30.5 cm) with 5% EA in hexanes to furnish, following concentration in vacuo, 2.192 g (66%) of the hydroperoxide as a light yellow oil. $R_f$: 0.40 (10% EA/Hex); IR (thin film): 3399 (br), 2981 (m), 1453 (s) $cm^{-1}$; $^1$H NMR: δ 1.22 (s, 6H), 2.90 (s, 2H), 7.24 (br m, 5H); $^{13}$C NMR: δ 24.0, 44.6, 83.2, 126.4, 128.1, 130.6, 137.7.

The tertiary hydroperoxide (0.3329 g, 2.0 mmol, 1 equiv), methyl iodide (0.37 mL, 6 mmol, 3 equiv), and THF (10 mL, 0.2 M) were combined in a flame-dried round-bottom flask backfilled with nitrogen. Potassium tert-butoxide (0.2470 g, 2.2 mmol, 1.1 equiv) was added to the clear solution, and the resulting reaction was stirred at room temperature until the starting material could no longer be observed (TLC, 18 h). The reaction was quenched with saturated $NH_4Cl$ (50 mL) and extracted with EA (3×10 mL). The combined organic layers were washed with brine (1×10 mL), dried over sodium sulfate, and concentrated in vacuo to give an oily residue. The mixture was purified by column chromatography (1.9×20 cm) with 1% EA in Hex to furnish, following concentration in vacuo, 0.2389 g (66%) of the dialkyl peroxide as a clear oil which smelled lightly of apples and/or pears. $R_f$: 0.78 (10% EA/Hex); IR (thin film): 2980 (s), 2929 (s), 2891 (s), 1464 (s) $cm^{-1}$; $^1$H NMR: δ 1.19 (s, 6H), 2.87 (s, 2H), 3.85 (s, 3H), 7.23 (br m, 5H); $^{13}$C NMR: δ 24.3, 45.0, 63.1, 82.6, 126.3, 128.0, 130.7, 137.9; HRMS-EI: calcd for $C_{11}H_{16}O_2$ $(M)^+$, 180.1150; found, 180.1156.

Reduction Procedure Using Thiolate Generated with KOtBu

This Example Describes Reduction of t-Butyl Phenylpropyl Peroxide (4) but the Same Procedure was Applied to Other Peroxide-Containing Substrates To 10 ml of THF, 0.118 g (1.06 mmol) of KOtBu was dissolved. To this solution, 0.116 g (1.06 mmol) of phenyl thiol was added, followed by 0.2 g (0.96 mmol) of peroxide 4. The reaction was monitored by TLC for disappearance of peroxide. Reactions can also be conducted in $CD_3CN$ to allow monitoring by 1H NMR.

Reduction Procedure Using Thiolate Generated with $NEt_3$

This Example Describes Reduction of t-Butyl Phenylpropyl Peroxide (4) but the Same Procedure was Applied to Other Peroxide-Containing Substrates To 10 ml of THF, 0.107 g (1.06 mmol) of $NEt_3$ was dissolved. To this solution 0.116 g (1.06 mmol) of phenyl thiol was added, then 0.2 g (0.96 mmol) of dialkyl peroxide 4 was added. The reaction was monitored by TLC for disappearance of peroxide.

Control Reactions Using Only Peroxide and Base

For this Purpose, "Peroxide" can Refer to Dialkyl Peroxides (2, 3, or 4), Peroxyacetal (1), TATP, DATP, or the Perester. The "Base" can Refer Either $NEt_3$ or KOtBu Control reactions with base employed the same procedure outlined above for reactions with thiolate and base but omitted the thiol. Reactions were monitored by TLC and/or NMR. See text for details on conversions.

Reductive Procedure Using Thiolate Generated Reductively

This Example Describes Reduction of t-Butyl Phenylpropyl Peroxide (4) but the Same Procedure was Applied to Other Peroxide-Containing Substrates In 10 ml of EtOH, 0.230 g (1.056 mmol) of diphenyl sulfide was dissolved. Then 0.72 ml (1.44 mmol) of a solution of $LiBH_4$ in THF (nominally 2M) was added slowly. Once bubbling ceased, 0.2 g (0.96 mmol) of dialkyl peroxide 4 was added slowly. The reaction was monitored by TLC for disappearance of peroxide.

Control Reaction Using Only Peroxide and Lithium Borohydride

For this Purpose, "Peroxide" can Refer to Dialkyl Peroxides, the Peroxyacetal, the Perester, DADP or TATP.

Using the same procedure outlined above for any peroxide, except that thiol was omitted (lithium borohydride was used). The reaction was monitored using TLC and/or NMR.

General Thiol/Fe Reduction Procedure

This Example Describes Reduction of t-Butyl Phenylpropyl Peroxide (4); the Same Procedure was Applied to all Peroxide-Containing Substrates.

Figure 2A:
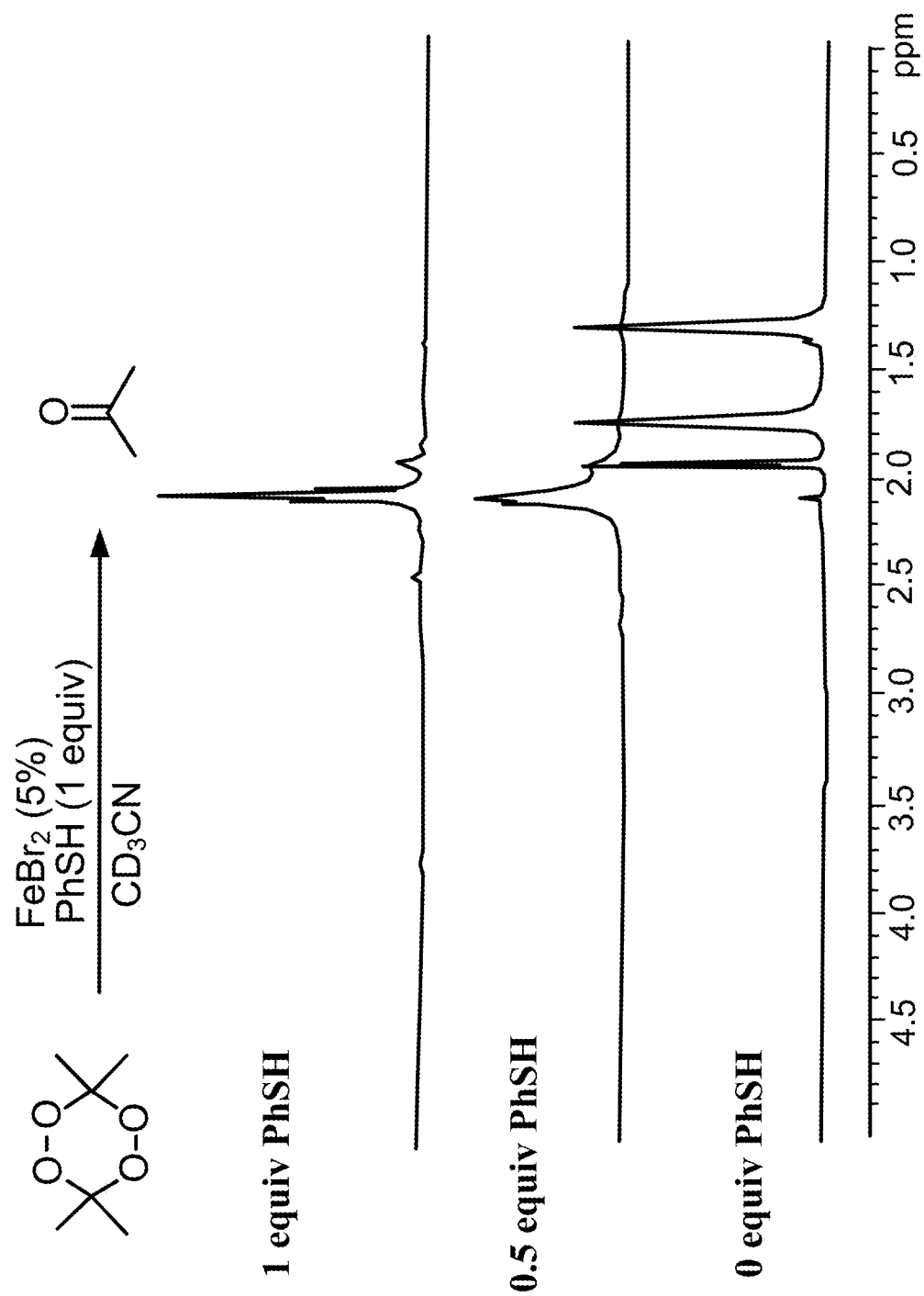
FIG. 2A depicts $^1$H NMR spectra of compound 7.
Figure 2B:
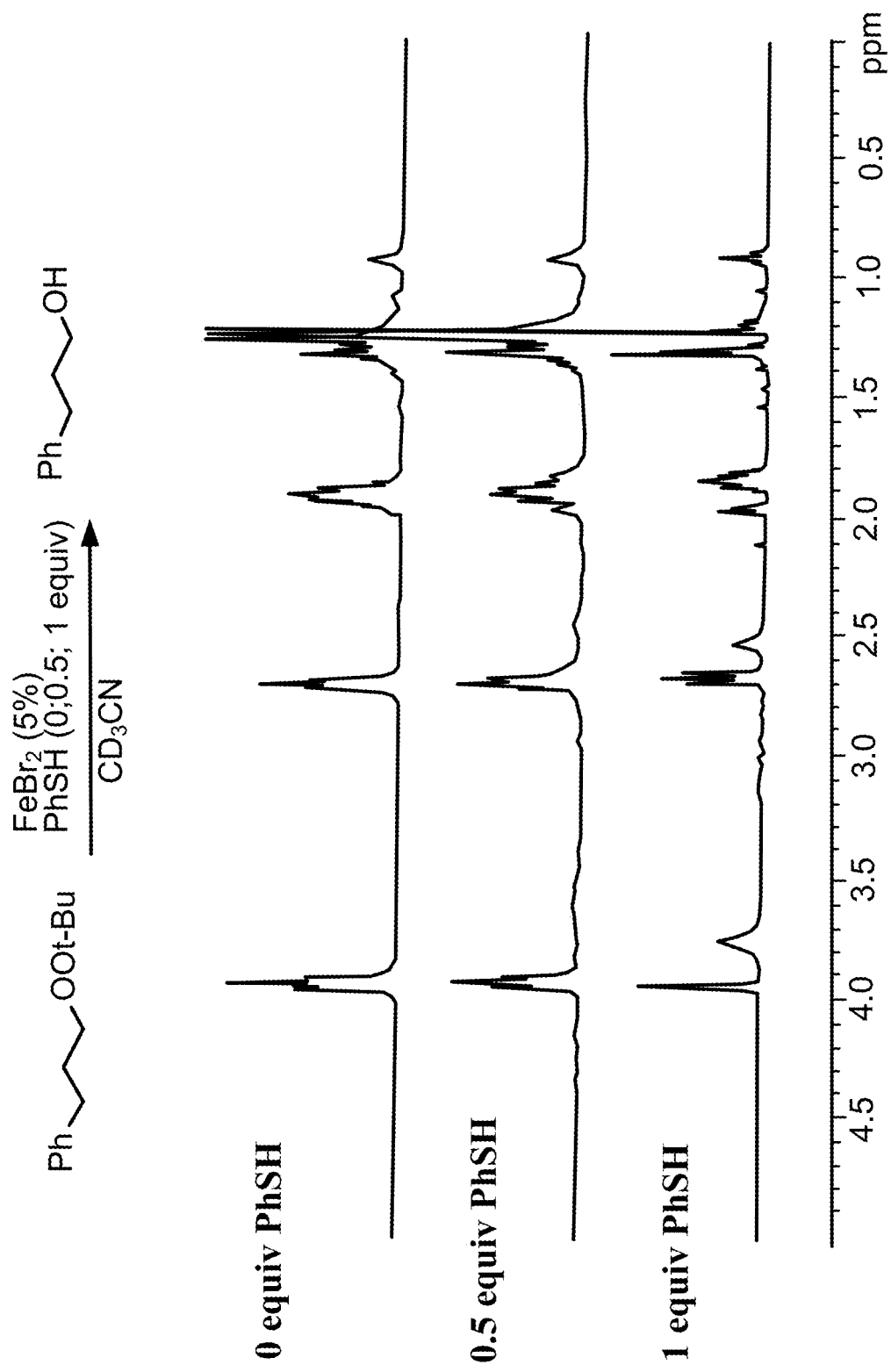
FIG. 2B depicts $^1$H NMR spectra of product solutions from Fe/thiol reduction.
Figure 4A:
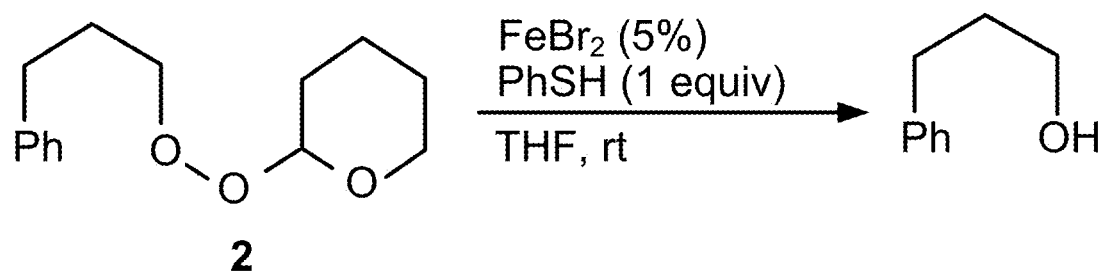
FIG. 4A depicts reduction conditions of peroxide 2.
Figure 4B:
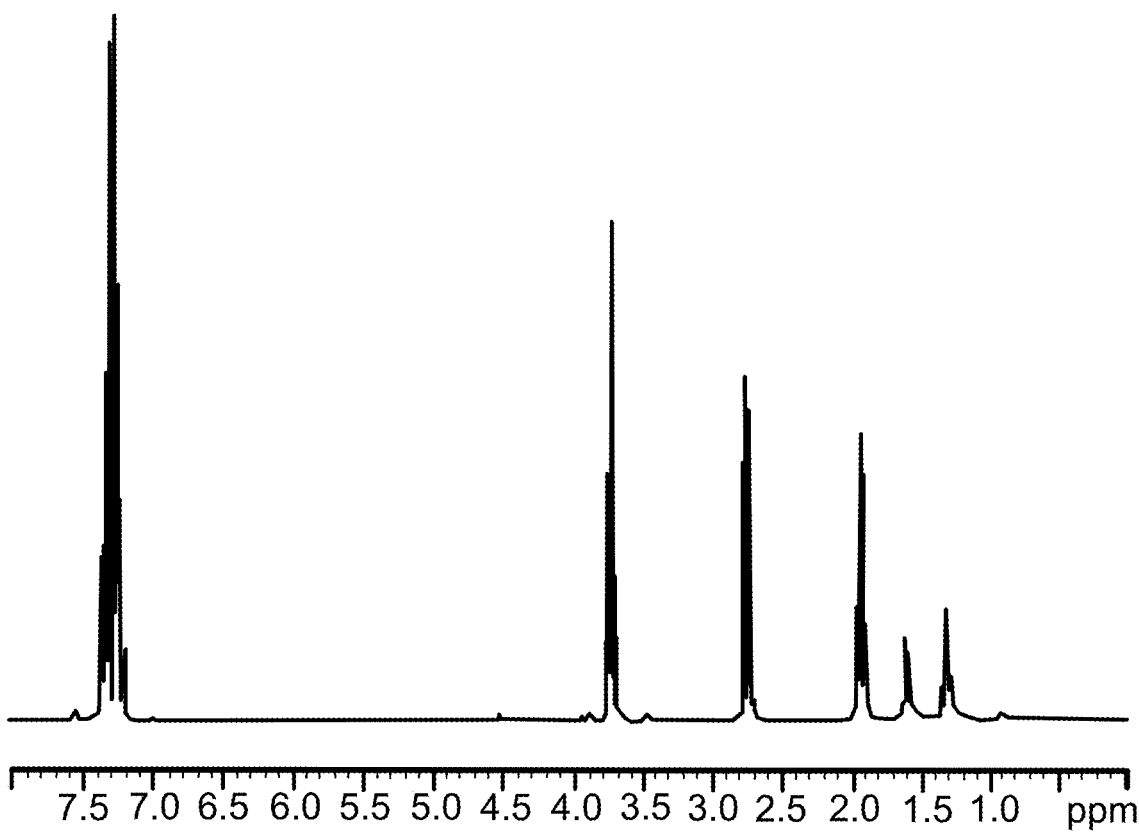
FIG. 4B depicts a $^1$H NMR of the product of the reduction of peroxide 2.
Figure 5A:
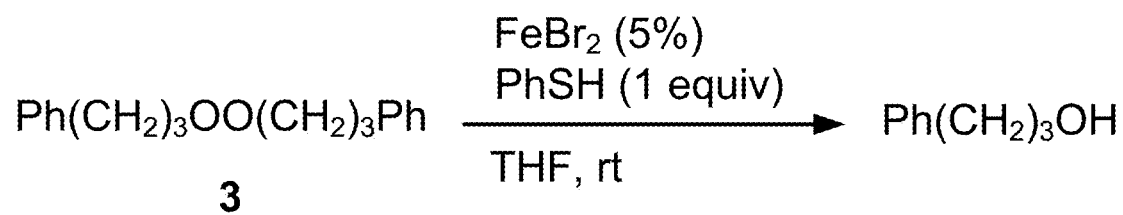
FIG. 5A depicts reduction conditions of peroxide 3.
Figure 5B:
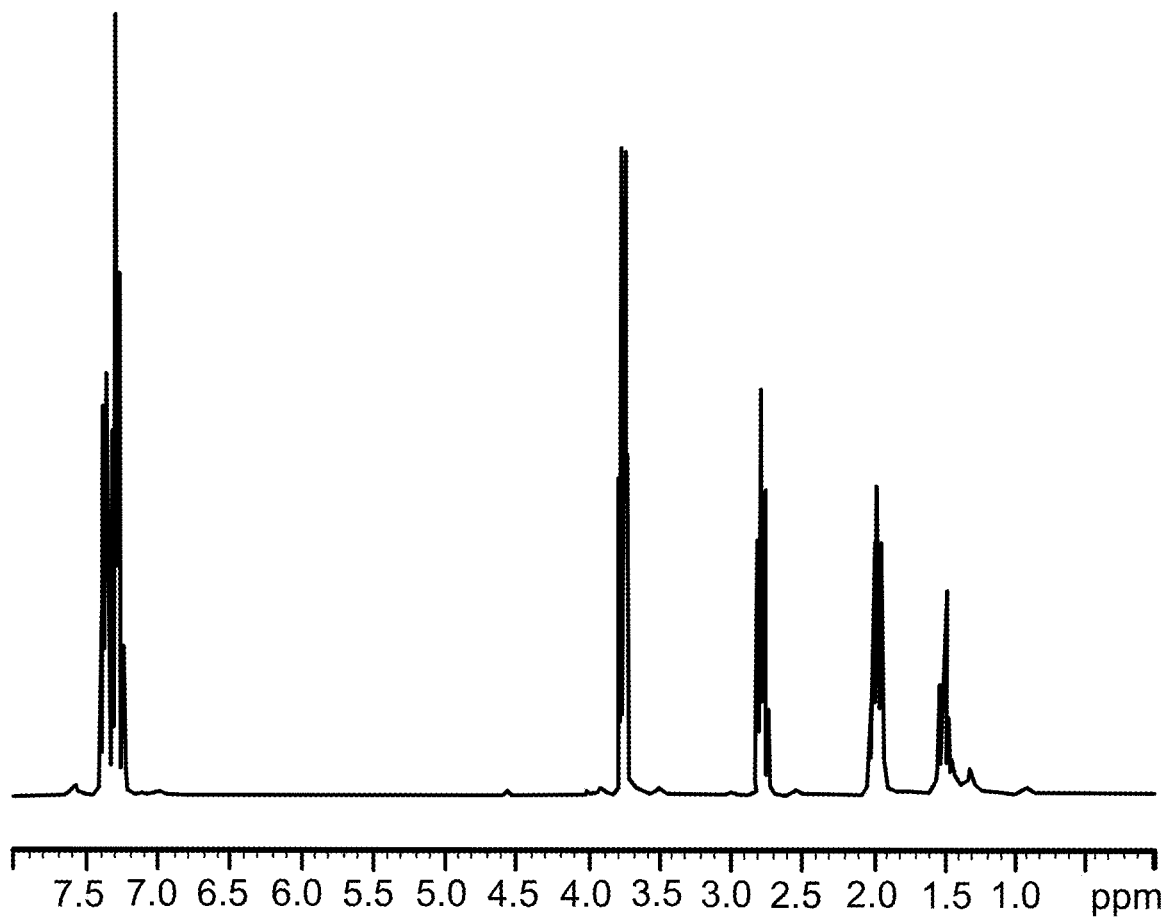
FIG. 5B depicts a $^1$H NMR of the product of the reduction of peroxide 3.
Figure 6A:
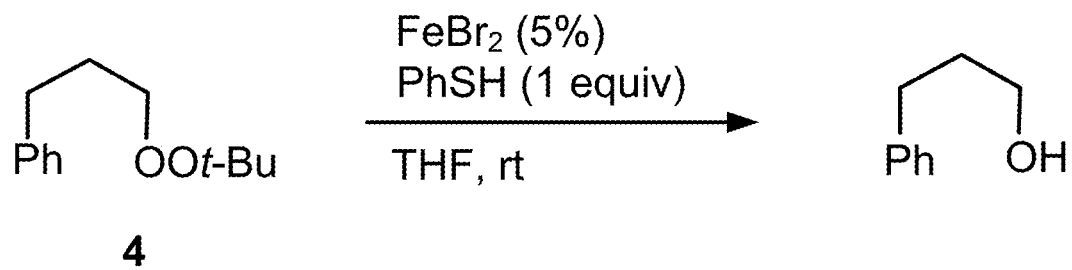
FIG. 6A depicts reduction conditions of peroxide 4.
Figure 6B:
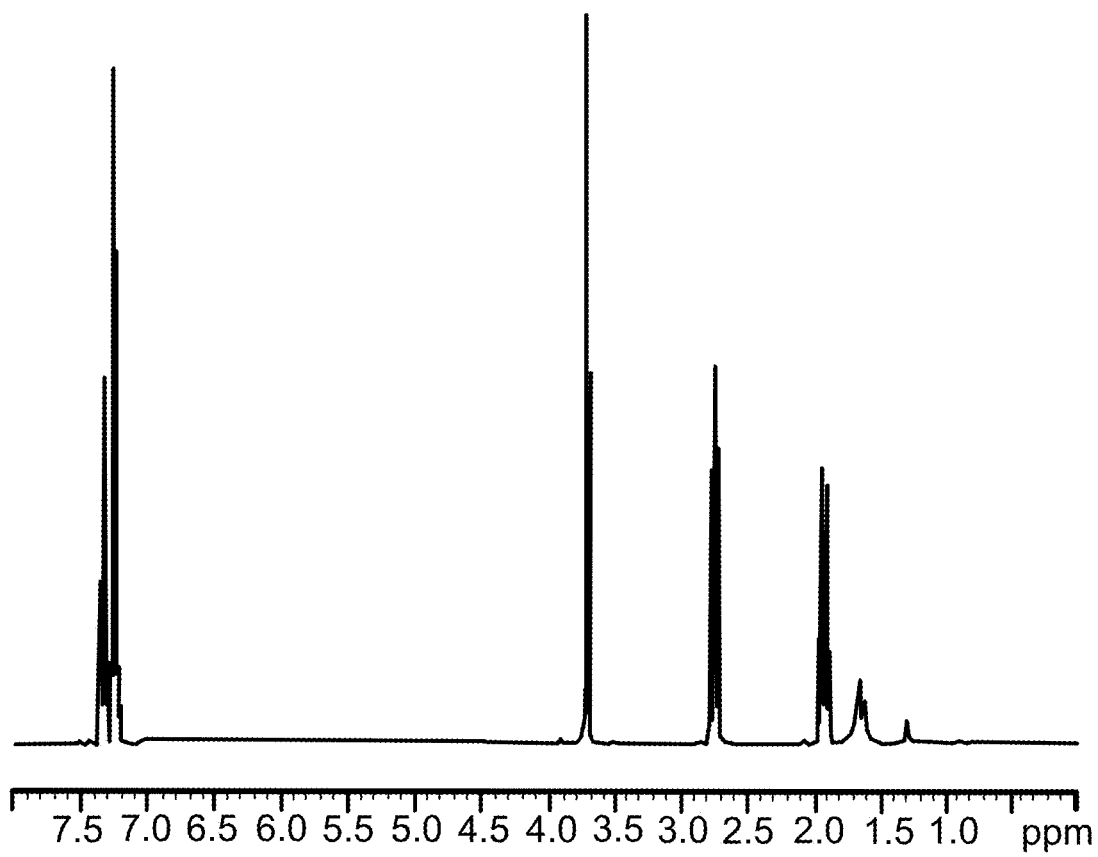
FIG. 6B depicts a $^1$H NMR of the product of the reduction of peroxide 4.
Figure 7A:
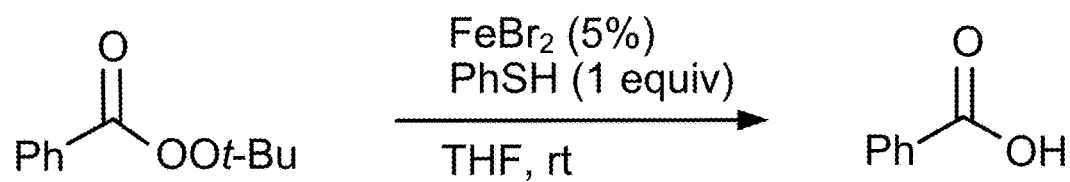
FIG. 7A depicts reduction conditions of peroxide 5.
Figure 7B:
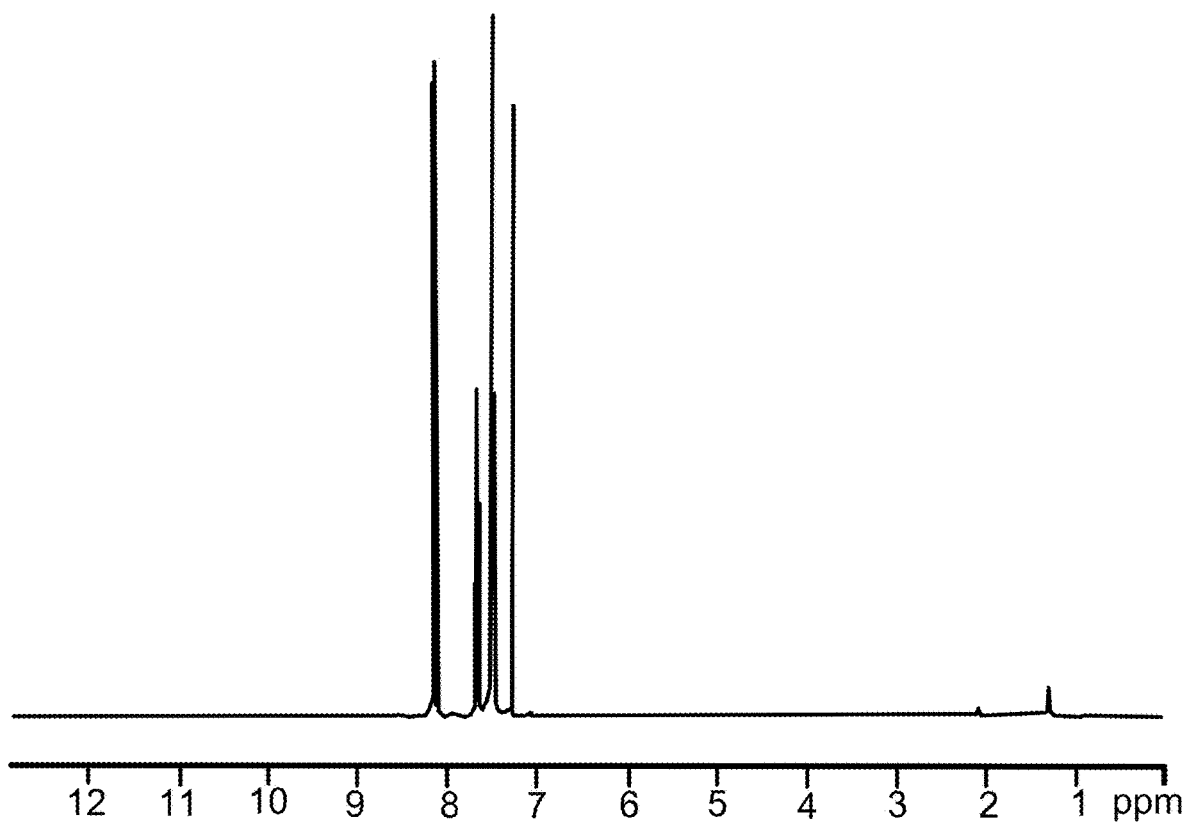
FIG. 7B depicts a $^1$H NMR of the product of the reduction of peroxide 5.

To a solution of 0.0051 g (0.024 mmol) of $FeBr_2$ in 10 ml of THF was added 0.10 g (0.48 mmol) dialkyl peroxide 4. A clear light orange to light red color was observed for the mixture. Addition of 0.052 ml (0.48 mmol) of phenyl thiol resulted in the immediate formation of a black colloidal suspension. FIG. 1 depicts a series of photographs of the reaction at different time intervals after thiol addition. The reaction could be followed by disappearance of peroxide substrate in TLC; in most cases, the reactions were complete within 60 seconds. The solution remained black and opaque immediately thereafter but was observed to turn clear (light green/black in color) within a few minutes. FIG. 2B depicts a series of $^1H$ NMR spectra, the first of a reaction conducted in the absence of PhSH, the second of a reaction mixture conducted in the presence of 0.5 equivalents of PhSH, and the third of the reaction described above conducted in the presence of 1 equivalent of PhSH. The spectra show a correlation between equivalents of PhSH and conversion to alcohol. FIGS. 4A and 4B show the reduction conditions that peroxide 2 was subjected to as well as the $^1H$ NMR of the resulting product, showing clean conversion to the product alcohol. FIGS. 5A and 5B show the reduction conditions that peroxide 3 was subjected to as well as the $^1H$ NMR of the resulting product, showing clean conversion to the product alcohol. FIGS. 6A and 6B show the reduction conditions that peroxide 4 was subjected to as well as the $^1H$ NMR of the resulting product, showing clean conversion to the product alcohol. FIGS. 7A and 7B show the reduction conditions that peroxide 5 was subjected to as well as the $^1H$ NMR of the resulting product, showing clean conversion to the product alcohol.

Thiol/Fe Reduction of TATP (7)

To a solution of 0.0100 g (0.047 mmol) of $FeBr_2$ in 5 ml of $CD_3CN$, was added 0.110 g (0.47 mmol) of TATP (7), followed by 0.160 g (1.41 mmol) of phenyl thiol was added. The black suspension was allowed to sit for 3 days after which 0.043 g (0.470 mmol) of toluene was added as an internal standard. An aliquot drawn from the solution was then analyzed by NMR.

Control Reaction Using Only Peroxide and Iron

For this Purpose, "Peroxide" can Refer to Dialkyl Peroxide, Peroxyacetal, TATP, DATP, or the Perester.

A control reaction of $FeBr_2$ and peroxide was conducted as for the Fe/thiol procedures described above except that thiol was omitted. Reactions were monitored by TLC and/or NMR.

General Procedure for Fe/Thiol-Promoted Reduction of DADP (7)

To a solution of 0.0072 g (0.034 mmol) of FeBr in 2 ml of $CD_3CN$, was added 0.10 g (0.68 mmol) of DADP (6), followed by 0.129 g (1.35 mmol) of phenyl thiol. The reaction was allowed to sit for 3 minutes and then 0.062 g (0.6755 mmol) of toluene was added. The entire solution was then analyzed by $^1H$ NMR (FIG. 2A), comparing the integration of the toluene peak (2.33 ppm) to the signal for acetone peak (2.08 ppm). Experiments were also conducted using 0.5 equivalents PhSH and 0 equivalents PhSH, resulting in lesser (0.5 equivalents PhSH) or no (0 equivalents) conversion to acetone.

Thiol/Fe Catalyzed Reduction Using Added Hydride

To a solution of 0.005 g (0.024 mmol) of $FeBr_2$ in 10 ml of THF was added 0.050 g (0.24 mmol) of dialkyl peroxide 4, followed by 0.0.005 ml (0.024 mmol) of phenyl thiol, and lastly 0.24 ml (0.24 mmol) of a solution of DIBAL in THF (nominally 1.0M). The resulting reaction mixture was allowed to sit for 5 minutes, during which time the solution became translucent with very light red/green color. TLC analysis confirmed the disappearance of the peroxide and the formation of 3-phenyl-1-propanol.

Radical Clock Experiment (See Also Scheme 8).

The general thiol/Fe reduction procedure was applied to a solution of peroxide 8 (0.100 g, 0.5

Figure 3A:
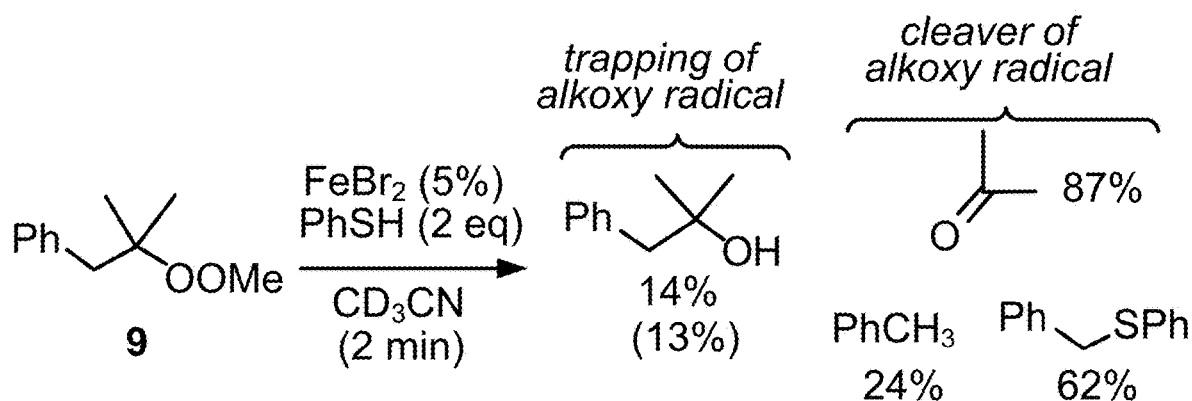
FIG. 3A depicts the products generated in the radical clock experiment of peroxide 9.
Figure 3B:
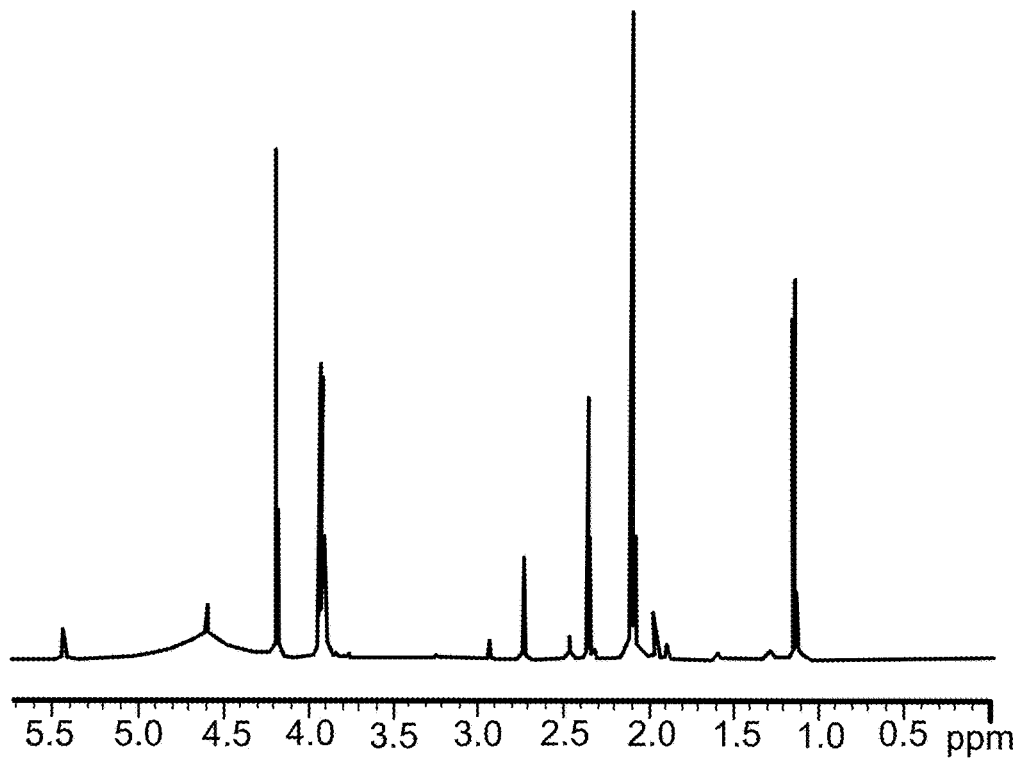
FIG. 3B depicts a $^1$H NMR spectrum of the products generated in the radical clock experiment of peroxide 9.

62 mmol) in $CD_3CN$ (3.0 mL). $^1H$ NMR was recorded on the crude reaction mixture. Four major products were observed (FIG. 3A). As a first approximation, it is believed that all products are derived from the alkoxy radical, either through hydrogen atom transfer or reduction (to form the alcohol) or fragmentation to afford acetone, plus either toluene or the benzyl phenyl sulfane (see Scheme 8). The tertiary alcohol was quantified by isolation; we note that the isolated yield and the relative yield calculated from the NMR assay are very similar. With the exception of acetone, the products could also be detected by GC/MS (not shown). FIG. 3B depicts the 41 NMR of the product mixture.

(1) 2-Methyl-1-phenylpropan-2-ol (14%), which has been previously characterized, was quantified by the $^1H$ NMR singlets at 2.74 (2H) and 1.15 ppm (6H). This product was also isolated (extraction, chromatography) in 13% yield.

(2) Acetone (87%) was quantified by the $^1H$ NMR singlet (6H) at 2.10 ppm.

(3) Toluene (24%) was quantified by the $^1H$ NMR singlet (3H) at 2.35 ppm.

(4) The benzyl (phenyl) sulfane (62%), which has been previously characterized, was quantified by the integration of the $^1H$ NMR singlet (2H), at 4.19 ppm.

Reaction Calorimetry for Fe/SPh-Catalyzed Decomposition of DADP (7):

In a glass vial with a septum cap was placed 0.021 g (0.10 mmol) of $FeBr_2$ and 0.150 g (1.01 mmol) of DADP 6. The vial was placed under an atmosphere of $N_2$ then placed into a PIG® cloth mat. THF (4 mL) was added to the vial. A metal temperature probe was inserted through the septum into the solution. After the solution temperature stabilized, a solution of 0.11 g (1.01 mmol) of phenyl thiol dissolved in 1 ml THF was added to the solution all at once. The temperature was found to rise, from 22.1° C. to 27.2° C. over a period of one minute.

Reaction Calorimetry of Fe/SR Cleavage of a Dialkyl Peroxide in THF:

calorimetry was conducted as in the previous experiment except that dialkyl peroxide 4 (0.208 g, 1.00 mmol) was used as the peroxide substrate and the reaction vial was wrapped with a 150 mm thickness of foam covering every part of the vial except for the septum. A temperature rise, from 24.5° C. to 32.7° C., over a period of one minute, was observed and recorded.

Reaction Calorimetry of Fe/SR Cleavage of a Dialkyl Peroxide in $CH_3CN$ calorimetry was conducted as previously using dialkyl peroxide 4 (0.200 g, 0.961 mmol) and acetonitrile as solvent. A temperature rise from 22.9 to 33.6° C. was observed over a 3.0 min period.

Catalyzed Decomposition of Hydrogen Peroxide.

Into a light yellow-brown aqueous solution containing the complex derived from 0.001 mmol of $FeBr_2$ and a slight excess of thiophenol (concentration of catalyst is 0.01 molar) in 1 mL of deionized water was added, over a period of approximately 5 seconds, 1 mL of nominally 30% (approximately 9 M) aq. hydrogen peroxide. Once addition had begun, the reaction solution darkened and vigorous bubbling ensued. The temperature of the outer surface of the reaction vial increased. Within a few seconds of the completion of the hydrogen peroxide addition, bubbling ceased and the reaction returned to the initial light yellow-brown coloration. Testing of the post-reaction solution with a starch/iodide strip (sensitive to hydrogen peroxide down to 10-20 ppm) revealed no remaining hydrogen peroxide. The original reaction solution was allowed to cool for five minutes, and then treated with an additional 1 milliliter of 30% aq. $H_2O_2$, added as before. Darkening, bubbling, evolution of heat, and ultimate clearing was observed again. Once again, peroxide was completely removed according to the test strip.

Turnover number: Our observations from this preliminary experiment suggest that $1\times10^{-6}$ mole of catalyst (approximate) is able to remove $9\times10^{-3}$ moles of hydrogen peroxide (9,000 turnovers) in a few seconds, and repeats this performance within a span of only a few minutes (and again the next morning). Thus, a lower bound for the turnover number (TON) for this catalyst towards hydrogen peroxide can be set at 9,000/batch but the actual TON can be higher. The turnover frequency (TOF), based upon a simple estimate of 30 seconds for removal of all detectable $H_2O_2$, is at least 300/second. However, an estimate based upon initial kinetics of $H_2O_2$ consumption would almost certainly be much greater.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of decomposing a peroxide of Formula I:

$$R^1\text{—}O\text{—}O\text{—}R^2 \quad \text{(Formula I)}$$

wherein:
each of $R^1$ and $R^2$ is independently selected from the group consisting of:
(i) hydrogen;
(ii) $C_{1-10}$ alkyl optionally substituted with 1-4 $R^a$;
(iii) $C_{3-10}$ alkenyl optionally substituted with 1-4 $R^a$;
(iv) $C_{3-10}$ alkynyl optionally substituted with 1-4 $R^a$;
(v) $C_{6-10}$ aryl optionally substituted with 1-4 $R^a$;
(vi) 5-10 membered heteroaryl including 5-10 ring atoms, wherein 1-4 ring atoms are each independently selected from the group consisting of N, NH, O, and S, wherein the heteroaryl is optionally substituted with 1-4 $R^a$;
(vii) $C_{3-10}$ cycloalkyl that is optionally substituted with 1-4 $R^a$;
(vii) 5-10 membered heterocyclyl including 3-10 ring atoms, wherein 1-3 ring atoms are each independently selected from the group consisting of N, NH and O, wherein the heterocyclyl is optionally substituted with 1-4 $R^a$;
(viii) —C(O)$R^b$;
(ix) —CO$_2R^b$;
(x) —Si(R')$_3$;
each occurrence of $R^a$ is independently selected from the group consisting of:
(i) $C_{1-8}$ alkyl substituted with 1-3 $R^b$;
(ii) ($C_{0-6}$ alkylene)-$C_{3-10}$ cycloalkyl, wherein the cycloalkyl is optionally substituted with from 1-4 $R^b$;
(iii) ($C_{0-6}$ alkylene)-heterocyclyl including 3-10 ring atoms, wherein 1-3 ring atoms are each independently selected from the group consisting of NH, O, and S, wherein the heterocyclyl is optionally substituted with 1-4 $R^b$;
(iv) ($C_{0-6}$ alkylene)-($C_{6-10}$ aryl), wherein the aryl is optionally substituted with 1-5 $R^b$; or
(v) ($C_{0-6}$ alkylene)-heteroaryl including 5-10 ring atoms, wherein 1-4 ring atoms are each independently selected from the group consisting of N, NH, O, and S, wherein the heteroaryl is optionally substituted with 1-3 $R^b$;
(vi) $C_{1-4}$ alkoxy optionally substituted with 1-3 $R^b$;
(vii) $C_{1-4}$ haloalkoxy;
(viii) —COH;
(ix) —CO$_2R^b$;
(x) —CONR$^bR^b$;
(xi) cyano;
(xii) —NR$^bR^b$;
(xiii) —NR$^b$C(O)NR$^bR^b$;
(xiv) —NR$^b$C(O)OR$^b$;
(xv) —NR$^b$C(O)R$^b$;
(xvi) $C_{1-4}$ thioalkoxy;
(xvii) —N$_3$;
(xviii) —CO$_2$H;
(xix) —C(O)R$^b$;
(xx) —SO$_{1-2}$(R$^b$);
(xxi) —O$_n$P(O)$_nY_2$, wherein n is independently 0 or 1, and wherein each Y is independently selected from —OR$^b$ and $C_{1-6}$ alkyl;
(xxii) —O—O—R$^c$;
(xxiii) —(O—O—CH$_2$CH$_2)_m$—O—OR'", wherein m is an integer from 1-1000; and
alternatively, any two $R^a$, taken together with the atoms they are bonded to and any atoms that intervene the atoms they are bonded to, form a ring selected from:
(i) a $C_{3-10}$ cycloalkyl, wherein the a $C_{3-10}$ cycloalkyl is optionally substituted with 1-6 $R^b$;
(ii) a 5-10-membered heterocyclyl comprising 1-6 heteroatoms selected O, S, and N, wherein the heterocyclyl is optionally substituted with 1-6 $R^b$;
(iii) a $C_{6-10}$ aryl, wherein the aryl is optionally substituted with 1-6 $R^b$; and
(iv) a 5-10 membered heteroaryl comprising 1-6 heteroatoms selected O, S, and N, wherein the heteroaryl is optionally substituted with 1-6 $R^b$; and
5-10-membered heterocyclyl comprising 1-6 heteroatoms selected O, S, and N, wherein the heterocyclyl is optionally substituted with 1-6 $R^b$;
each occurrence of $R^b$ is independently selected from the group consisting of:

(i) halo;
(ii) cyano;
(iii) $C_{1-6}$ alkyl;
(iv) $C_{2-6}$ alkenyl;
(v) $C_{2-6}$ alkynyl;
(vi) $C_{1-4}$ haloalkyl;
(vii) $C_{1-4}$ alkoxy;
(viii) $C_{1-4}$ haloalkoxy;
(ix) —($C_{0-3}$ alkylene)-$C_{3-6}$ cycloalkyl optionally substituted with 1-4 independently selected $C_{1-4}$ alkyl;
(x) —($C_{0-3}$ alkylene)-heterocyclyl including 3-10 ring atoms, wherein 1-3 ring atoms are each independently selected from the group consisting of NH, O, and S, wherein the heterocyclyl is optionally substituted with 1-4 independently selected $C_{1-4}$ alkyl;
(xi) —($C_{0-3}$ alkylene)-phenyl;
(xii) —($C_{0-3}$ alkylene)-heteroaryl including 5-10 ring atoms, wherein 1-4 ring atoms are each independently selected from the group consisting of N, NH, O, and S;
(xiii) —$S(O)_{1-2}(C_{1-4}$ alkyl); and
(xiv) —NR'R'';
(xv) —OH;
(xvi) —$S(O)_{1-2}$(NR'R'');
(xvii) —$C_{1-4}$ thioalkoxy;
(xviii) —$NO_2$;
(xix) —N(R')(C(=O)$C_{1-3}$ alkyl);
(xx) —C(=O)($C_{1-4}$ alkyl);
(xxi) —C(=O)O($C_{1-4}$ alkyl);
(xxii) —C(=O)OH, and
(xxiii) —C(=O)N(R')(R''); and
alternatively, any two $R^b$, taken together with the atoms they are bonded to and any atoms that intervene the atoms they are bonded to, form a ring selected from:
(i) a $C_{3-10}$ cycloalkyl, wherein the a $C_{3-10}$ cycloalkyl is optionally substituted with 1-6 $R^d$;
(ii) a 5-10-membered heterocyclyl comprising 1-6 heteroatoms selected O, S, and N, wherein the heterocyclyl is optionally substituted with 1-6 $R^d$;
(iii) a $C_{6-10}$ aryl, wherein the aryl is optionally substituted with 1-6 $R^d$; and
(iv) a 5-10 membered heteroaryl comprising 1-6 heteroatoms selected O, S, and N, wherein the heteroaryl is optionally substituted with 1-6 $R^d$; and
5-10-membered heterocyclyl comprising 1-6 heteroatoms selected O, S, and N, wherein the heterocyclyl is optionally substituted with 1-6 $R^d$;
each occurrence of $R^c$ is independently selected from the group consisting of:
(i) hydrogen;
(ii) $C_{1-10}$ alkyl optionally substituted with 1-4 $R^d$;
(iii) $C_{3-10}$ alkenyl optionally substituted with 1-4 $R^d$;
(iv) $C_{3-10}$ alkynyl optionally substituted with 1-4 $R^d$;
(v) $C_{6-10}$ aryl optionally substituted with 1-4 $R^d$;
(vi) 5-10 membered heteroaryl including 5-10 ring atoms, wherein 1-4 ring atoms are each independently selected from the group consisting of N, NH, O, and S, wherein the heteroaryl is optionally substituted with 1-4 $R^d$;
(vii) $C_{3-10}$ cycloalkyl that is optionally substituted with 1-4 $R^d$;
(vii) 5-10 membered heterocyclyl including 3-10 ring atoms, wherein 1-3 ring atoms are each independently selected from the group consisting of N, NH and O, wherein the heterocyclyl is optionally substituted with 1-4 $R^d$;
(viii) —C(O)$R^b$;
(ix) —$CO_2R^b$; and
(x) —$Si(R')_3$;
each occurrence of $R^d$ is independently selected from the group consisting of:
(i) $C_{1-8}$ alkyl substituted with 1-3 $R^b$;
(ii) ($C_{0-6}$ alkylene)-$C_{3-10}$ cycloalkyl, wherein the cycloalkyl is optionally substituted with from 1-4 $R^b$;
(iii) ($C_{0-6}$ alkylene)-heterocyclyl including 3-10 ring atoms, wherein 1-3 ring atoms are each independently selected from the group consisting of NH, O, and S, wherein the heterocyclyl is optionally substituted with 1-4 $R^b$;
(iv) ($C_{0-6}$ alkylene)-($C_{6-10}$ aryl), wherein the aryl is optionally substituted with 1-5 $R^b$; or
(v) ($C_{0-6}$ alkylene)-heteroaryl including 5-10 ring atoms, wherein 1-4 ring atoms are each independently selected from the group consisting of N, NH, O, and S, wherein the heteroaryl is optionally substituted with 1-3 $R^b$;
(vi) $C_{1-4}$ alkoxy optionally substituted with 1-3 $R^b$;
(vii) $C_{1-4}$ haloalkoxy;
(viii) —COH;
(ix) —$CO_2R^b$;
(x) —$CONR^bR^b$;
(xi) cyano;
(xii) —$NR^bR^b$;
(xiii) —$NR^bC(O)NR^bR^b$;
(xiv) —$NR^bC(O)OR^b$;
(xv) —$NR^bC(O)R^b$;
(xvi) $C_{1-4}$ thioalkoxy;
(xvii) —$N_3$;
(xviii) —$CO_2H$;
(xix) —C(O)$R^b$;
(xx) —$SO_{1-2}(R^b)$; and
(xxi) —$O_nP(O)_nY_2$, wherein n is independently 0 or 1, and wherein each Y is independently selected from —$OR^b$ and $C_{1-6}$ alkyl; and
each occurrence of R', R'', and R''' is independently selected from the group consisting of: H, $C_{1-4}$ alkyl, and phenyl; or, if R' and R'' are bonded to the same atom, R' and R'' together with the atom to which each is attached forms a ring including 3-8 ring atoms, wherein the ring includes: (a) 1-7 ring carbon atoms; and (b) 0-3 ring heteroatoms (in addition to the atom attached to R' and R''), which are each independently selected from the group consisting of N, NH, O, and S;
alternatively, $R^1$ and $R^2$, taken together with the oxygen atoms they are bonded to, form a 5-10-membered heterocyclyl comprising 1-6 heteroatoms selected from O, S, and N,
wherein the heterocyclyl is optionally substituted with 1-6 $R^a$; and
provided that when one of $R^1$ and $R^2$ is hydrogen, the other of $R^1$ and $R^2$ is not hydrogen; and
provided that a —O—O— moiety is not bonded to a carbon that is double bonded to another carbon or triple-bonded to another carbon;
comprising combining:
(i) an organic chalcogenide selected from:
(i-a) a thiol of Formula A1 or a thiolate of Formula A2
$R^{10}$—SH (Formula A1) or $R^{10}$—$S^-$ (Formula A2)
wherein:
$R^{10}$ is selected from the group consisting of:
(i) $C_{1-6}$ alkyl optionally substituted with from 1-4 $R^m$;
(ii) —$C_{6-10}$ aryl optionally substituted with from 1-4 $R^m$;

(iii) -5-10 membered heteroaryl, wherein 1-4 ring atoms are each independently selected from the group consisting of N, NH, O, and S, wherein the heteroaryl is optionally substituted with from 1-4 $R'''$;
(iv) —$C_{3-10}$ cycloalkyl wherein the cycloalkyl is optionally substituted with from 1-4 $R'''$; and
(v) -5-10 membered heterocyclyl, wherein the heterocyclyl is optionally substituted with 1-4 $R'''$;
each occurrence of $R'''$ is independently selected from the group consisting of:
(i) $C_{1-8}$ alkyl substituted with 1-3 $R''$;
(ii) ($C_{0-6}$ alkylene)-$C_{3-10}$ cycloalkyl, wherein the cycloalkyl is optionally substituted with from 1-4 $R''$;
(iii) ($C_{0-6}$ alkylene)-heterocyclyl including 3-10 ring atoms, wherein 1-3 ring atoms are each independently selected from the group consisting of NH, O, and S, wherein the heterocyclyl is optionally substituted with 1-4 $R''$;
(iv) ($C_{0-6}$ alkylene)-($C_{6-10}$ aryl), wherein the aryl is optionally substituted with 1-5 $R''$; or
(v) ($C_{0-6}$ alkylene)-heteroaryl including 5-10 ring atoms, wherein 1-4 ring atoms are each independently selected from the group consisting of N, NH, O, and S, wherein the heteroaryl is optionally substituted with 1-3 $R''$;
(vi) $C_{1-4}$ alkoxy optionally substituted with 1-3 $R''$;
(vii) $C_{1-4}$ haloalkoxy;
(viii) —COH;
(ix) —$CO_2R''$;
(x) —$CONR''R''$;
(xi) cyano;
(xii) —$NR''R''$;
(xiii) —$NR''C(O)NR''R''$;
(xiv) —$NR''C(O)OR''$;
(xv) —$NR''C(O)R''$;
(xvi) $C_{1-4}$ thioalkoxy;
(xvii) —$N_3$;
(xviii) —$CO_2H$;
(xix) —$C(O)R''$;
(xx) —$SO_{1-2}(R'')$;
(xxi) —$O_nP(O)_nY_2$, wherein n is independently 0 or 1, and wherein each Y is independently selected from —$OR''$ and $C_{1-6}$ alkyl;
(xxii) —$S^-$;
(xxix) $C_{2-6}$ alkenyl optionally substituted with 1-3 $R''$;
(xxx) $C_{2-6}$ alkynyl optionally substituted with 1-3 $R''$;
each occurrence of $R''$ is independently selected from the group consisting of:
(i) halo;
(ii) cyano;
(iii) $C_{1-6}$ alkyl;
(iv) $C_{2-6}$ alkenyl;
(v) $C_{2-6}$ alkynyl;
(vi) $C_{1-4}$ haloalkyl;
(vii) $C_{1-4}$ alkoxy;
(viii) $C_{1-4}$ haloalkoxy;
(ix) —($C_{0-3}$ alkylene)-$C_{3-6}$ cycloalkyl optionally substituted with 1-4 independently selected $C_{1-4}$ alkyl;
(x) —($C_{0-3}$ alkylene)-heterocyclyl including 3-10 ring atoms, wherein 1-3 ring atoms are each independently selected from the group consisting of NH, O, and S, wherein the heterocyclyl is optionally substituted with 1-4 independently selected $C_{1-4}$ alkyl;
(xi) —($C_{0-3}$ alkylene)-phenyl;
(xii) —($C_{0-3}$ alkylene)-heteroaryl including 5-10 ring atoms, wherein 1-4 ring atoms are each independently selected from the group consisting of N, NH, O, and S;
(xiii) —$S(O)_{1-2}(C_{1-4}$ alkyl); and
(xiv) —$NR*R**$;
(xv) —OH;
(xvi) —$S(O)_{1-2}(NR*R**)$;
(xvii) —$C_{1-4}$ thioalkoxy;
(xviii) —$NO_2$;
(xix) —$N(R*)(C(=O)C_{1-3}$ alkyl);
(xx) —$C(=O)(C_{1-4}$ alkyl);
(xxi) —$C(=O)O(C_{1-4}$ alkyl);
(xxii) —$C(=O)OH$, and
(xxiii) —$C(=O)N(R*)(R**)$; and
each occurrence of $R*$ and $R**$ is independently selected from the group consisting of: H, $C_{1-4}$ alkyl, and phenyl; or
(i-b) a selenol or selenide of Formula B:

$$R^{20}\text{—Se}^- \text{ or } R^{20}\text{—SeH} \qquad \text{(Formula B)}$$

wherein:
$R^{20}$ is selected from the group consisting of:
(ii) $C_{1-6}$ alkyl;
(iii) $C_{2-6}$ alkenyl;
(iv) $C_{2-6}$ alkynyl;
(v) —$C_{6-10}$ aryl;
(vi) -5-10 membered heteroaryl, wherein 1-4 ring atoms are each independently selected from the group consisting of N, NH, O, and S;
(vii) —$C_{3-10}$ cycloalkyl; and
(vii) -5-10 membered heterocyclyl;
(ii) an optional reductant;
(iii) an iron salt selected from an iron (II) halide or an iron (III) halide; and
(iv) the peroxide;
wherein decomposing the peroxide comprises reducing the peroxide or disproportionating the peroxide; and wherein $R^1$ and $R^2$, taken together with the oxygen atoms they are bonded to, form a 5-10-membered heterocyclyl comprising 1-6 heteroatoms selected from O, S, and N, wherein the heterocyclyl is optionally substituted with 1-6 $R^a$.

2. The method of claim 1, wherein $R^{10}$ is $C_{6-10}$ aryl.
3. The method of claim 1, wherein $R^{10}$ is phenyl.
4. The method of claim 1, wherein the iron salt is an iron (II) halide.
5. The method of claim 4, wherein the iron salt is iron (II) bromide.
6. The method of claim 1, wherein the ratio of the iron salt to the peroxide is about 0.001:1 to about 0.02:1.
7. The method of claim 1, wherein the optional reductant is present.
8. The method of claim 1, wherein the product of the reduction of the peroxide is an alcohol.

* * * * *

UNITED STATES PATENT AND TRADEMARK OFFICE
CERTIFICATE OF CORRECTION

PATENT NO. : 11,242,296 B2  
APPLICATION NO. : 16/514423  
DATED : February 8, 2022  
INVENTOR(S) : Patrick H. Dussault and Andrew Olson Page 1 of 1

It is certified that error appears in the above-identified patent and that said Letters Patent is hereby corrected as shown below:

In the Claims

In Claim 1 at Column 48, Line 3, please delete "(vii)" and insert --(viii)--, therefor.
In Claim 1 at Column 48, Line 8, please delete "(viii)" and insert --(ix)--, therefor.
In Claim 1 at Column 48, Line 9, please delete "(ix)" and insert --(x)--, therefor.
In Claim 1 at Column 48, Line 10, please delete "(x)" and insert --(xi)--, therefor.
In Claim 1 at Column 48, Line 53, please delete "the a" and insert --the--, therefor.
In Claim 1 at Column 48, Line 56, please delete "selected O" and insert --selected from O--, therefor.
In Claim 1 at Column 48, Line 61, please delete "selected O" and insert --selected from O--, therefor.
In Claim 1 at Column 48, Line 64, please delete "selected O" and insert --selected from O--, therefor.
In Claim 1 at Column 49, Line 21, please delete "; and" and insert --;--, therefor.
In Claim 1 at Column 49, Line 35, please delete "the a" and insert --the--, therefor.
In Claim 1 at Column 49, Line 38, please delete "selected O" and insert --selected from O--, therefor.
In Claim 1 at Column 49, Line 45, please delete "5-10-membered" and insert --a 5-10-membered--, therefor.
In Claim 1 at Column 49, Line 46, please delete "selected O" and insert --selected from O--, therefor.
In Claim 1 at Column 49, Line 62, please delete "(vii)" and insert --(viii)--, therefor.
In Claim 1 at Column 49, Line 67, please delete "(viii)" and insert --(ix)--, therefor.
In Claim 1 at Column 50, Line 1, please delete "(ix)" and insert --(x)--, therefor.
In Claim 1 at Column 50, Line 2, please delete "(x)" and insert --(xi)--, therefor.
In Claim 1 at Column 51, Line 44, please delete "(xxix)" and insert --(xxiii)--, therefor.
In Claim 1 at Column 51, Line 45, please delete "(xxx)" and insert --(xxix)--, therefor.
In Claim 1 at Column 52, Line 27, please delete "(ii)" and insert --(i)--, therefor.
In Claim 1 at Column 52, Line 28, please delete "(iii)" and insert --(ii)--, therefor.
In Claim 1 at Column 52, Line 29, please delete "(iv)" and insert --(iii)--, therefor.
In Claim 1 at Column 52, Line 30, please delete "(v)" and insert --(iv)--, therefor.
In Claim 1 at Column 52, Line 31, please delete "(vi)" and insert --(v)--, therefor.
In Claim 1 at Column 52, Line 34, please delete "(vii)" and insert --(vi)--, therefor.

Signed and Sealed this  
Sixth Day of September, 2022

Katherine Kelly Vidal  
*Director of the United States Patent and Trademark Office*